US009439506B2

(12) United States Patent
Szekely

(10) Patent No.: US 9,439,506 B2
(45) Date of Patent: Sep. 13, 2016

(54) SHELVING UNIT FURNITURE

(76) Inventor: Kenneth Eugene Szekely, Oakville (CA)

( * ) Notice: Subject to any disclaimer, the term of this patent is extended or adjusted under 35 U.S.C. 154(b) by 657 days.

(21) Appl. No.: 12/825,137

(22) Filed: Jun. 28, 2010

(65) Prior Publication Data

US 2011/0047696 A1 Mar. 3, 2011

Related U.S. Application Data

(60) Provisional application No. 61/221,479, filed on Jun. 29, 2009.

(51) Int. Cl.
*A47F 5/00* (2006.01)
*A47F 5/08* (2006.01)
*A47G 29/087* (2006.01)
*A47B 55/00* (2006.01)
*A47K 3/00* (2006.01)
*A47B 5/00* (2006.01)
*A47B 96/06* (2006.01)
(Continued)

(52) U.S. Cl.
CPC ............... *A47B 55/00* (2013.01); *A47B 5/00* (2013.01); *A47B 96/061* (2013.01); *A47C 5/12* (2013.01); *A47C 19/021* (2013.01); *A47C 19/025* (2013.01); *A47C 31/001* (2013.01); *A47F 5/08* (2013.01); *A47K 3/008* (2013.01); *Y10T 29/49826* (2015.01)

(58) Field of Classification Search
CPC ...... A47B 55/00; A47B 5/00; A47B 96/061; A47B 96/00; A47B 96/02; A47B 96/024; A47B 2230/05; A47B 2230/06; A47B 2220/0038; A47C 19/021; A47C 31/001; A47C 19/025; A47C 5/12; Y10T 29/49826; A47F 5/08; A47F 5/00; A47F 7/0035; A47F 7/0028; F16B 2/00; F24C 15/16; F16M 13/02; A47K 3/001; A47K 3/008
USPC ............... 211/135, 153, 86.01, 87.01, 126.1, 211/133.6, 183, 90.04, 90.01, 119.009, 211/119.011; 5/400; 312/351.1, 242, 408, 312/400, 290, 245–246; 108/42, 57.25, 108/57.28, 901, 147.11, 152; 297/452.39, 297/452.65; 29/428; 248/235, 200, 226.11; 52/36.5, 106
See application file for complete search history.

(56) References Cited

U.S. PATENT DOCUMENTS 2,169,295 A * 8/1939 Shuart ........................... 211/153
2,706,140 A * 4/1955 Hinkel ......................... 312/405.1
(Continued)

OTHER PUBLICATIONS

International Preliminary Report on Patentability and Written Opinion of the International Searching Authority for International Application No. PCT/CA2010/000992, issued on Jan. 12, 2012 (Forms PCT/IB/326, PCT/IB/373 and PCT/ISA/237).
(Continued)

*Primary Examiner* — Jennifer E Novosad
(74) *Attorney, Agent, or Firm* — Foley Hoag LLP

(57) ABSTRACT

Furniture articles have an integrally formed shell that generally has rounded features, the shell diminishing in circumference outwardly from a mounting surface, and a mounting portion configured to secure the shell to the mounting surface. A perimeter edge of the shell defines a mounting plane against which the mounting surface is to be secured. When the shell is secured to the mounting surface, the mounting portion is inaccessible and hidden from view. Furniture includes a shelving unit, a desk unit, a seating unit, and a bed.

9 Claims, 73 Drawing Sheets

(51) Int. Cl.
  *A47C 5/12*    (2006.01)
  *A47C 19/02*   (2006.01)
  *A47C 31/00*   (2006.01)

(56) References Cited

U.S. PATENT DOCUMENTS

| | | | | |
|---|---|---|---|---|
| 3,054,212 | A * | 9/1962 | Morris | 312/351 |
| 3,214,230 | A * | 10/1965 | Vaughn | 312/405.1 |
| 3,314,741 | A * | 4/1967 | Litner | 312/242 |
| 3,620,404 | A * | 11/1971 | Grasso | 220/477 |
| 4,051,789 | A * | 10/1977 | Howitt | 108/152 |
| 4,361,368 | A * | 11/1982 | Daniels | 312/321.5 |
| 5,097,771 | A | 3/1992 | James, III | |
| 5,097,969 | A * | 3/1992 | Maxworthy | 211/153 |
| 5,100,090 | A * | 3/1992 | Drower | 248/248 |
| 5,241,715 | A * | 9/1993 | Duvall et al. | 4/605 |
| 5,303,438 | A | 4/1994 | Walker | |
| 5,375,924 | A * | 12/1994 | Pohl et al. | 312/405.1 |
| 5,490,292 | A | 2/1996 | Auburn | |
| 6,164,610 | A * | 12/2000 | Santiago | 248/235 |
| 6,467,632 | B1 * | 10/2002 | Guillot | 211/13.1 |
| 6,520,463 | B1 | 2/2003 | Ouano | |
| 8,007,059 | B2 * | 8/2011 | Karl et al. | 312/245 |
| D646,908 | S * | 10/2011 | Szekely | D6/382 |
| 8,042,700 | B1 * | 10/2011 | Smalley | 211/90.01 |
| 2005/0072894 | A1 | 4/2005 | Grant | |
| 2009/0091229 | A1 | 4/2009 | Karl et al. | |
| 2011/0047696 | A1 * | 3/2011 | Szekely | 5/400 |
| 2013/0061395 | A1 * | 3/2013 | Karl et al. | 5/503.1 |
| 2013/0097944 | A1 * | 4/2013 | Van Ravenhorst | 52/35 |
| 2013/0264925 | A1 * | 10/2013 | Kling | 312/293.3 |

OTHER PUBLICATIONS

International Search Report for International Application No. PCT/CA2010/000992, mailed Sep. 17, 2010.

* cited by examiner

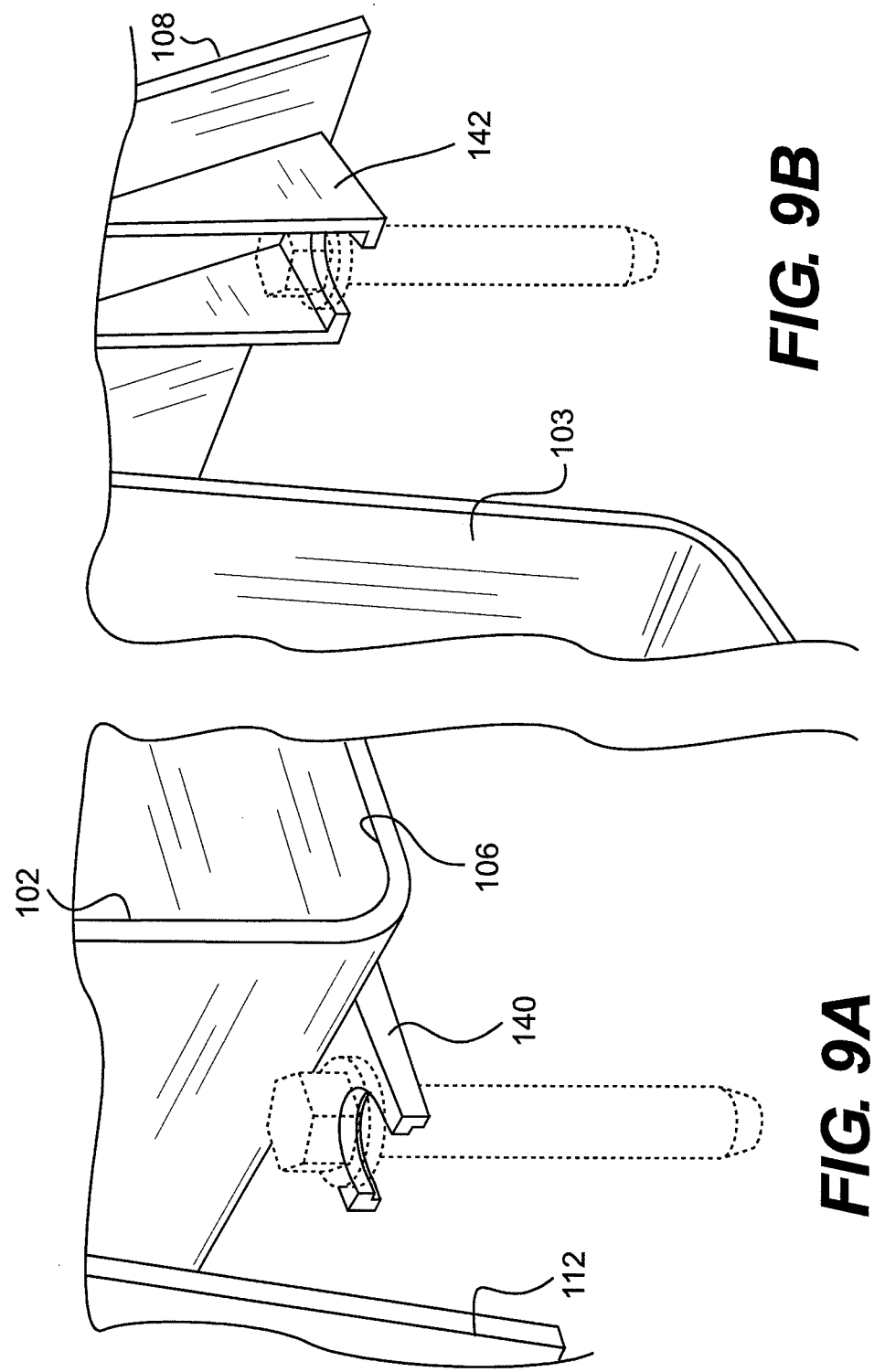

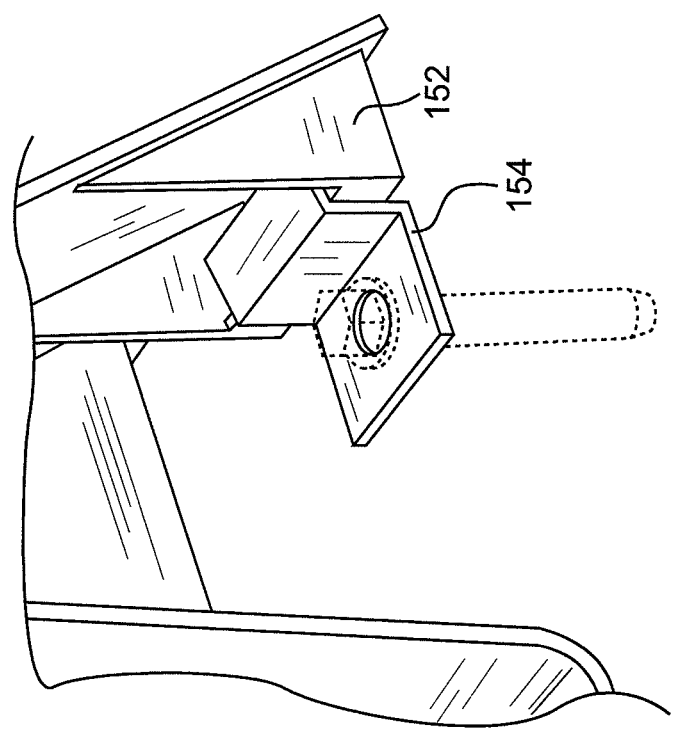

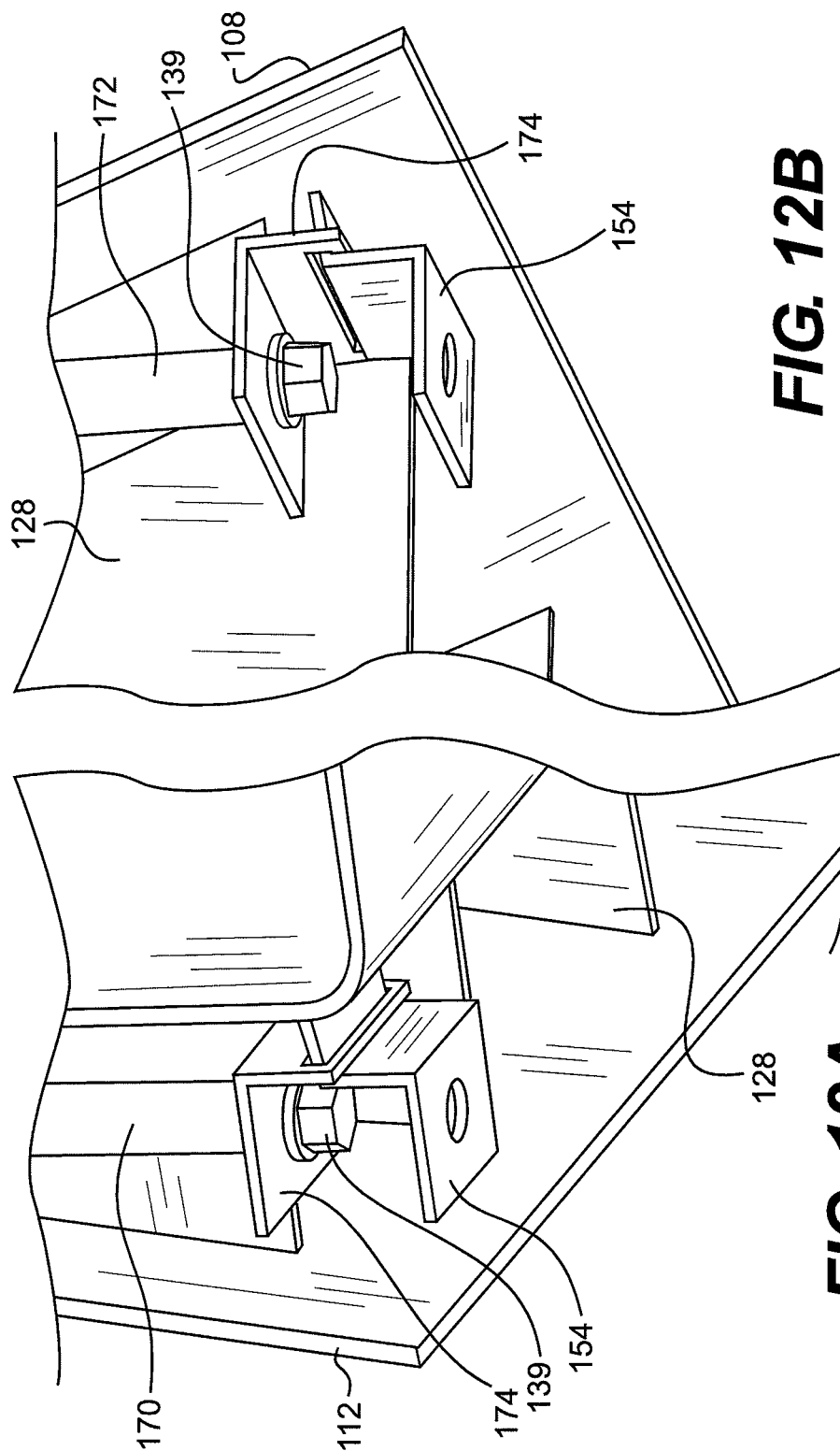

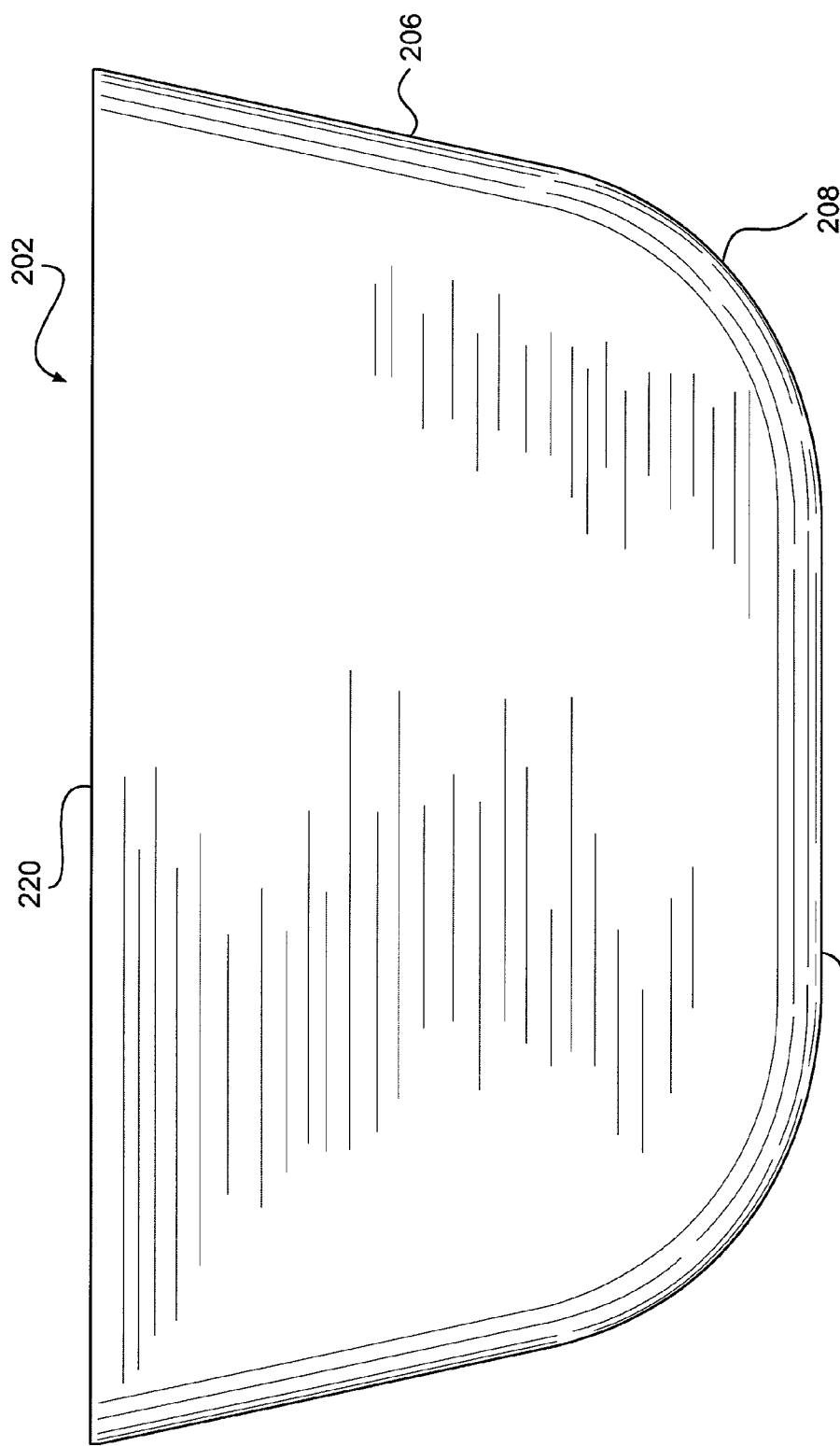

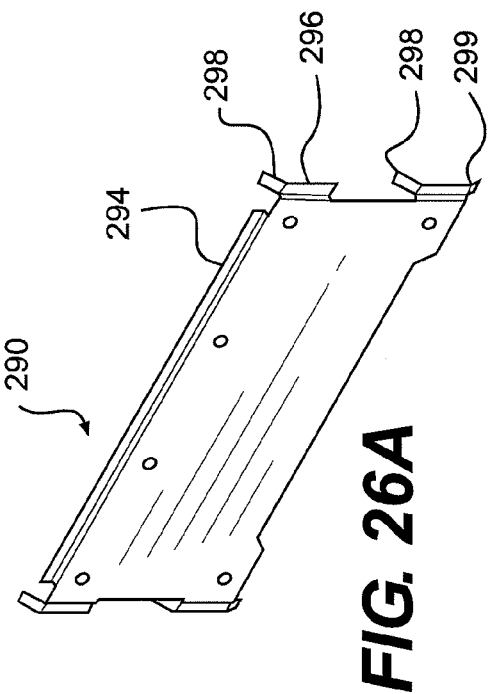
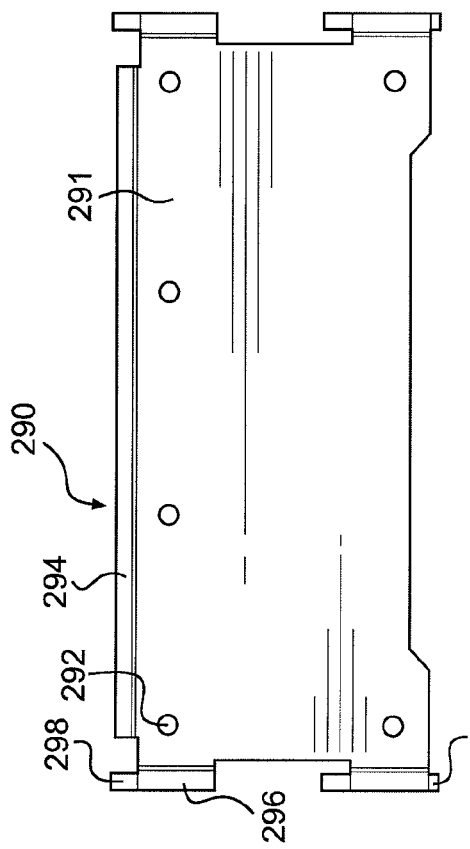
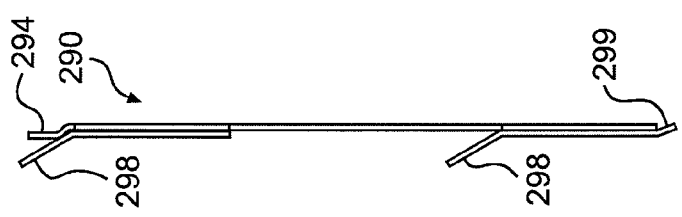
FIG. 26A
FIG. 26B
FIG. 26C

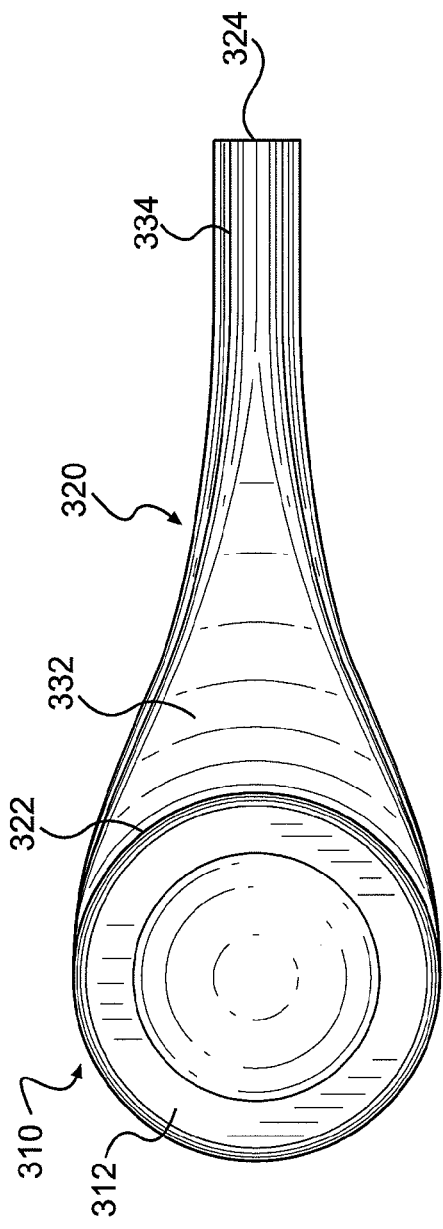
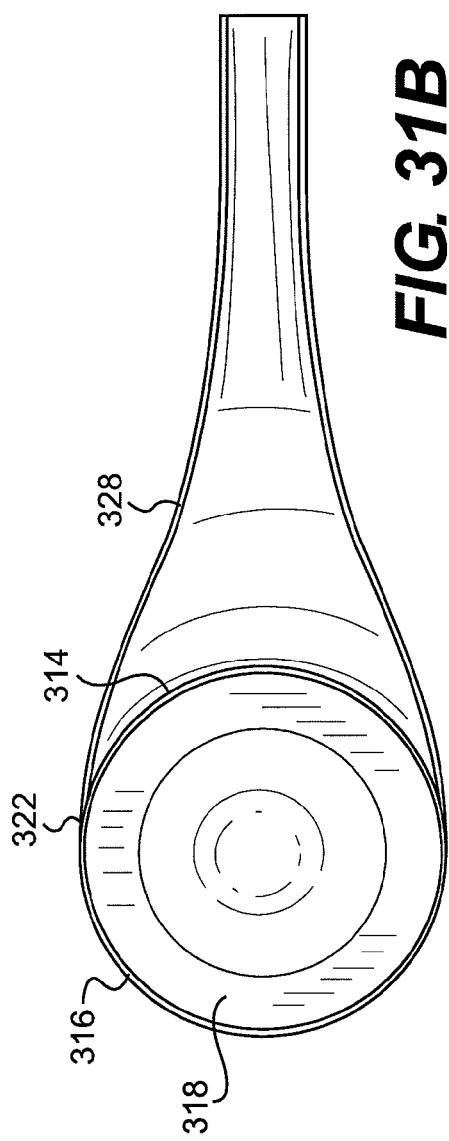
FIG. 31A
FIG. 31B

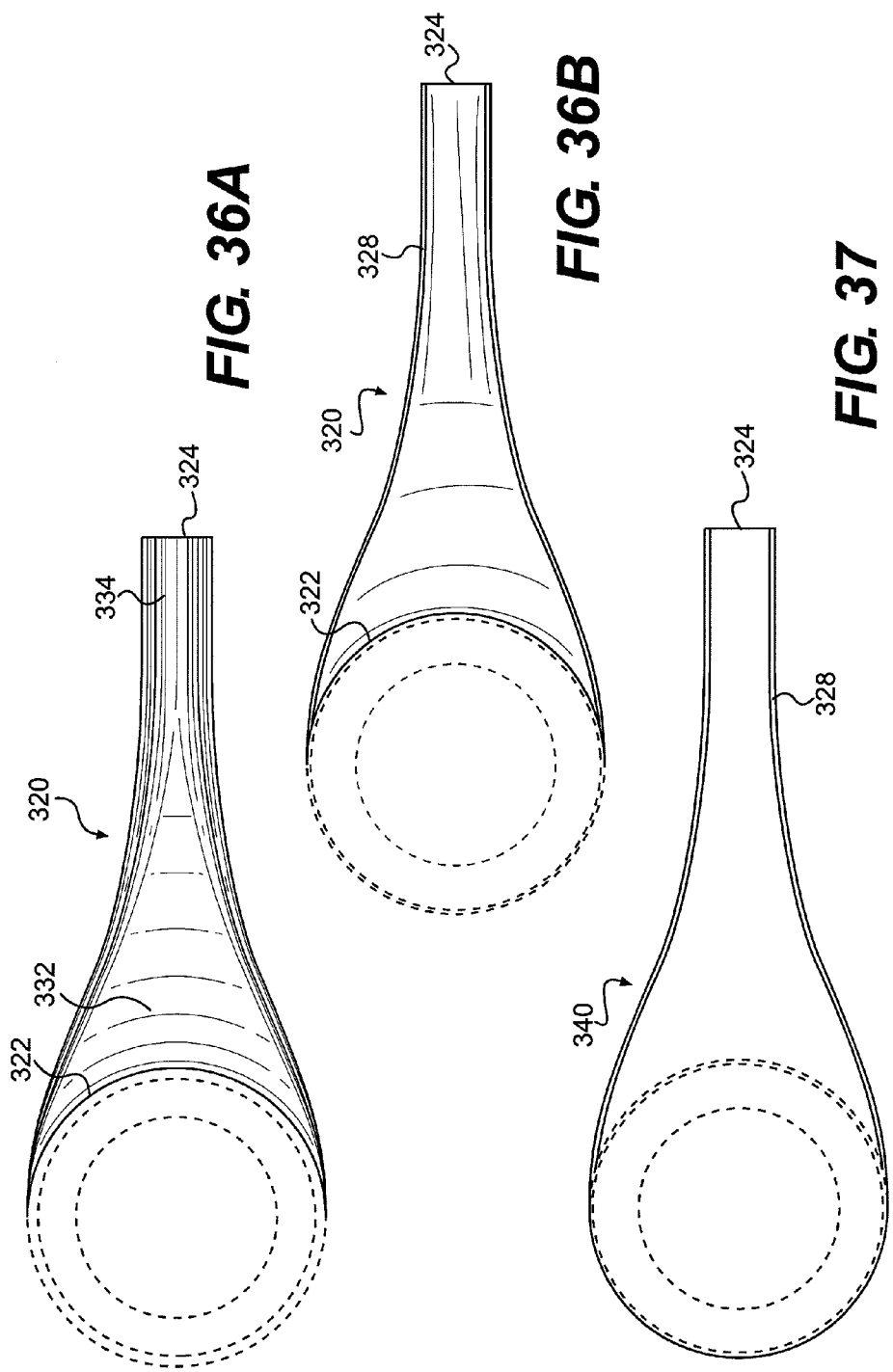

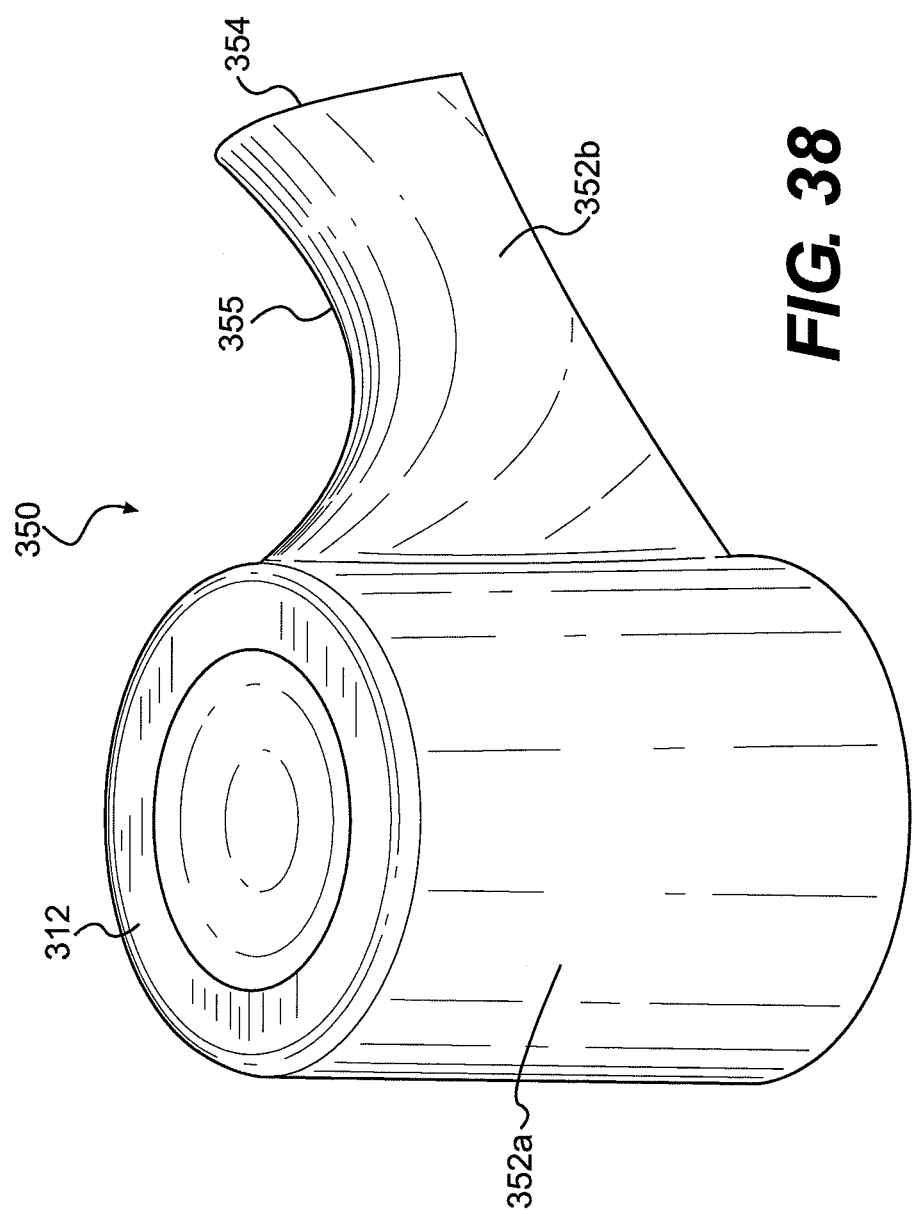

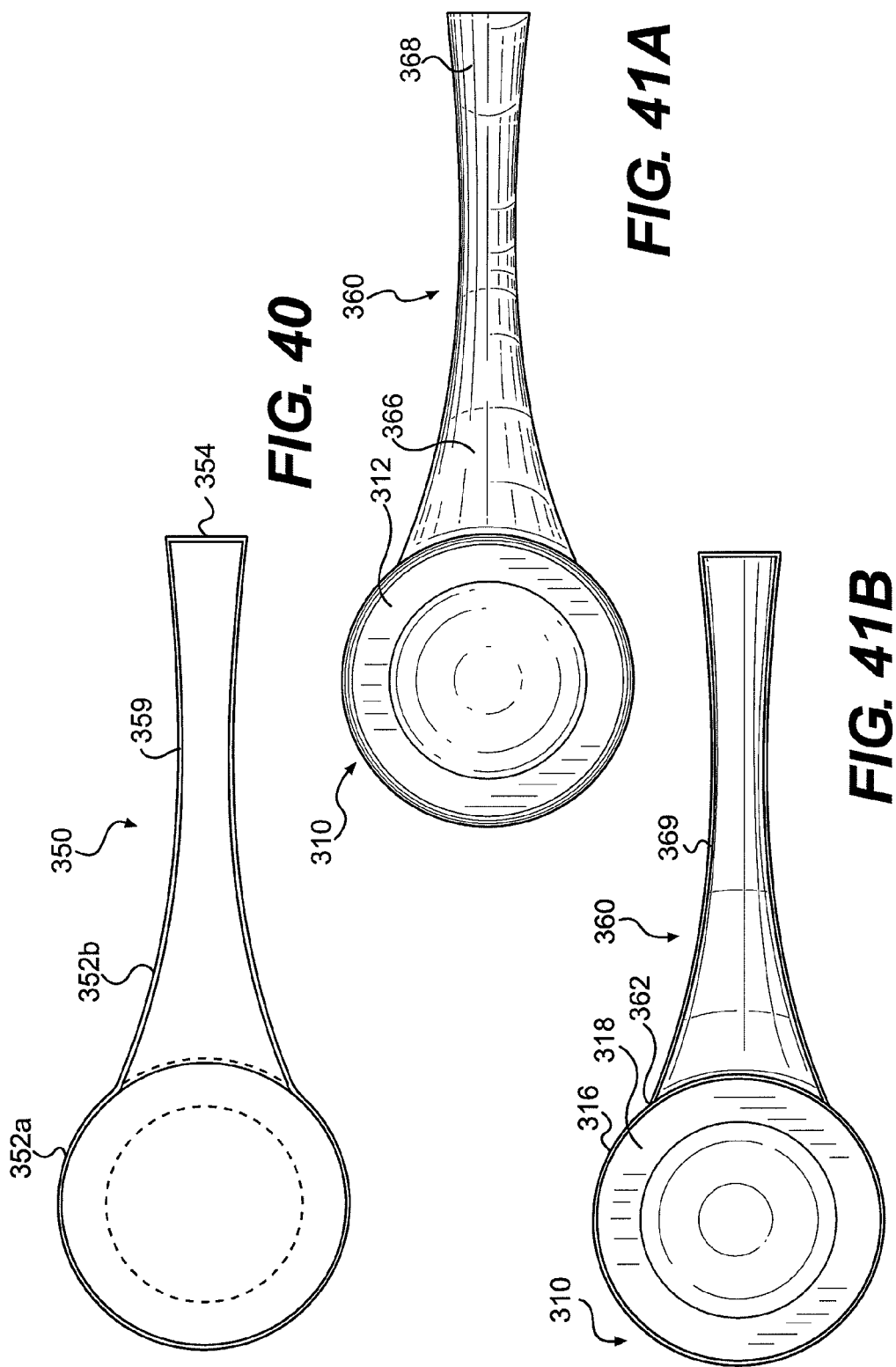

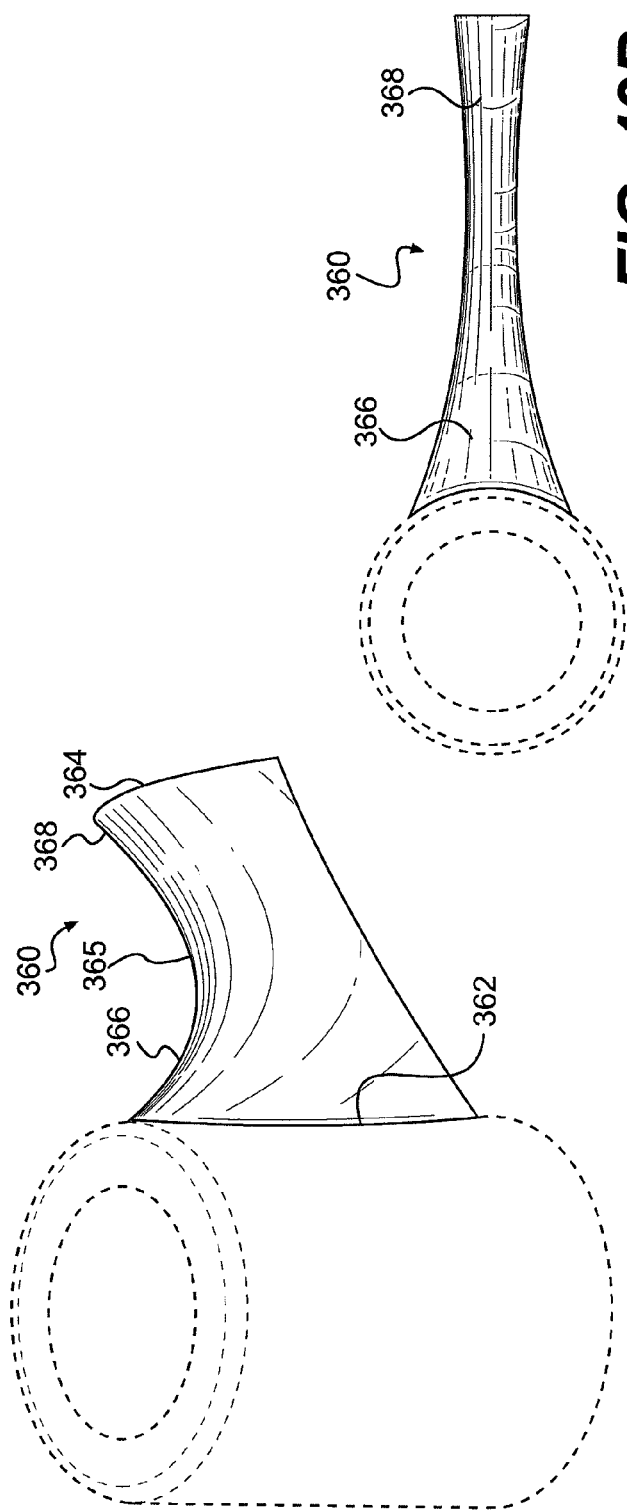

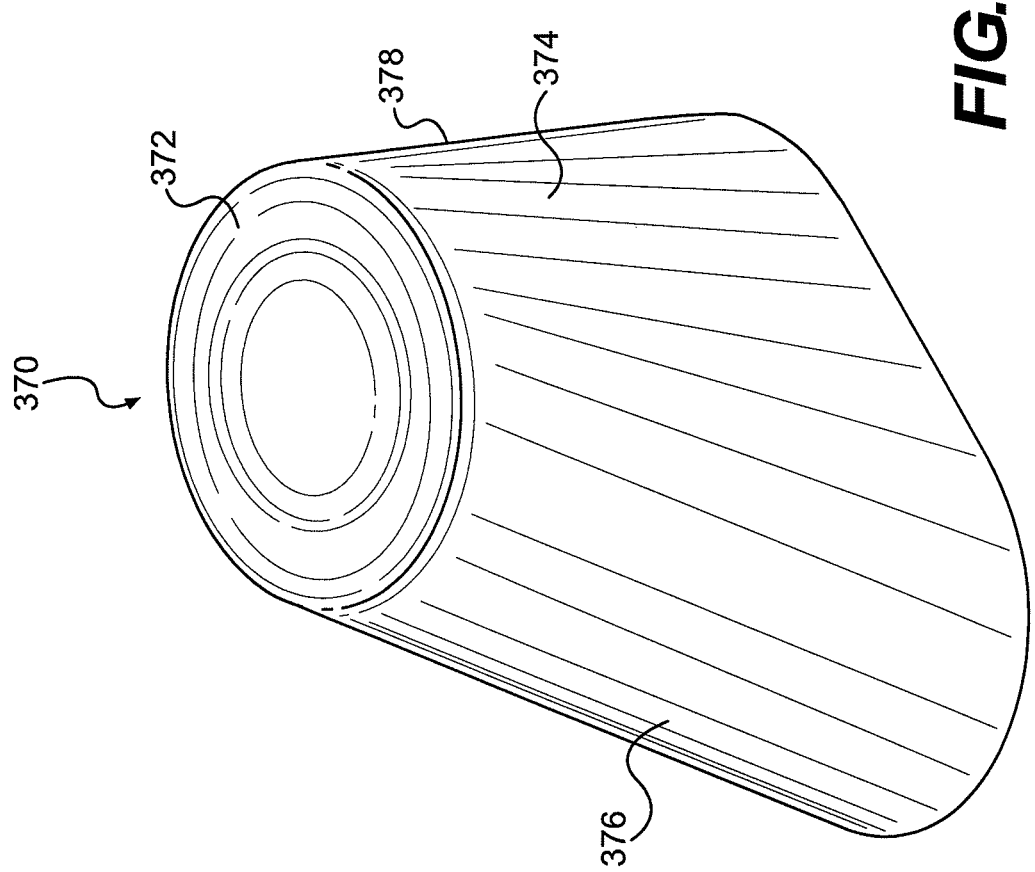

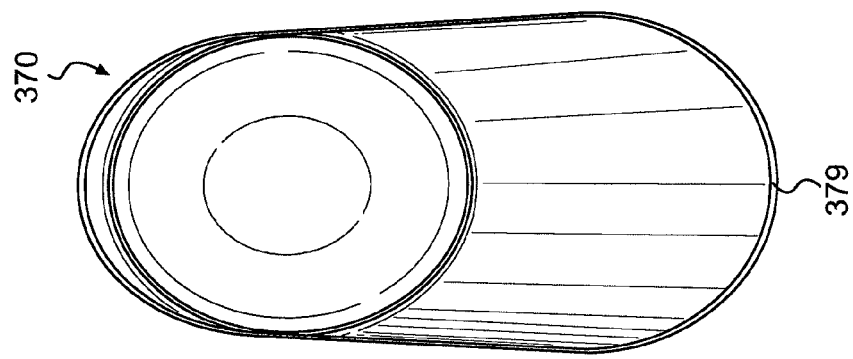
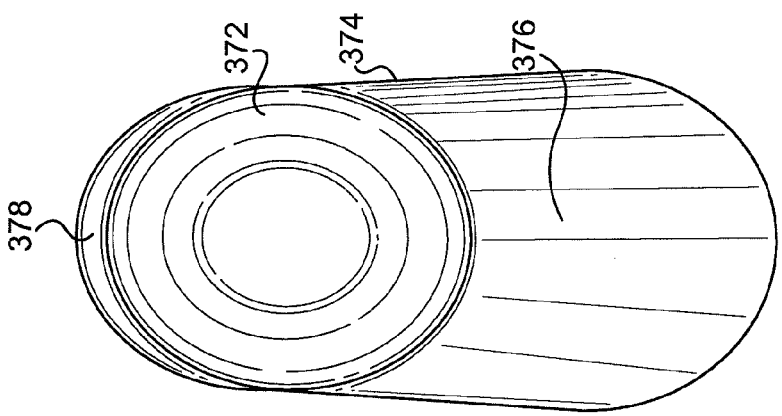
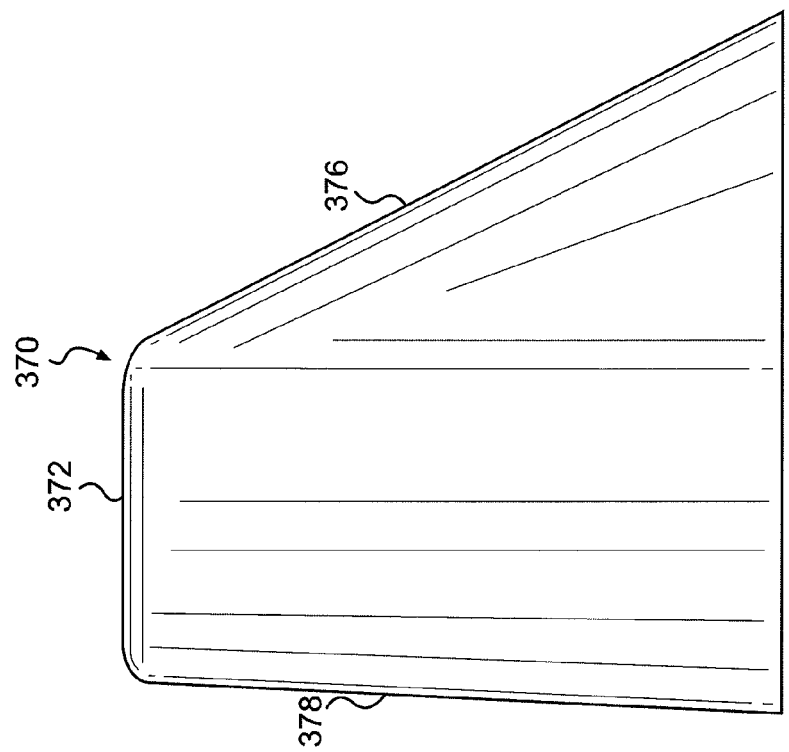

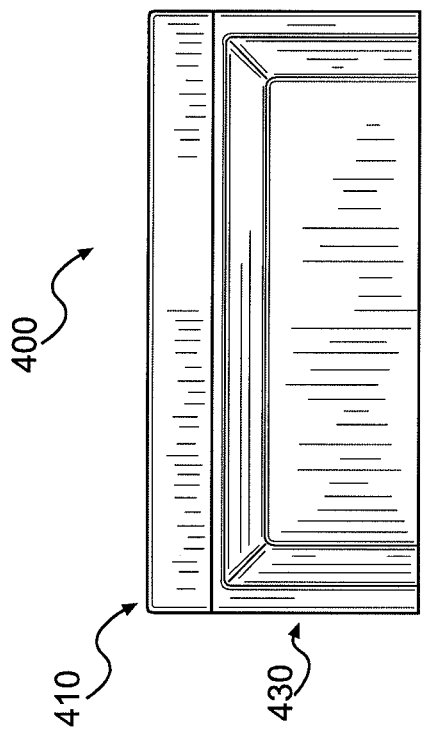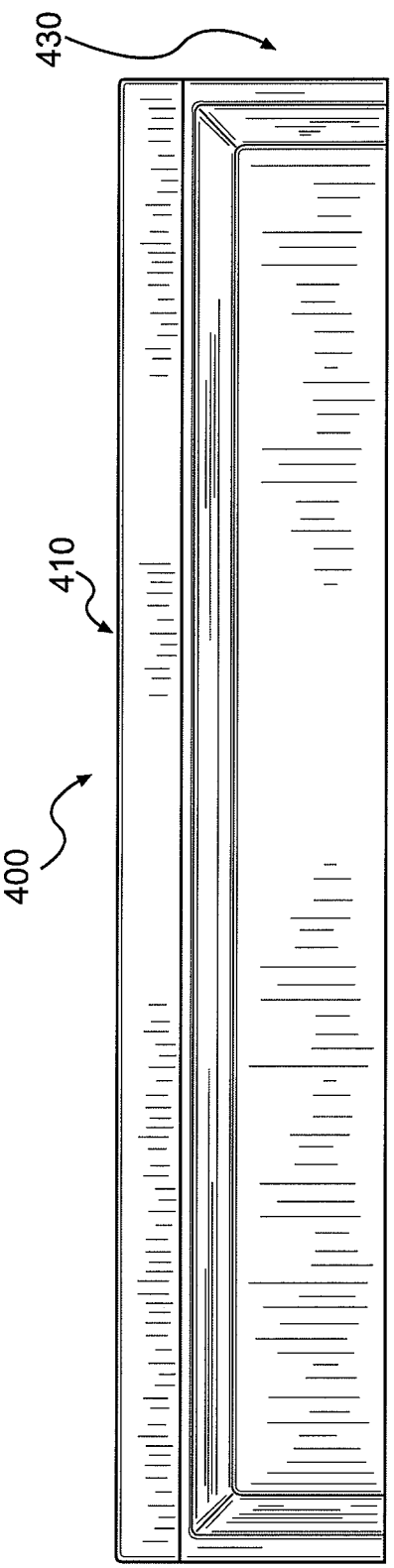

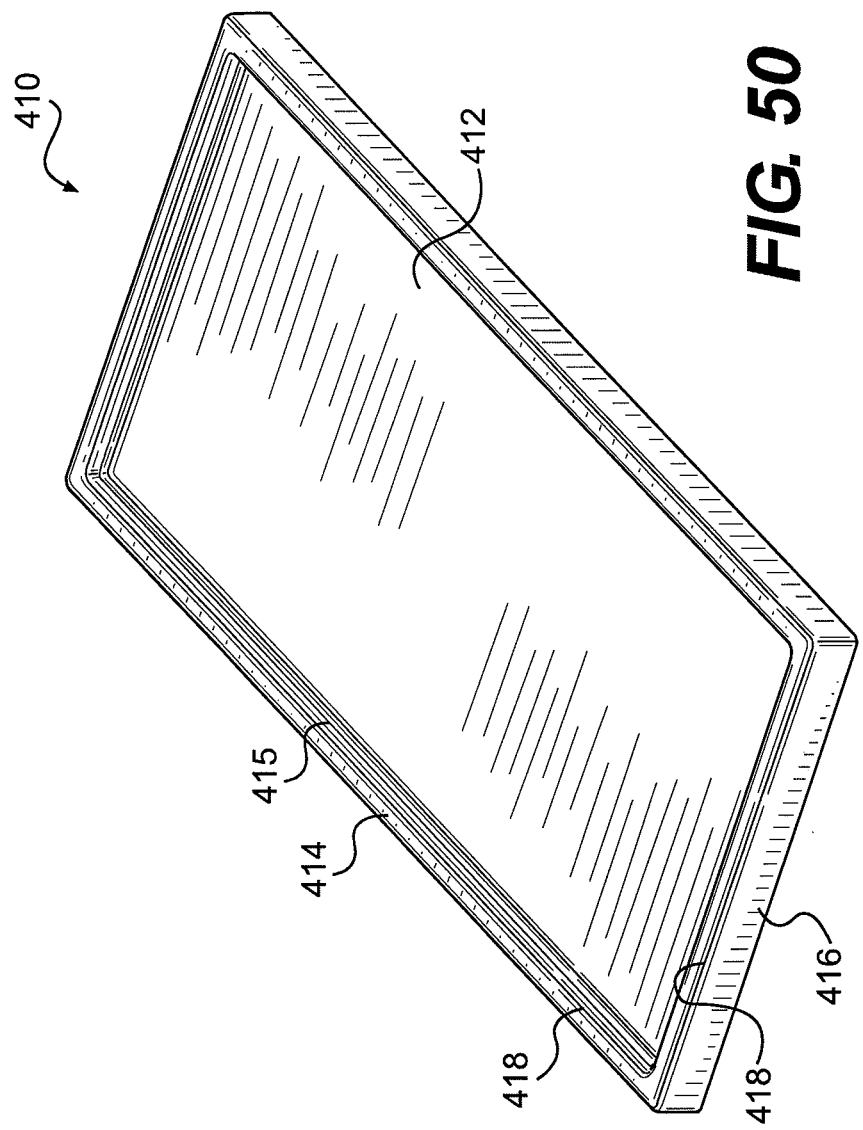

SHELVING UNIT FURNITURE

This disclosure claims benefit under 35 U.S.C. §119 of the filing date of U.S. Provisional Application No. 61/221,479 filed Jun. 29, 2009.

BACKGROUND

This disclosure is directed to molded furniture. In accordance with example embodiments presented herein, the furniture is designed in such a way so as to prevent a person, for example an inmate or patient in an institutional facility, from using the furniture as weapon or otherwise to hurt themselves, or for hiding contraband.

In environments such as a prison or institutional facilities, conventional furniture can become a liability and a hazard to those who work in, visit or are incarcerated/institutionalized in those facilities. Furniture that can be altered or from which parts can be removed presents a safety issue, as these elements may be used directly as or in the construction of weapons. Moreover, conventional furniture may provide features that facilitate tightening, around the feature, of materials used for hanging or choking. For example, a bed sheet may be wrapped around a conventional chair or portion thereof, facilitating creation of a noose that can be tightened by twisting. Further, many conventional furniture features create problems for inspection, for example by providing difficult-to-view or completely hidden areas on or in which items (e.g., contraband) can be secured. Institutional furniture created for have been unable to address all of these concerns, much less coextensively across many furniture types.

SUMMARY

In the embodiments of the present disclosure, the specific features of the furniture address these concerns, providing safety, resilience, and ease of installation. Embodiments of the furniture are disclosed having an integrally formed shell that generally has rounded features, the shell diminishing in circumference outwardly from a mounting plane defined by a mounting perimeter of the shell, and a mounting portion configured to secure the shell to a mounting surface. When the shell is secured to the mounting surface, the mounting portion is inaccessible and hidden from view. Examples of such furniture include a shelving unit, a desk unit, a seating unit, and a bed as disclosed herein.

A shelving unit consistent with the disclosure includes a shelving unit top formed to slope downward from an upper portion of the mounting perimeter of the shelving unit toward a front portion of the shelving unit; longitudinally parallel left and right shelving unit sides formed to slope toward each other from side portions of the mounting perimeter and each integrally connected to opposite ends of the shelving unit top; a shelving unit bottom formed to slope upward from a bottom portion of the mounting perimeter toward a front portion of the shelving unit and integrally connected at opposite ends of the shelving unit bottom to the left and right exterior shelving unit sides. The top, sides, and bottom of the shelving unit together form a rectangle that diminishes in circumference from the mounting perimeter to the front of the shelving unit.

One or more shelves are formed between the top, bottom and sides of the shelving unit, each shelf having a shelf top surface, a shelf back wall, a shelf left-side wall, a shelf right-side wall, and a shelf bottom surface that together define a shelf volume with a generally rectangular transverse vertical cross-sectional area that grows in size from the shelf back wall toward the front of the shelving unit. The left-side and right-side shelf walls are angled away from each other away from the shelf back wall, and the shelf top surface is angled upward away from the shelf back wall. Each shelf back wall is formed nearly coplanar with a plane defined by the mounting perimeter.

A desk includes a substantially flat top surface extending from a first width at a mounting side to a narrower second width of a front of the top surface. A bullnose edge portion is integrally formed with a non-mounting perimeter portion of the top surface. A bottom portion is integrally formed with a bottom of the bullnose edge and tapers inward from sides of the top surface while tapering downward toward the mounting wall from the front of the top surface. A shell rear has support ribs formed thereon and is configured to receive a mounting frame.

The mounting frame includes a substantially flat top support having the approximate shape of the shell's top surface and a framework affixed to and providing structural support for the top support and providing the mounting portion for attachment to the mounting wall.

A seating unit includes a seat portion having a generally cylindrical portion closed at a top end by a circular seat portion integrally formed therewith. A cylinder-seat junction is generally rounded in a bullnose, and the cylindrical portion has an open bottom end configured to securely engage a mounting strap for securing the stool to a floor surface. A wall-attachment portion has a seat attachment end configured for attachment to a side of the seating portion from the top end to the bottom end, the wall-attachment portion gradually sloping downward from the seat attachment end toward a wall-attachment end and gradually sloping inward at sides of the wall-attachment portion toward a longitudinal centerline thereof from the seat attachment end.

A bed unit includes a generally rectangular mattress pan having a generally flat mattress pan base integrally formed with a beveled upward-sloping perimeter wall. The upward-sloping perimeter wall of the mattress pan base forms the inside of a perimeter rail, which also has a vertical outer perimeter wall that extends from a rail top to a level below the mattress pan base. A floor-standing base is configured to receive and support the mattress pan. The floor-standing base includes a base wall with four vertically oriented sides forming a rectangular wall and has a top perimeter with dimensions substantially similar to the mattress pan. Each side of the base wall includes a longitudinally-centered recess extending inwardly along a majority of the length of the corresponding base wall, and each recess has at three sides a bevel connecting a vertical recess wall with the base wall. The floor standing base also includes a floor-mount flange integrated with bottom portions of the base walls and recess walls and extending uniformly inward along a bottom perimeter of the floor standing base.

Further scope of applicability of the present disclosure will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus are not limitative of the present invention, and wherein:

FIG. 9A is a detail cutaway view of the underside near the bottom of a Shelving Unit consistent with some embodiments disclosed herein;

FIG. 9B is a detail cutaway view of the underside near the top of a Shelving Unit consistent with some embodiments disclosed herein;

FIG. 10 is a detail cutaway view of the underside near the bottom of a Shelving Unit consistent with some embodiments disclosed herein;

FIG. 12A is a detail cutaway view of the underside near the bottom of a Shelving Unit and attachment portions consistent with some embodiments disclosed herein;

FIG. 12B is a detail cutaway view of the underside near the top of a Shelving Unit and attachment portions consistent with some embodiments disclosed herein;

FIGS. 21B and 21C are top/plan views of a Desk Unit according to alternative embodiments disclosed herein;

FIGS. 26A, 26B, and 26C are top front perspective, rear, and side views of an alternate mounting frame for a Desk Unit consistent with some embodiments disclosed herein;

FIG. 31A is a top/plan view of a Seating Unit consistent with some disclosed embodiments;

FIG. 31B is a bottom view of the Seating Unit of FIG. 31a;

FIG. 36A is a top/plan view of the Stool-Wall attachment portion of FIGS. 33-35;

FIG. 36B is a bottom view of the Stool-Wall attachment portion of FIGS. 33-36A;

FIG. 37 is a bottom plan view of a Seating Unit consistent with another disclosed embodiment;

FIG. 38 is a top perspective view of a Seating Unit consistent with another disclosed embodiment;

FIG. 40 is a bottom view of the Seating Unit of FIGS. 38-39;

FIG. 41A is a top/plan view of a Seating Unit including a Stool and Stool-Wall attachment portion consistent with disclosed embodiments;

FIG. 41B is a bottom view of the Seating Unit of FIG. 41A, including a Stool and Stool-Wall attachment portion consistent with disclosed embodiments;

FIG. 42A is a top perspective view of the a Stool-Wall attachment portion consistent with disclosed embodiments;

FIG. 42B is a top/plan view of the Stool-Wall attachment portion of FIG. 42A;

FIG. 42C is a bottom view of the Stool-Wall attachment portion of FIGS. 42A, 42B.

FIG. 43 is a top perspective view of a floor-mounted Seating Unit consistent with disclosed embodiments;

FIG. 44A is a side view of the floor-mounted Seating Unit of FIG. 43;

FIG. 44B is a top/plan view of the floor-mounted Seating Unit of FIG. 43;

FIG. 44C is a bottom view of the floor-mounted Seating Unit of FIG. 43;

FIG. 48 is an end view of the floor-mountable Bed Unit of FIG. 47;

FIG. 49 is a side view of the floor-mountable Bed Unit of FIG. 47;

FIG. 50 is a front top perspective view of a mattress pan portion of the floor-mountable Bed Unit consistent with some disclosed embodiments;

DETAILED DESCRIPTION

Figure 1:
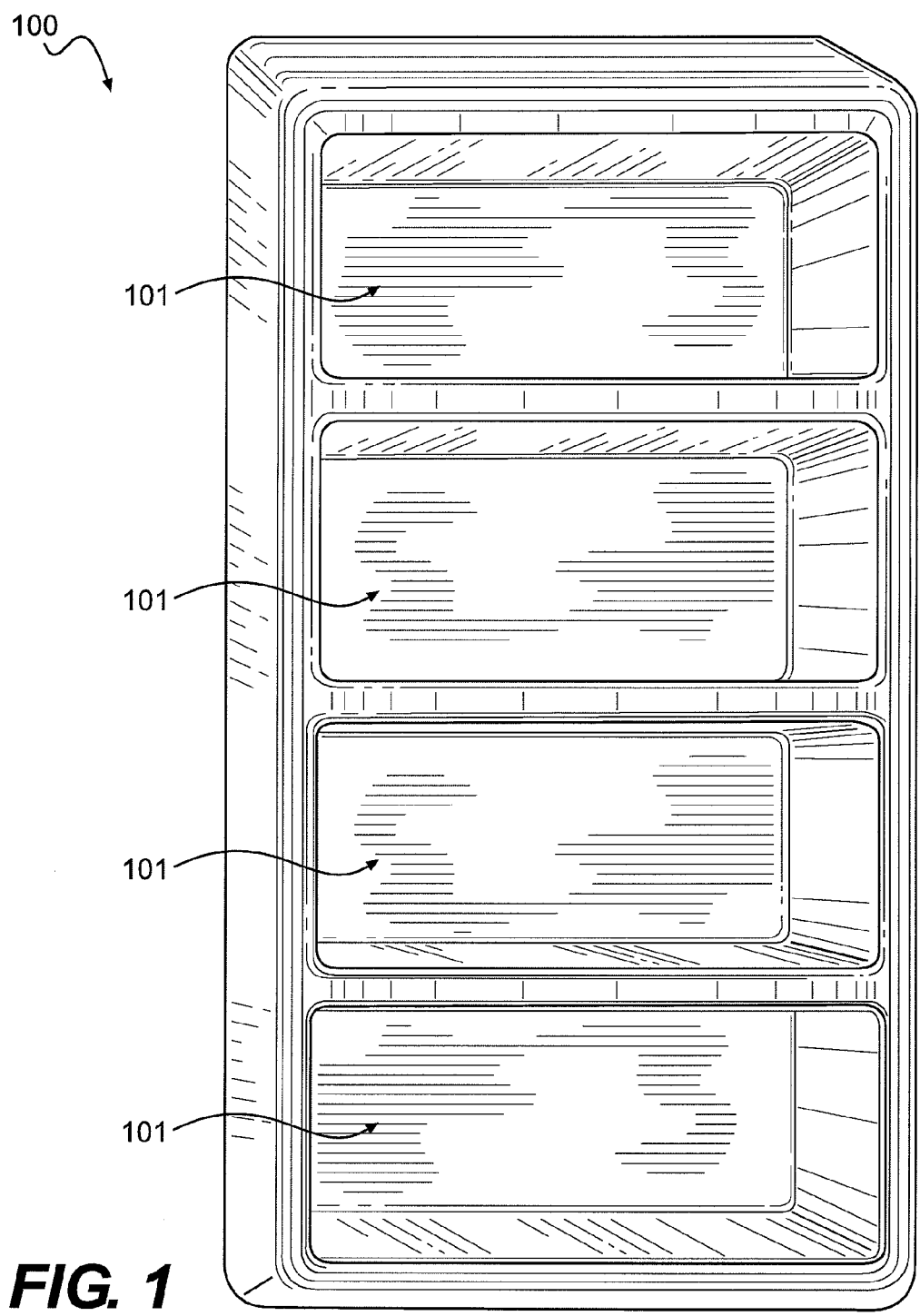
FIG. 1 is a perspective view of a Shelving Unit consistent with some embodiments disclosed herein.

The following detailed description refers to the accompanying drawings. The same reference numbers in different drawings identify the same or similar elements. Also, the following detailed description does not limit the invention. Instead, the scope of the invention is defined by the appended claims and equivalents thereof.

Disclosed embodiments include shelving units, desks, stools, and beds; however, common features are not limited to these embodiments and may be applied in the design of other types of furniture. Additionally, specific examples are disclosed wherein the furniture is intended for use in correctional facilities. However, the furniture is not limited to such use, and may be applied in any furniture setting, and particularly to settings wherein safety of the user is of concern.

All of the furniture discussed herein may be molded from a material that is highly fire retardant, and may when burned have properties of low smoke, low toxicity and low flame. Such properties may prevent a person from burning the furniture and further may reduce the risk of smoke and fume inhalation. The construction material may, for example, include a fiberglass reinforced polymer using a thermal or other setting resin. The furniture may be molded by several methods including but not limited to hand lamination, resin transfer molding using male and female molds wherein the resin is injected into the mold, sheet molding compound by press molding with male and female dies, full mold casting (FMC) molding process, etc.

Each furniture article generally shares physical properties of blunt features and inaccessible mounting hardware when properly installed. The shelving unit, desk, and stool further share a feature in which the article narrows in one or more aspects in a direction away from a mounting surface. Such narrowing is intended to prevent a noose, cord, sheet, etc. from being tightened around a portion of the furniture for choking or hanging; as the noose/etc. is tightened, it will slip toward narrower portions of the furniture article and will eventually slide off the furniture to prevent the intended harm. Further, each article may be securely attached to a wall and/or floor in part to prevent its use as a weapon. Further still, the means for attaching the furniture to a mounting surface is in most embodiments inaccessible once properly installed.

Shelving Unit

FIGS. 1-13 depict a plurality of example embodiments of a shelving unit 100. The shelving unit 100 may be formed in different heights and/or widths accommodating one or more shelf portions 101, i.e., two, three, four five, etc., and may be installed by affixing the shelving unit 100 to a wall of a prison cell or other institutional holding area, for example. Due to the properties discussed herein and as shown in the related figures, the shelving unit 100 is extremely difficult to remove from a wall, thereby preventing an inmate or patient from removing the shelving unit from the wall and, for example, using the shelving unit as a weapon against another. In general, the shelving unit is constructed to have no exposed sharp corners when installed. Thus, all exposed edges/corners have a bullnose shape. It will be appreciated that at least one of the features discussed with one embodiment may be present in another embodiment.

The shelving unit has one or more integrated shelf portions 101 as shown in FIG. 1. Each shelf portion 101 may taper inward into the shelf area toward the wall on one or more sides. (I.e., a front width of the shelf may have a larger dimension than a rear width of the shelf.) Wall-facing portions of the shelving unit forming a back shelf wall 106 in FIG. 2 between shelf portions 101 may, when installed, have an adhesive applied thereto so that when the shelving unit is installed by hanging on a wall, the back shelf wall portion(s) 106 of the shelves may adhere to the supporting wall. I.e., the shelving unit may be bonded to the wall to provide additional support for the shelf so that it may be more difficult to remove the shelving unit from the wall.

The shelving unit may, in some embodiments, have no mounting components, e.g., bolts, that are accessible from the front or side of the shelving unit, providing a tamper-proof shelving unit that is difficult to remove.

Figure 2:
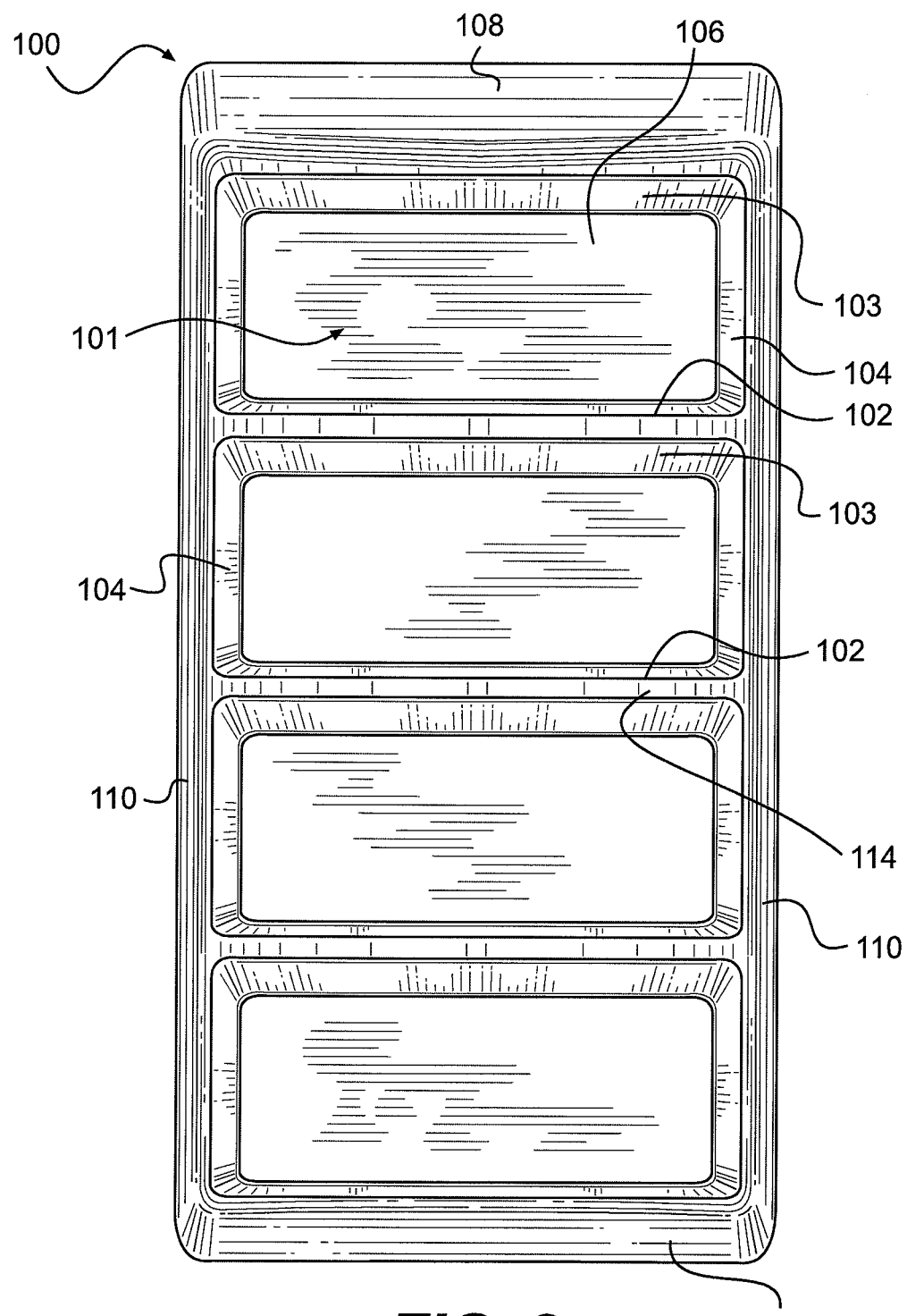
FIG. 2 is a front view of a Shelving Unit consistent with some embodiments disclosed herein.

FIGS. 1 and 2 illustrate an embodiment having four integrated, equally-spaced shelf portions 101, although the shelves need not be equally spaced. Each shelf space includes the shelf space bottom 102, a shelf space top 103, left and right shelf space side walls 104, and a shelf space back wall 106. Each of the shelf space portions are integrally formed together with the rest of the shelving unit. As best seen in the top and bottom views in FIGS. 5 and 6, a front portion 114 of the shelving unit is bowed outwardly (in the figures, toward the top of the page). When the shelving unit is properly installed, the shelf space bottom 102 is substantially parallel to the floor and provides an area roughly rectangular on side and rear edges with the front edge bowing outward at 114. The shelf space top 103 is similarly shaped, but slopes downward from the shelving unit's front portion 114 to the shelf space back wall 106. This configuration aids quick inspection of shelf contents even has a rear portion of the shelf. The shelf side walls 104 and back wall 106 are substantially vertical with side walls 104 being angled inward from the front of the shelving unit toward the back.

Figure 4:
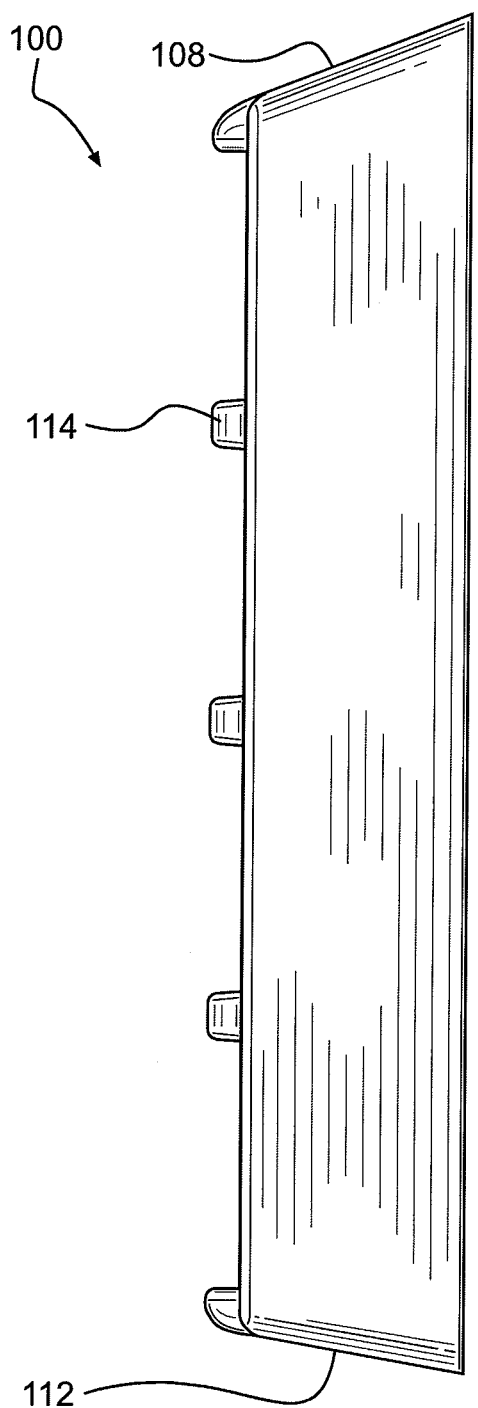
FIG. 4 is a side view of a Shelving Unit consistent with some embodiments disclosed herein.
Figure 5:
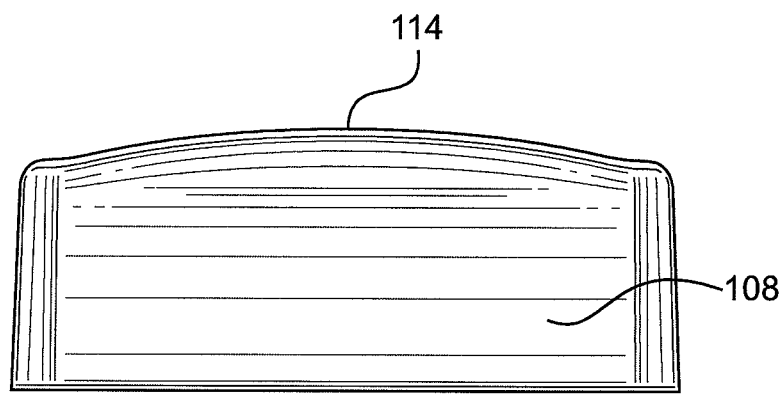
FIG. 5 is a top view of a Shelving Unit consistent with some embodiments disclosed herein.
Figure 6:
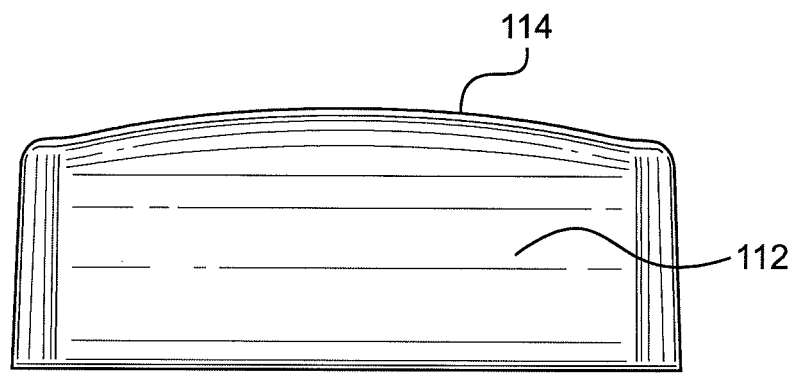
FIG. 6 is a bottom view of a Shelving Unit consistent with some embodiments disclosed herein.

The top 108 of the shelving unit 100, as depicted in FIG. 4, may slope downward toward the front portion 114 of the shelving unit. This arrangement may prevent or discourage someone from stepping on the top 108 of the shelving unit in an attempt to dislodge it from the wall, may prevent hiding things (e.g. contraband) on the top of the shelving unit, and/or may prevent wrapping cloth/cord/wire or other material around a portion of the shelving unit for purposes of hanging a person. Similarly, the shelving unit bottom 112 is angled downward from the front portion 114 toward the mounting wall.

Figure 3:
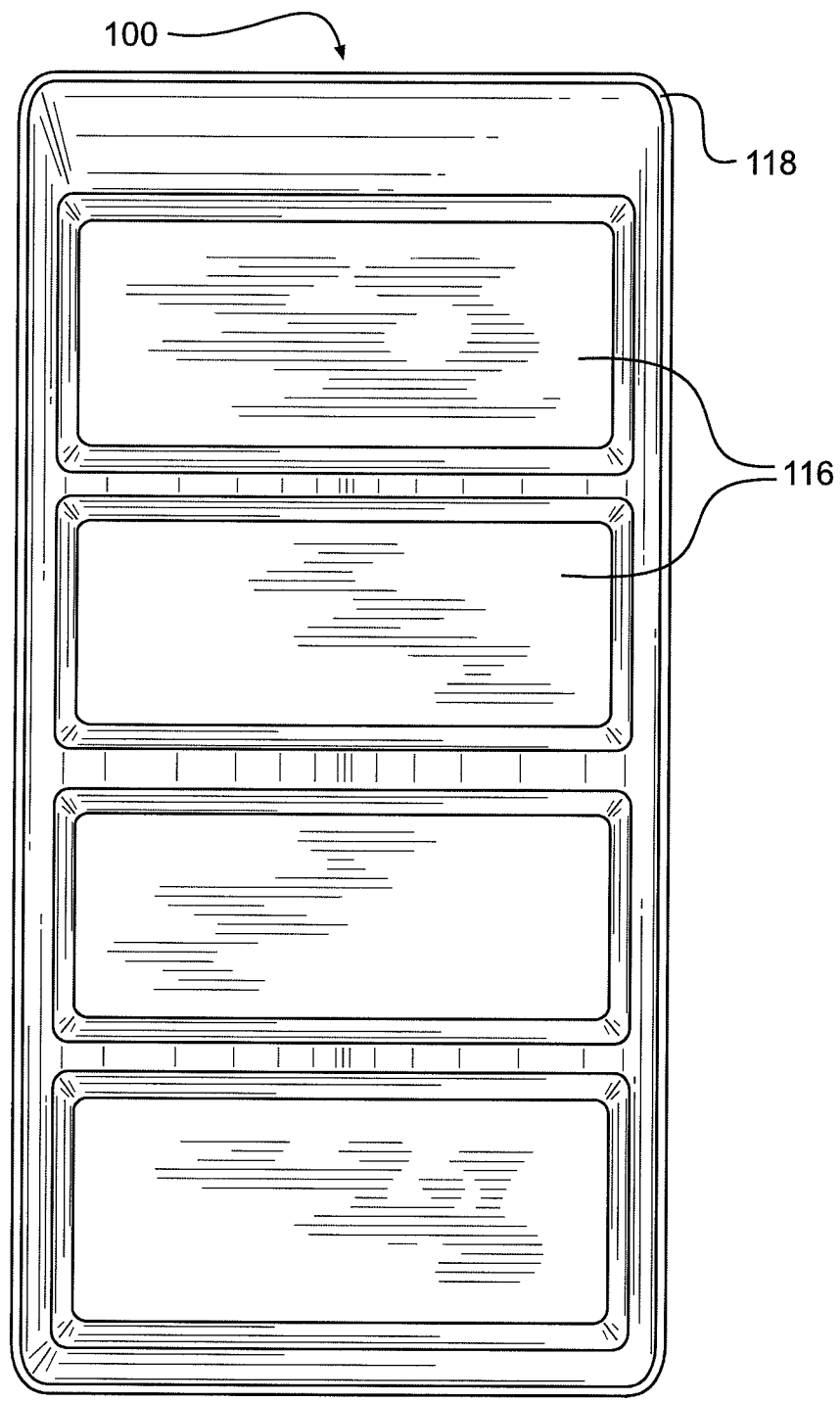
FIG. 3 is a rear view of a Shelving Unit consistent with some embodiments disclosed herein.

FIG. 3 illustrates the back of the shelving unit 100. The rear face 116 of shelf back wall 106 and rear edge/perimeter 118 of the shelving unit are utilized in installation of the shelving unit. Each shelf back wall 106 is formed not-quite-coplanar within near the mounting plane defined by perimeter 118 to accommodate mounting on walls that are not perfectly flat. For example, each back wall 106 may extend within about $1/16"$ of the mounting plane. Further, perimeter 118 may be trimmed during installation to accommodate irregularities in the mounting wall. In another embodiment (not shown), each shelf back wall 106 may extend slightly beyond the mounting plane.

Installation of the shelving unit may include application of an elastomeric adhesive to the rear face 116 of shelf back wall 106. Each shelf back wall 106 is then pressed against the mounting wall, thereby bonding the shelving unit to the wall. Once the shelving unit is hung on the wall and back portions of the shelving unit are adhered to the wall, the outer perimeter 118 may be caulked with a rigid, nonporous caulk, for example with a $3/8"$ bead of epoxy, so that no access to any portion of the back of the shelving unit remains once the shelf is bolted, bonded to the wall, and caulked.

The back of the shelving unit 100 may include one or more mounting portions, wherein the shelving unit may be mounted to a wall by suspending it, at one or more positions, from a clip that is secured to the wall by an anchor 136 or from the anchor itself. The mounting portion may be integrally formed with the shelving unit.

FIGS. 7-12 include various embodiments of a mounting portion for mechanically attaching the shelving unit to a wall. In some of the figures anchors 136, bolts 139, and clips 134, 154, 174 are illustrated for clarity, although embodiments of shelving unit 100 do not necessarily require such hardware. Anchors and bolts 136, 139 are illustrated as hex-head; other configurations may be applied, however.

Figure 7:
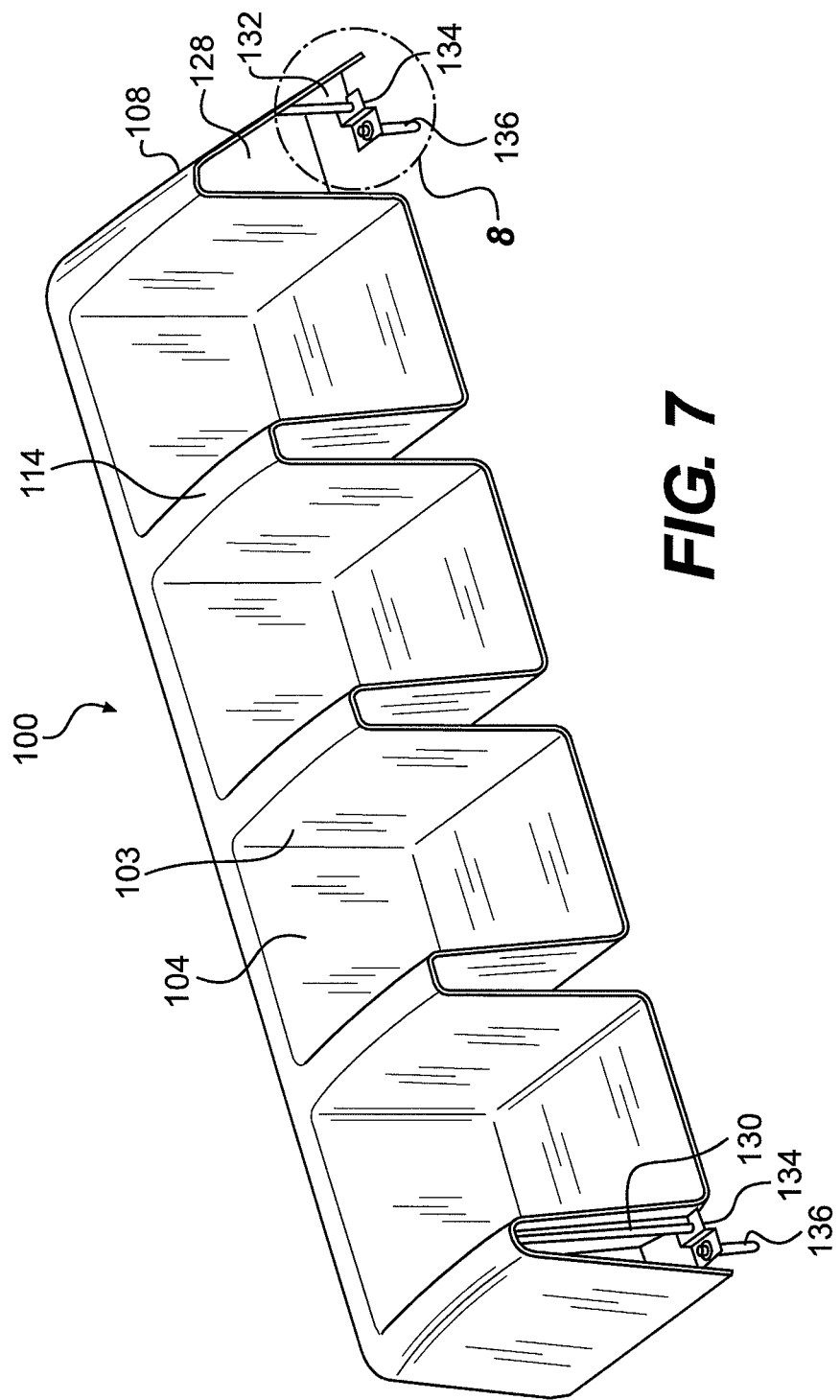
FIG. 7 is a perspective section view of a Shelving Unit consistent with some embodiments disclosed herein.

FIG. 7 is cut away near a center line of the shelving unit and shows lower attachment boss 130 and upper attachment boss 132 integrally formed at center portions of shelving unit bottom 112 and shelving unit top 108, respectively. In some embodiments, bosses 130 and 132 may be configured to securely receive a bolt 139.

Figure 8:
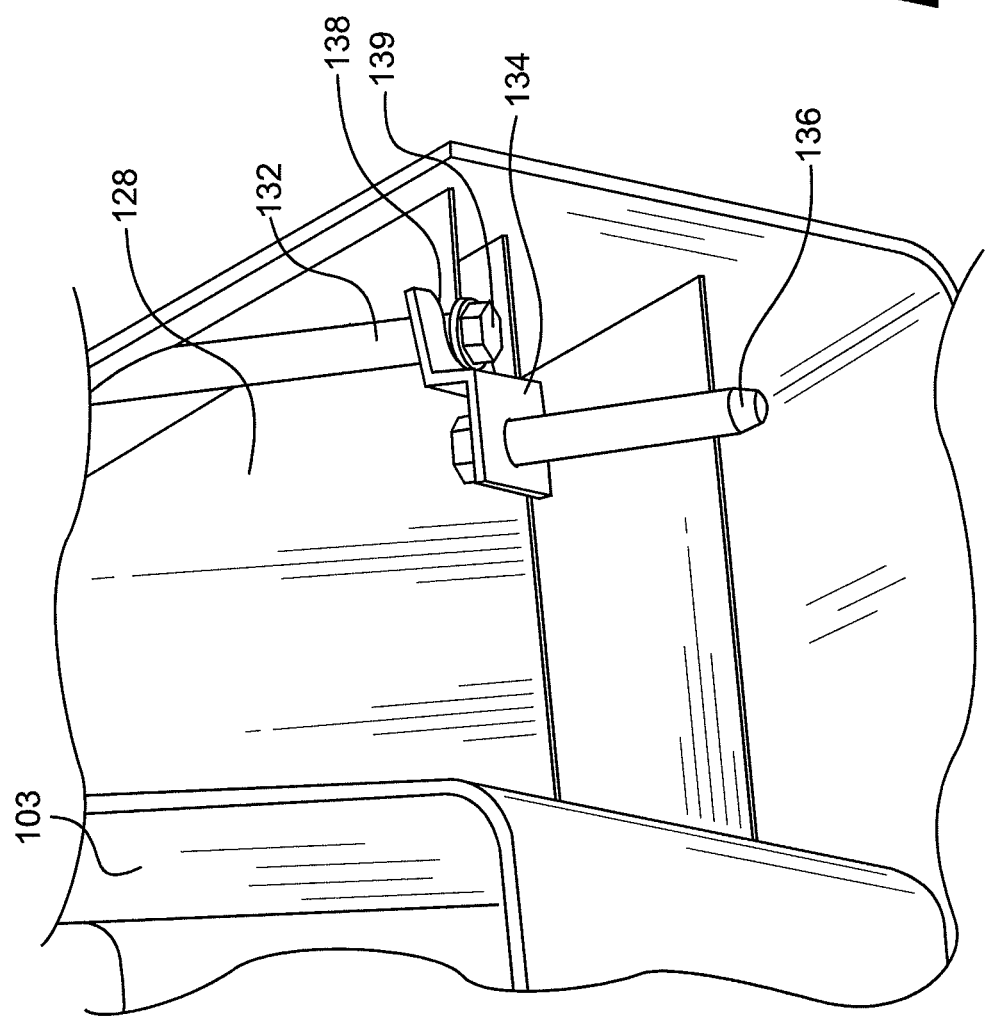
FIG. 8 is a detail cutaway view of the underside near the top of a Shelving Unit consistent with some embodiments disclosed herein.

During installation of some shelving unit embodiments, a hole is created in a mounting wall by which a hanging clip 134 is attached with a wall anchor 136. FIG. 8 shows the arrangement in more detail. Hanging clip 134 may be generally Z-shaped, one end having a hole for the anchor and the other end having a tapered slot 138 for receiving boss 132 and bolt 139. A flange of bolt 139 presses against the tapered slot end of the hanging clip 134. The anchor end of mounting clip 134 is configured to fit flush against the mounting wall, while the tapered slot end is configured to angle outward from the mounting wall. This arrangement eases installation and pulls the shelving unit 100 tightly against the mounting wall of the boss 130, 132 and bolt 139 settle into the tapered slot 138.

FIG. 8 also illustrates structural support ribs 128 positioned between exterior walls and interior structures (e.g., rear portions of each shelf) at the rear of the shelving unit to increase rigidity and reduce flex. See also FIGS. 12A, 12B, 13.

Figure 9:
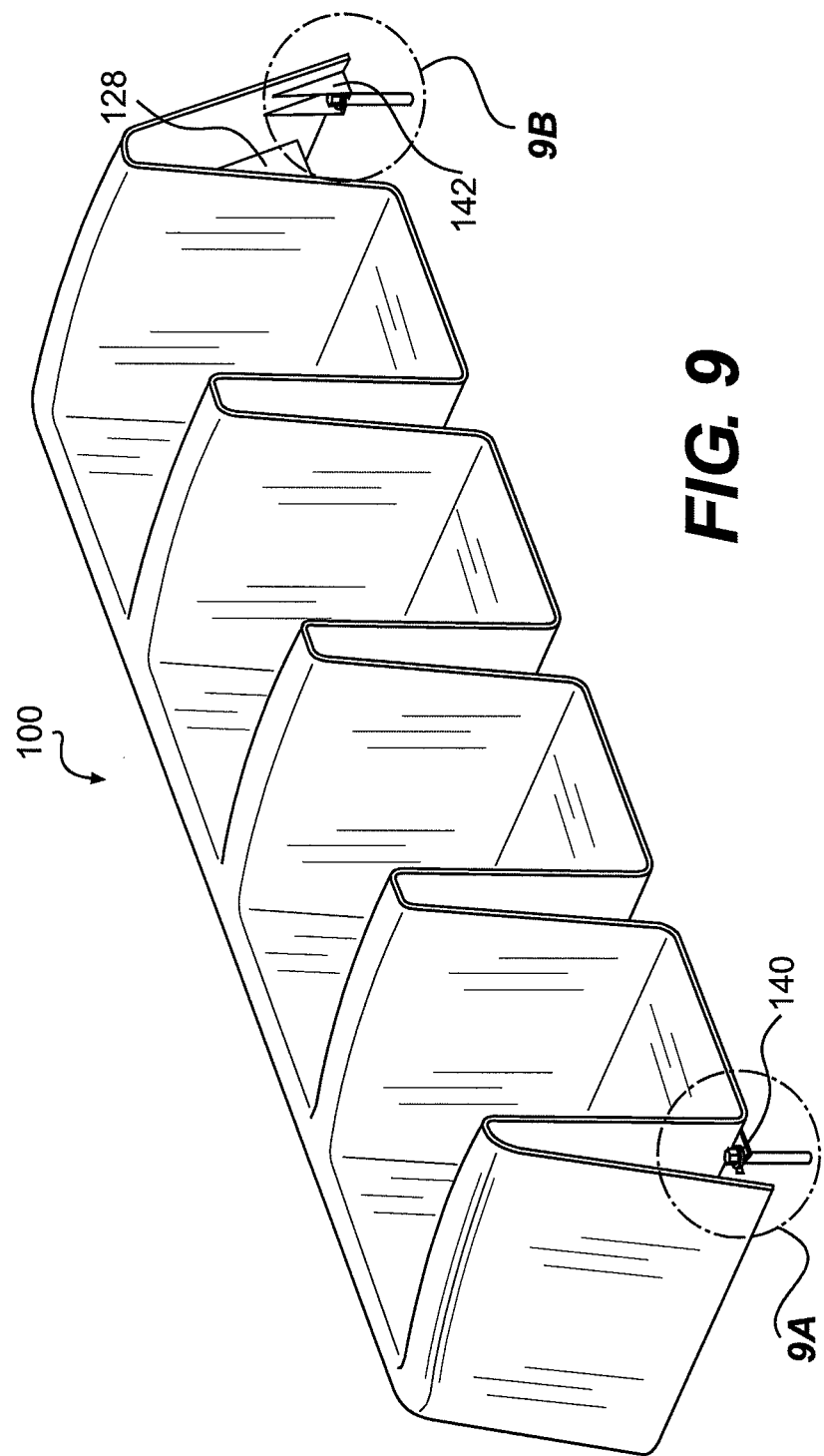
FIG. 9 is a perspective cutaway view of a Shelving Unit consistent with some embodiments disclosed herein.
Figure 11:
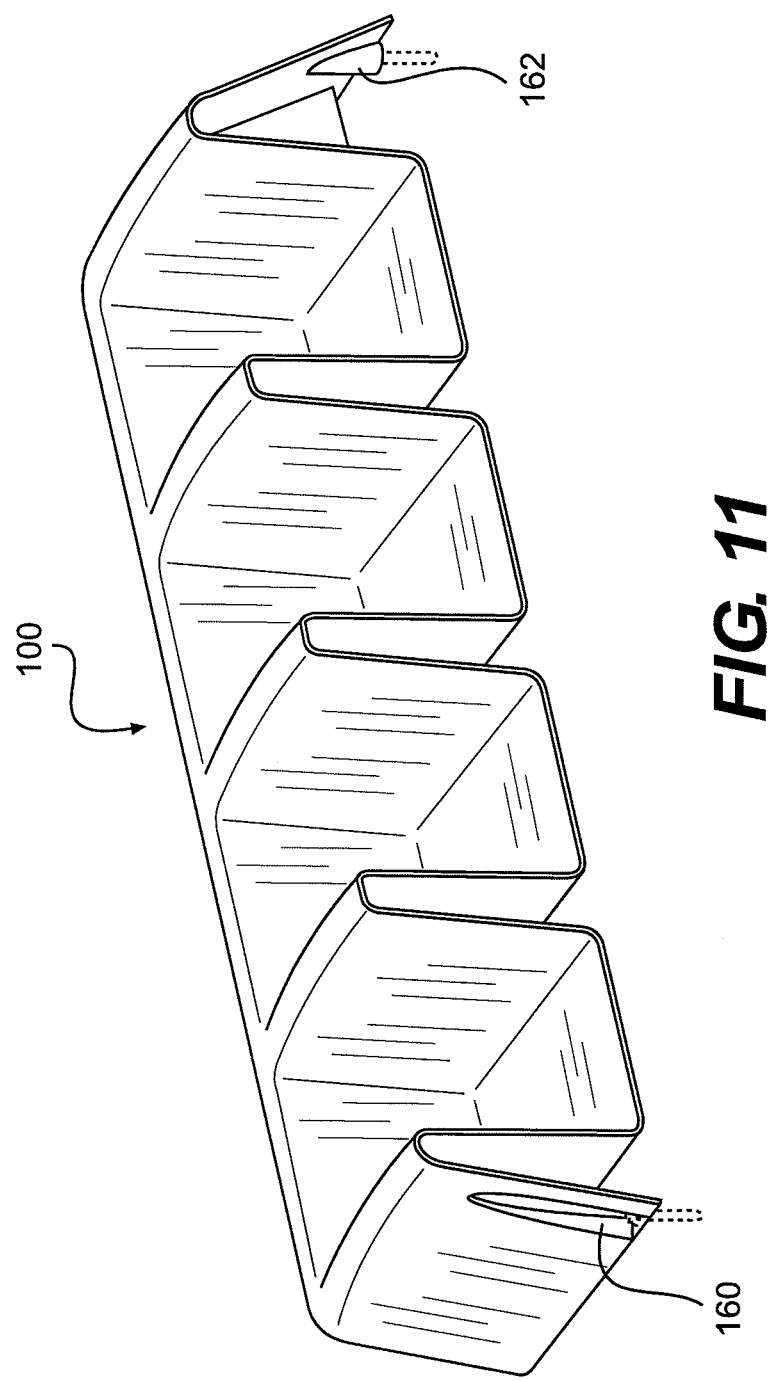
FIG. 11 is a perspective cutaway view of a Shelving Unit consistent with some embodiments disclosed herein.

Alternatively, as illustrated in FIGS. 9, 9A, and 9B, shelving unit 100 may include at least one lower attachment tab 140 and at least one upper attachment boss/slot 142 integrally formed with the shelving unit. In this embodiment, all anchors 136 may engage directly with upper and lower attachment tabs and bosses/slots without need for hanging clips or bolts. Alternatively, as shown in FIG. 10, an upper attachment boss/engagement portion may have a cross-member configured to engage a slotless hanging clip 154. The slotless hanging clip 154 is identical to hanging clip 134 except for the exclusion of tapered slot. That is, the end of the hanging clip 154 not having an anchor hole has a straight, non-slotted edge.

In yet another embodiment, shelving unit 100 may include exterior-accessible attachment recesses 160, 162. A lower attachment recess 160 is formed in shelving unit bottom 112 having a diagonally truncated cylinder shape. Similarly, an upper attachment recess 162 is formed in shelving unit top 108 having a diagonally truncated cylinder shape.

Figure 12:
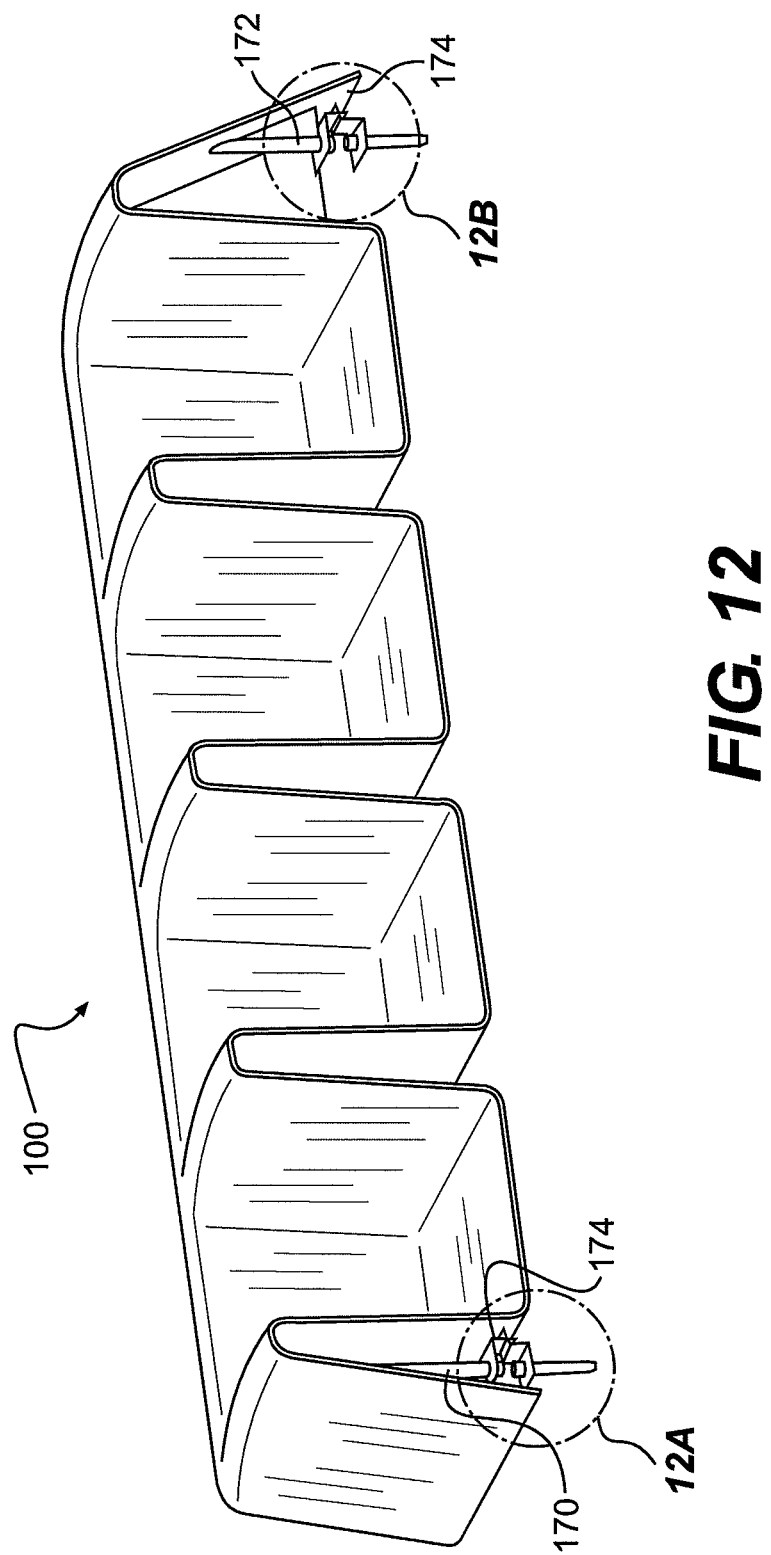
FIG. 12 is a perspective cutaway view of a Shelving Unit consistent with some embodiments disclosed herein.

In yet another embodiment, illustrated in FIGS. 12, 12A, 12B a lower attachment boss 170 extends only part-way to the mounting wall providing room for a right-angle boss clip 174 to be attached by a bolt or screw 139 to the lower attachment boss 170. Similarly an upper attachment boss 172 to extends part-way to the mounting wall providing room for a boss clip 174 to be attached by a bolt or screw 139 in the upper attachment boss 172. One side of boss clip 174 includes a hole for receiving a bolt or screw for attachment to an attachment boss 170, 172 whereas the opposite, portion of boss clip 174 includes a slot configured to receive a slotless hanging clip 154 that is attached to a mounting wall by anchor 136. Hanging clip 154 is as described above.

Figure 13:
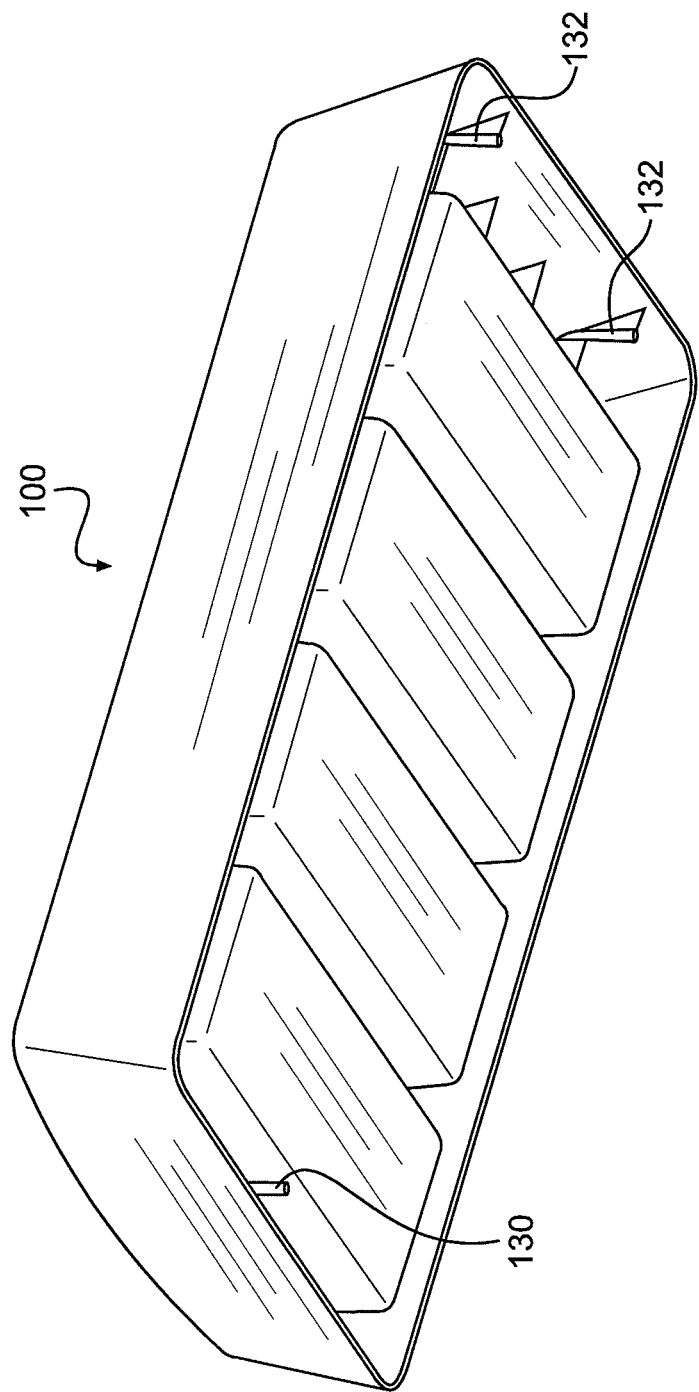
FIG. 13 is a rear perspective view of a Shelving Unit consistent with an alternative embodiment disclosed herein.

As illustrated in FIG. 13, it is anticipated that shelving unit 100 may include more than one mounting portion at a top 108 or bottom 112.

Desk Unit

FIGS. 14-28 depict a plurality of example embodiments of a desk. A desk unit 200 has a top surface 202 in FIG. 14 that may taper from the back of the desk (at the wall) to the front edge 210 of the desk. Because of this taper, a person cannot wrap any cloth or any other material around the desk for the purposes of hanging themselves. The desk's top surface 202 further may, when installed, have an angle downward from the wall (for example less than 10 degrees, e.g., 2-4 degrees).

Figure 14:
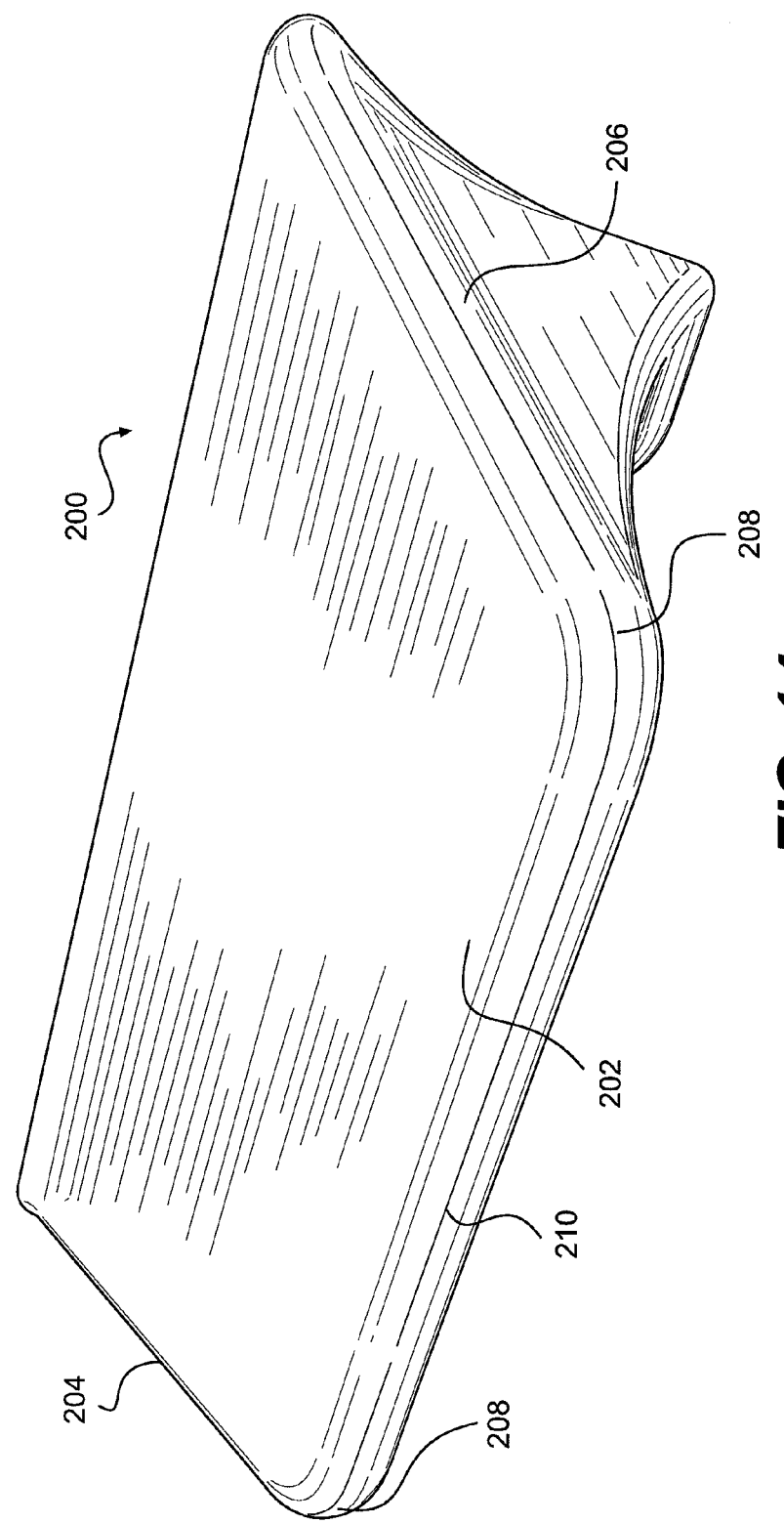
FIG. 14 is a front top perspective view of a Desk Unit consistent with some embodiments disclosed herein.

Right and left edges 204, 206 and front edge 210 of the top surface 202 shown in FIG. 14 are generally rounded to provide a blunt or bullnose edge, while corners 208 are rounded as a radius to prevent injury.

Figure 15:
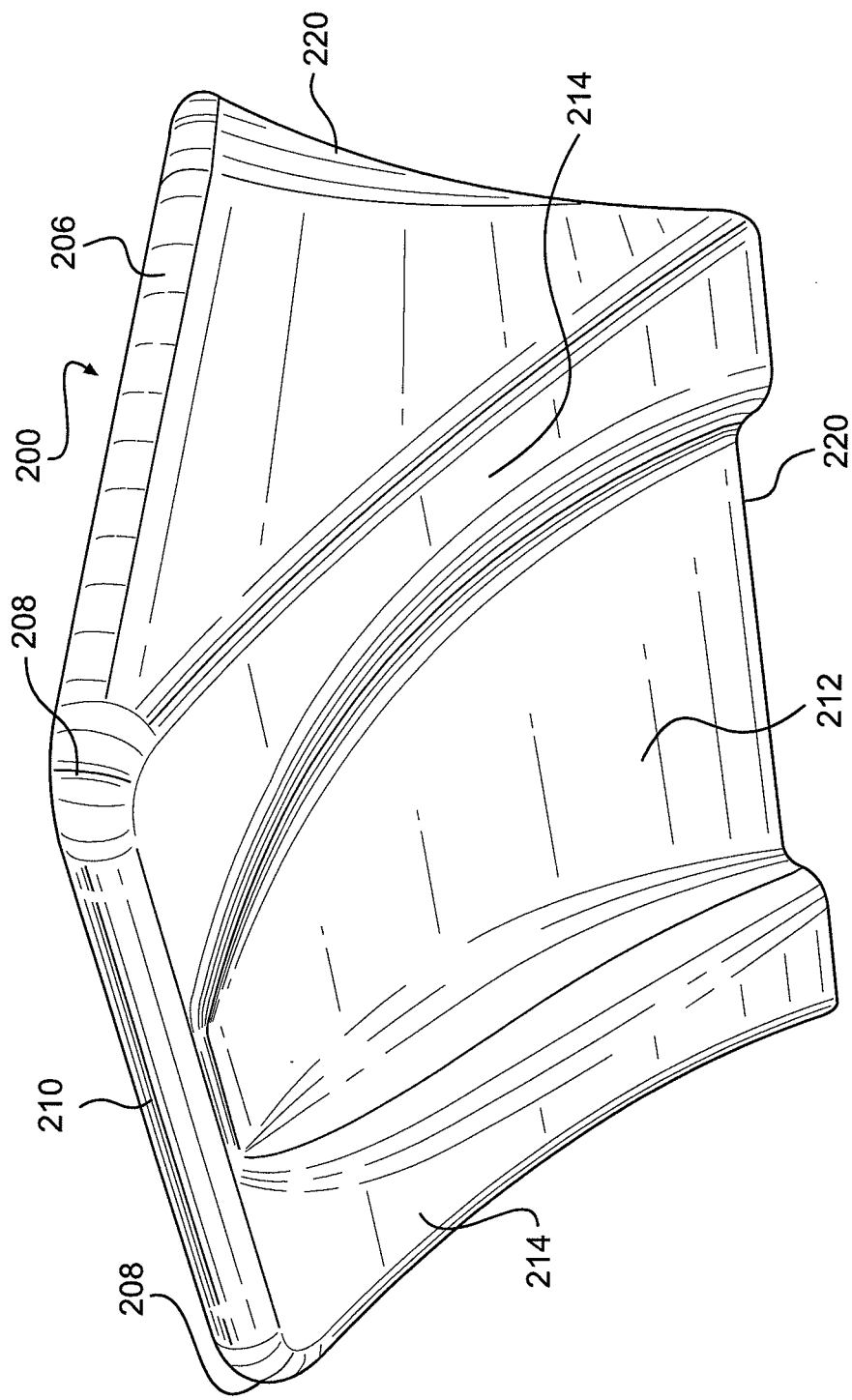
FIG. 15 is a bottom front perspective view of the Desk Unit of FIG. 14.
Figure 16:
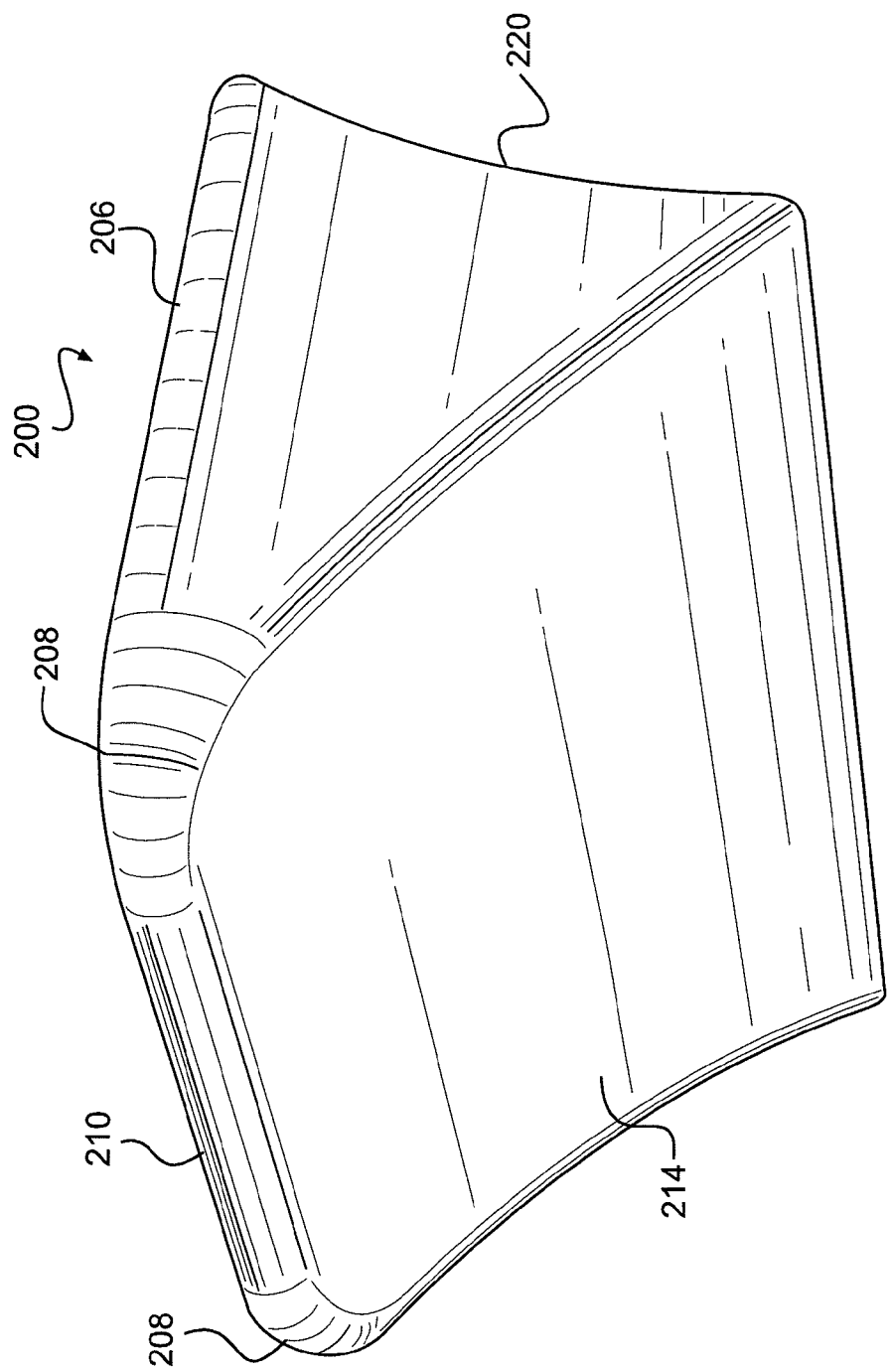
FIG. 16 is a bottom front perspective view of a Desk Unit consistent with other embodiments disclosed herein.

FIG. 15 illustrates a lower portion of desk 200 including a bottom front surface 214 which slopes gradually downward from front edge 210 to lower portion of a mounting perimeter 220. In certain embodiments a knee recess 212 is included in the recess may began directly under front edge 210 and slopes downward towards a lower portion of mounting perimeter 220 at a greater curvature than bottom front surface 214. Knee recess 212 provides a concave space allowing a closer sitting position for the user. FIG. 16 illustrates the lower front surface 214, without a knee recess.

Figure 17:
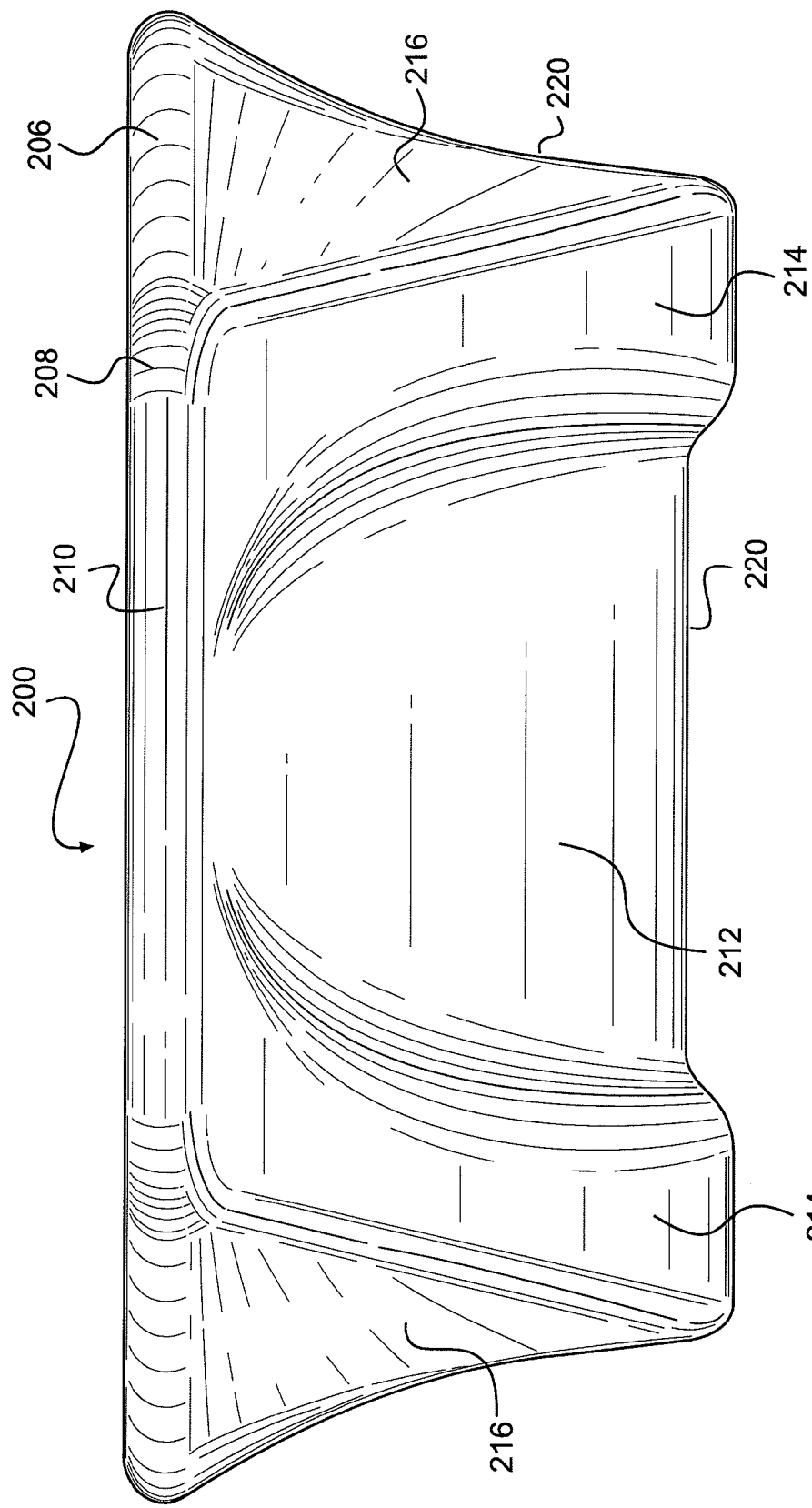
FIG. 17 is a front view of the Desk Unit of FIG. 14.
Figure 18:
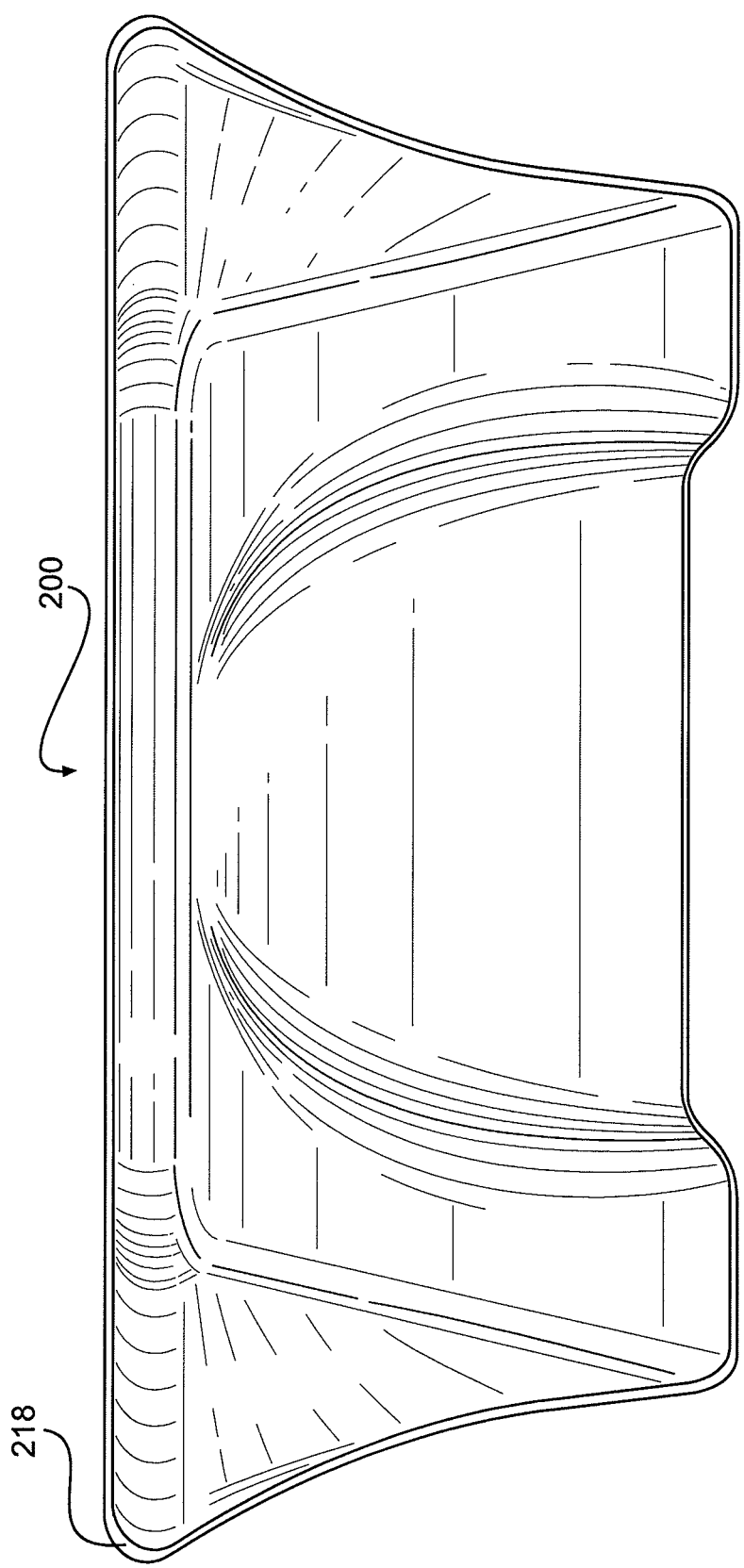
FIG. 18 is a back view of the Desk Unit of FIG. 14.
Figure 19:
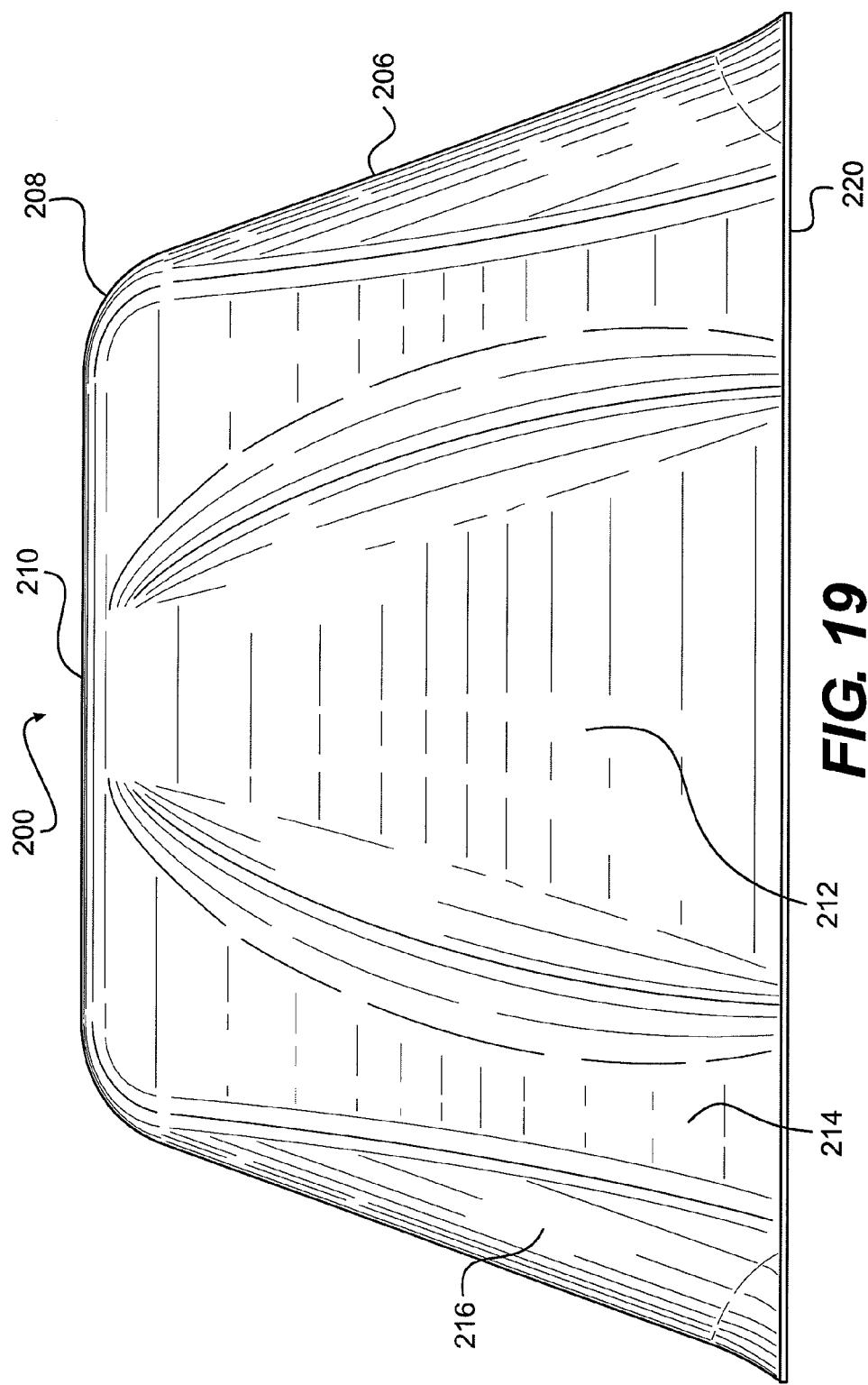
FIG. 19 is a bottom plan view of the Desk Unit of FIG. 14.
Figure 20:
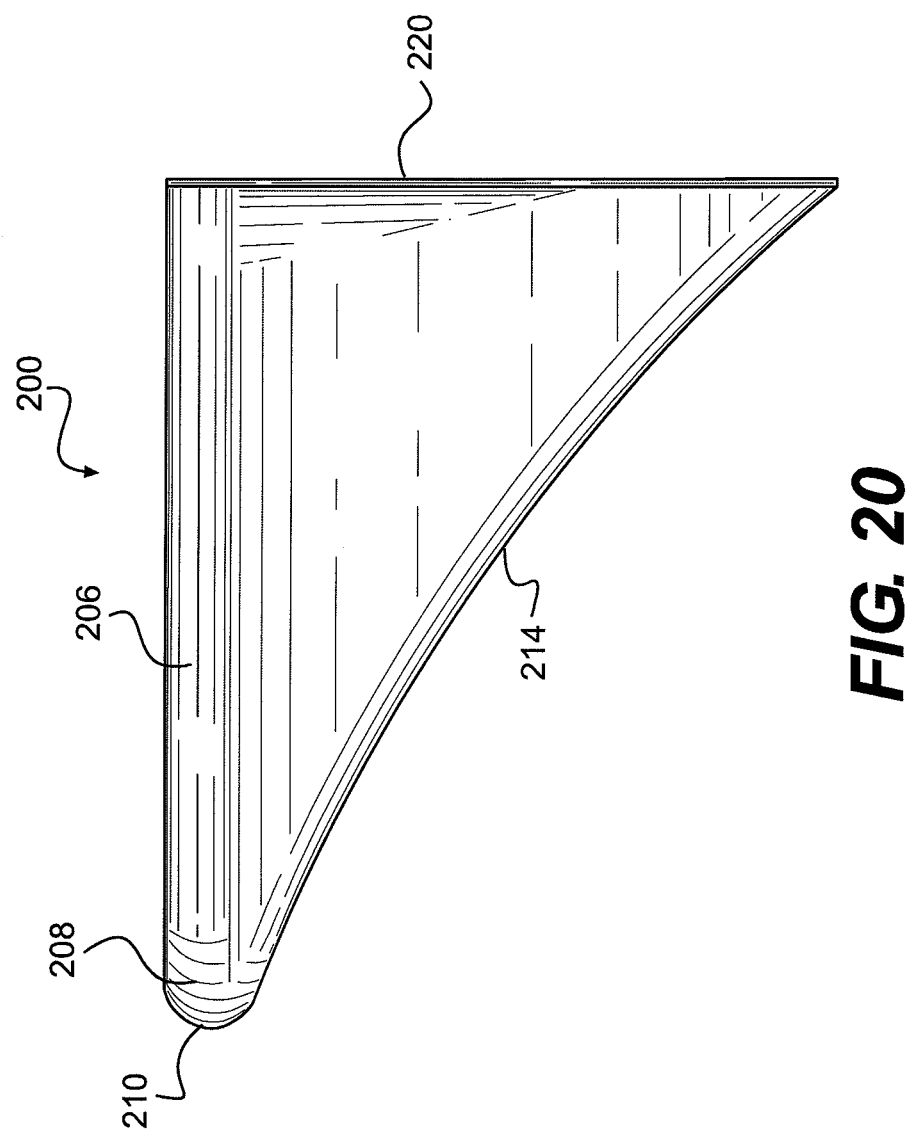
FIG. 20 is a side view of the Desk Unit of FIG. 14.

FIG. 17 illustrates the desk 200 shown in a downward sloped curvature of bottom side surfaces 216. It is clear from this figure that the desk tapers from a wide mounting perimeter toward front edge 210. Knee recess 212 as in FIG. 17 has an almost semicircular profile. It is to be appreciated, however, that the knee recess 212 may include other less-rounded profiles. The rear view of desk 200 in FIG. 18 illustrates rear surface 218 of mounting perimeter 220. The rear surface 218 defines a mounting plane (best envisioned at the bottom of FIG. 19 and right side of FIG. 20) intended to be mounted against a mounting surface. At manufacture, the mounting plane is flat. However, to accommodate irregularities in a mounting surface such as a wall, surface 218 of the mounting perimeter may be trimmed.

As can be seen from the other example embodiments in the figures (e.g., FIGS. 21A to 21C), the shape of the top surface of the desk may be varied. The corners of the top surface of the desk may be more or less rounded. The top surface of the desk may be more or less tapered but sufficient to prevent a user from wrapping any material around the desk in order to hang him/herself.

Figure 21A:
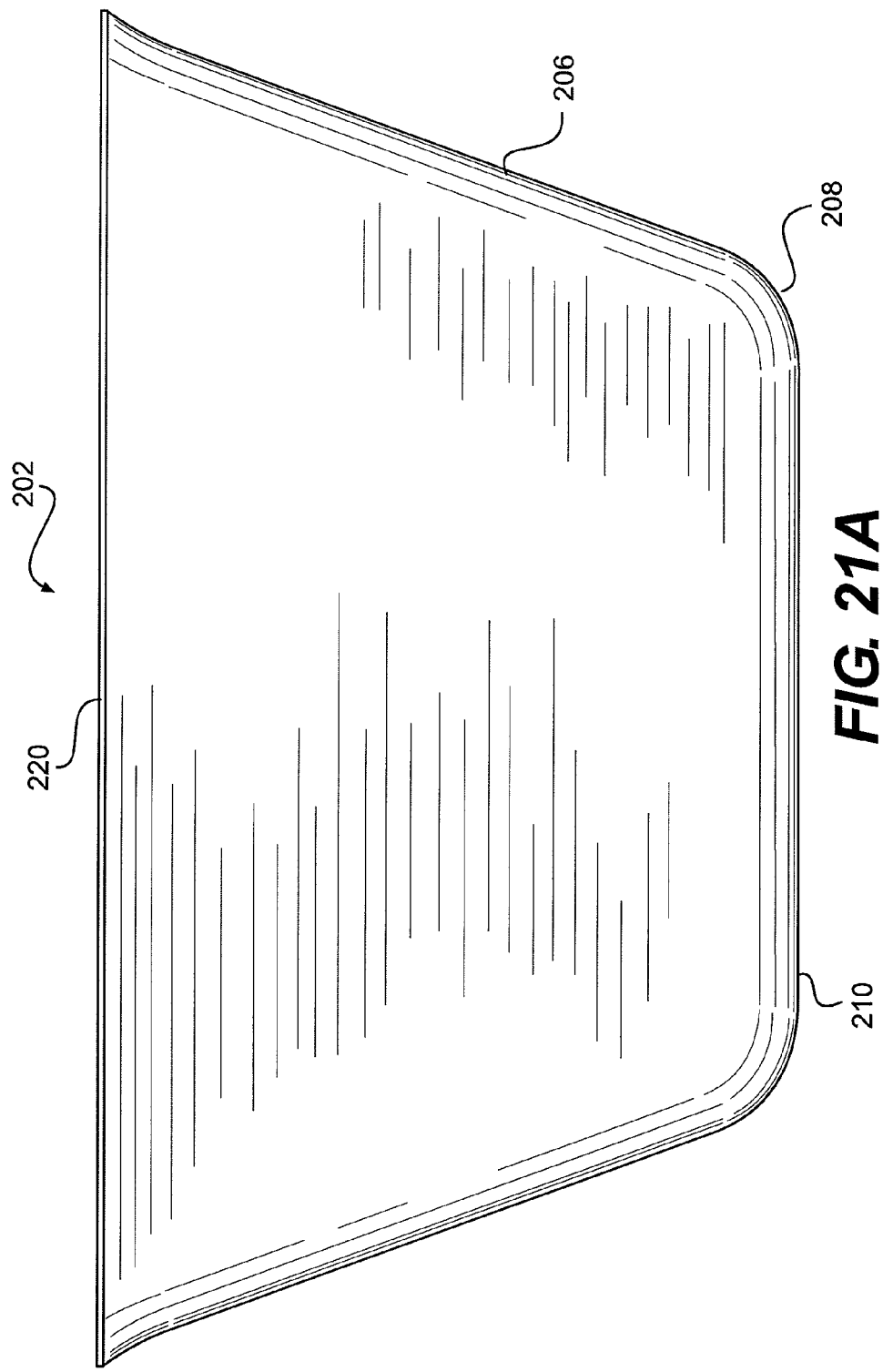
FIG. 21A is a top plan view of the Desk Unit of FIG. 14.
Figure 21C:
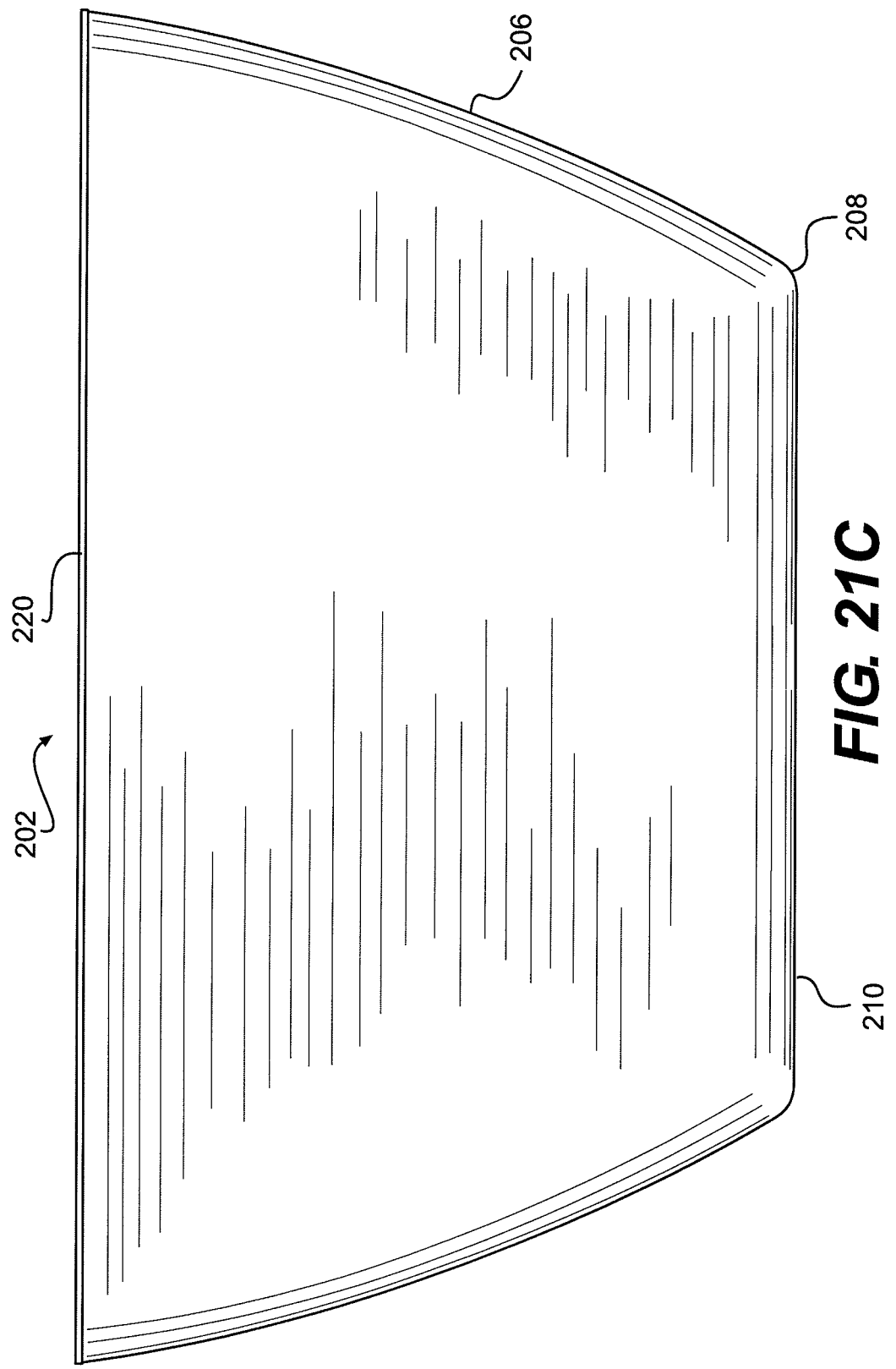

In FIGS. 21A and 21B left and right edges 204, 206 are substantially straight, while in FIG. 21C edges 204, 206 are slightly curved. Front corners 208 may include a range of radii. For example, the top surface 202 in FIG. 21A utilizes corners 208 of medium radius, the top surface 202 in FIG. 22B utilizes corners 208 of larger radius, and top surface 202 in FIG. 21C utilizes corners 208 of small radius. The illustrated desktop surfaces are shown by way of example only, and do not limit the shape or arrangement of the desktop.

Figure 22A:
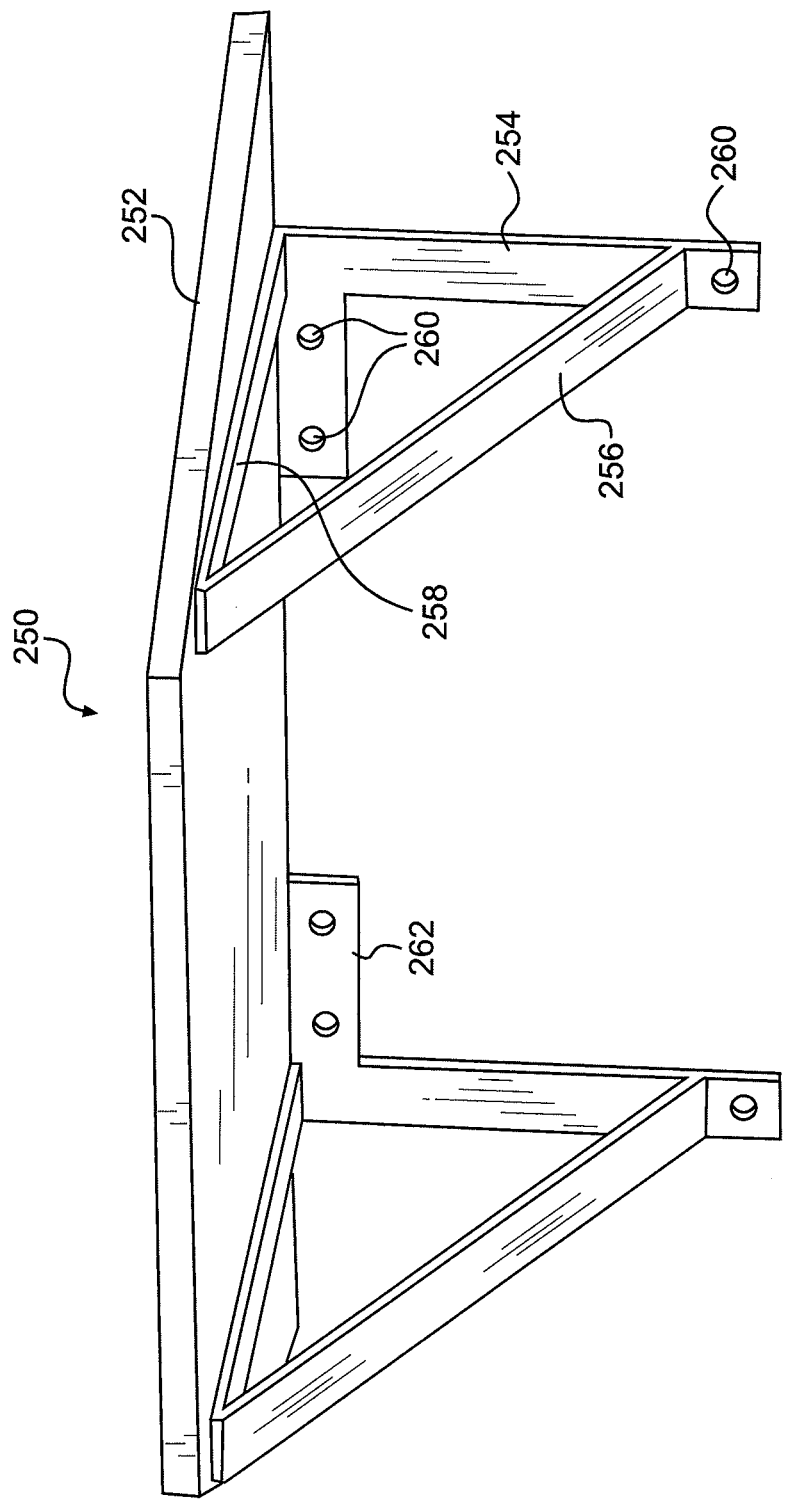
FIGS. 22A and 22B are bottom front perspective views of mounting frames for a Desk Unit consistent with alternative embodiments disclosed herein.
Figure 22B:
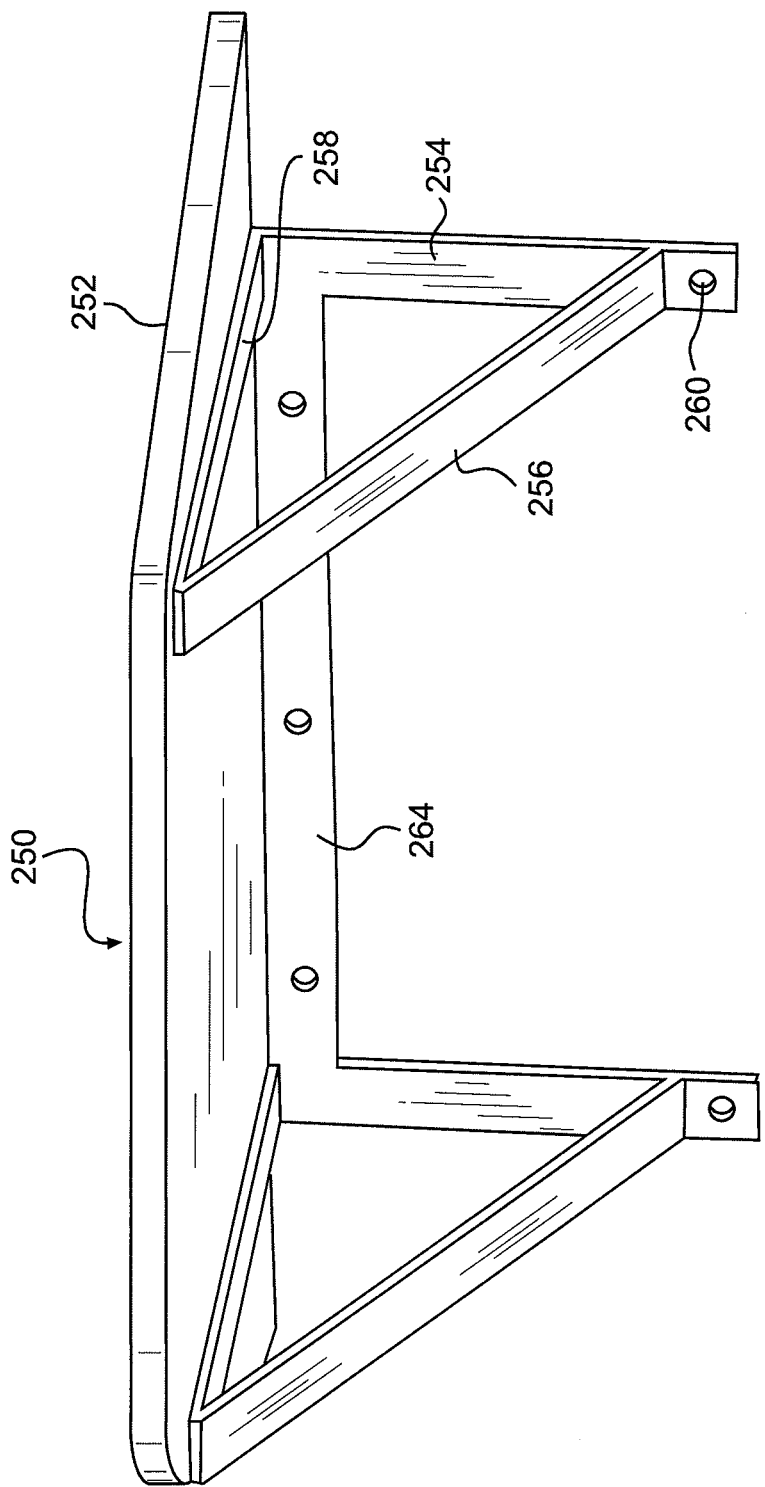

The desk, at installation, may include a mounting frame 250 including a wooden or composite top surface support 252 affixed to a steel or composite support structure shown in FIGS. 22A, 22B and may be mounted by the support structure to a mounting wall. The support structure in one embodiment includes vertical wall plates 254, angled support members 256 horizontal support member 258, and horizontal wall plates 262. Each vertical wall plate 254 is configured to be mounted directly against the mounting wall, is connected at an upper end to a horizontal wall plate 262, and is connected near a lower end to angled support member 256. Angled support member 256 is connected at a lower end to the vertical wall plate 254 and at an upper end is connected to a first end of horizontal support member 258. A second end of horizontal support number 258 is connected to horizontal wall plate 262. FIG. 22B illustrates an embodiment wherein instead of two separate horizontal wall plates 262, a single horizontal wall plate 264 extends from one vertical wall plate 254 to the other. Top surface support 252 may be provided in a shape corresponding to the particular shape of the top surface 202.

Figure 23:
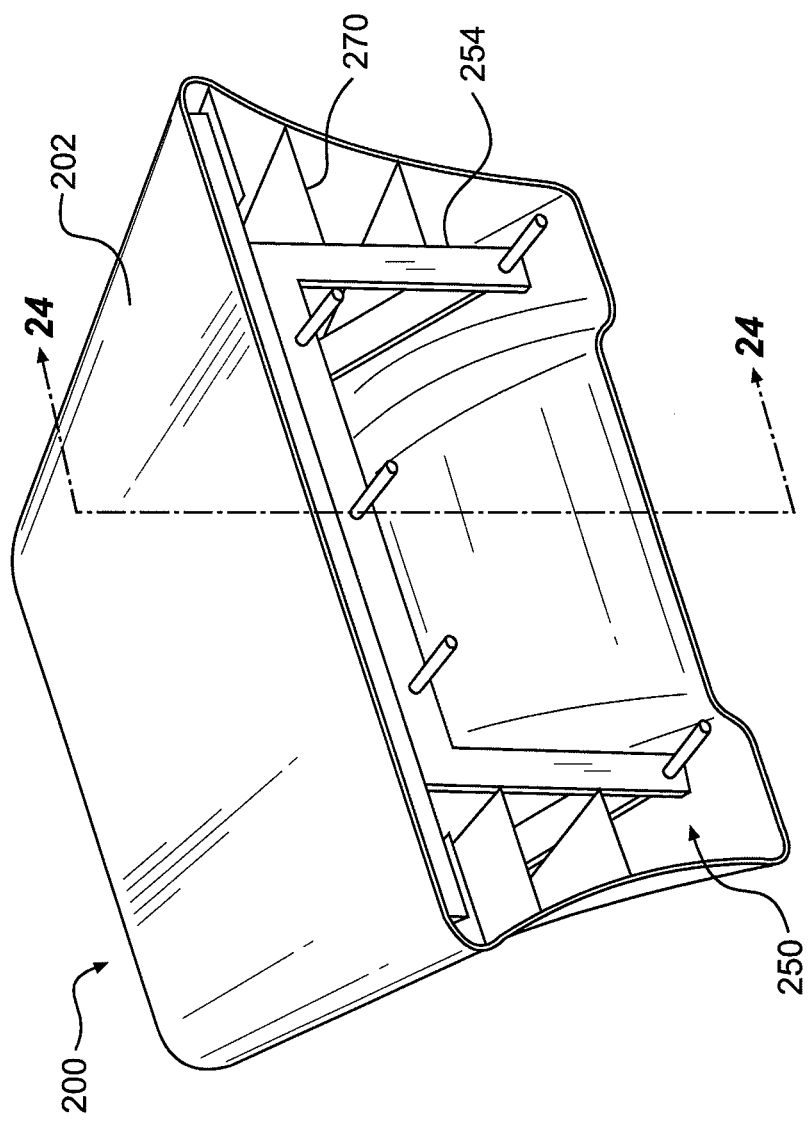
FIG. 23 is a top rear perspective view of a Desk Unit with mounting frame consistent with some embodiments disclosed herein.
Figure 24:
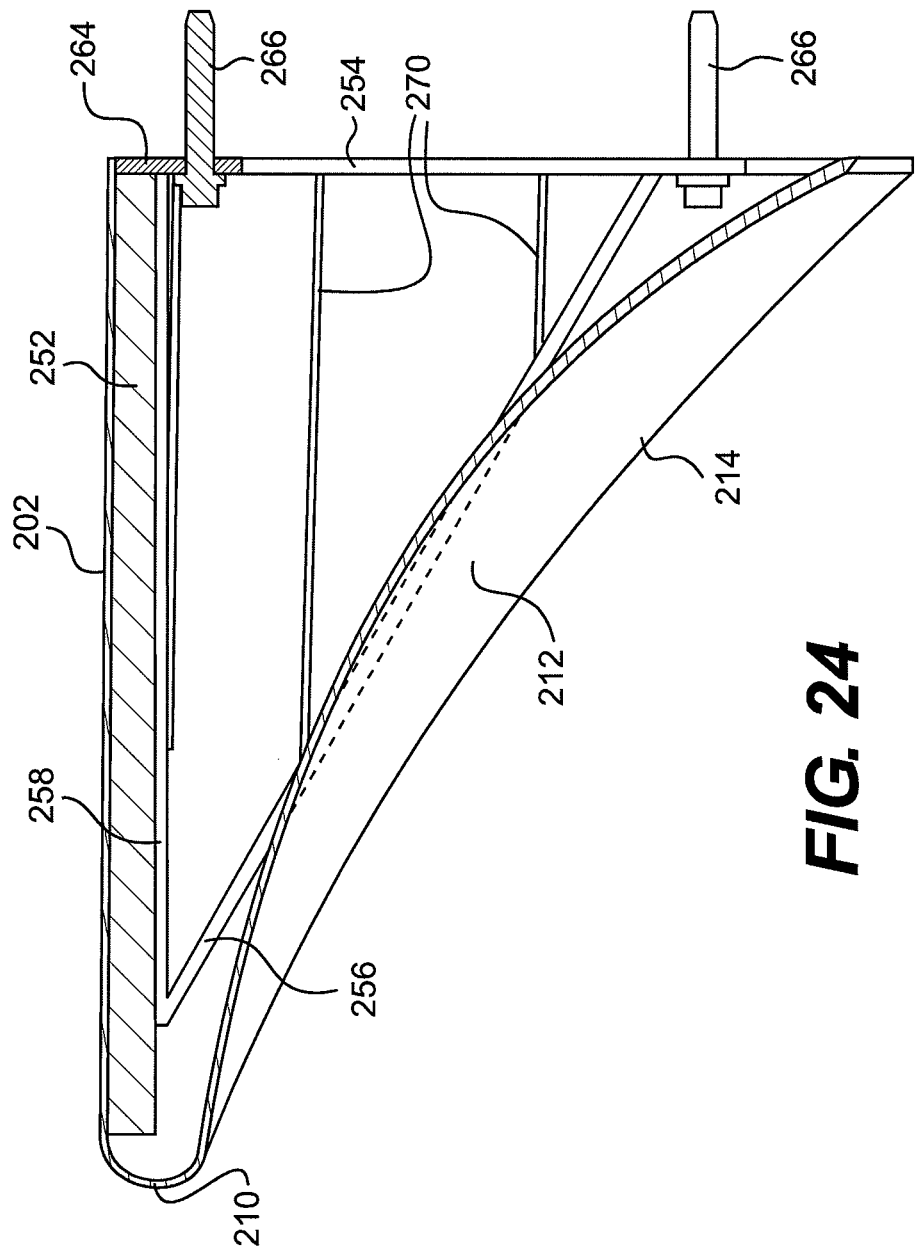
FIG. 24 is a section view of the Desk Unit of FIG. 23 consistent with some embodiments disclosed herein.
Figure 25:
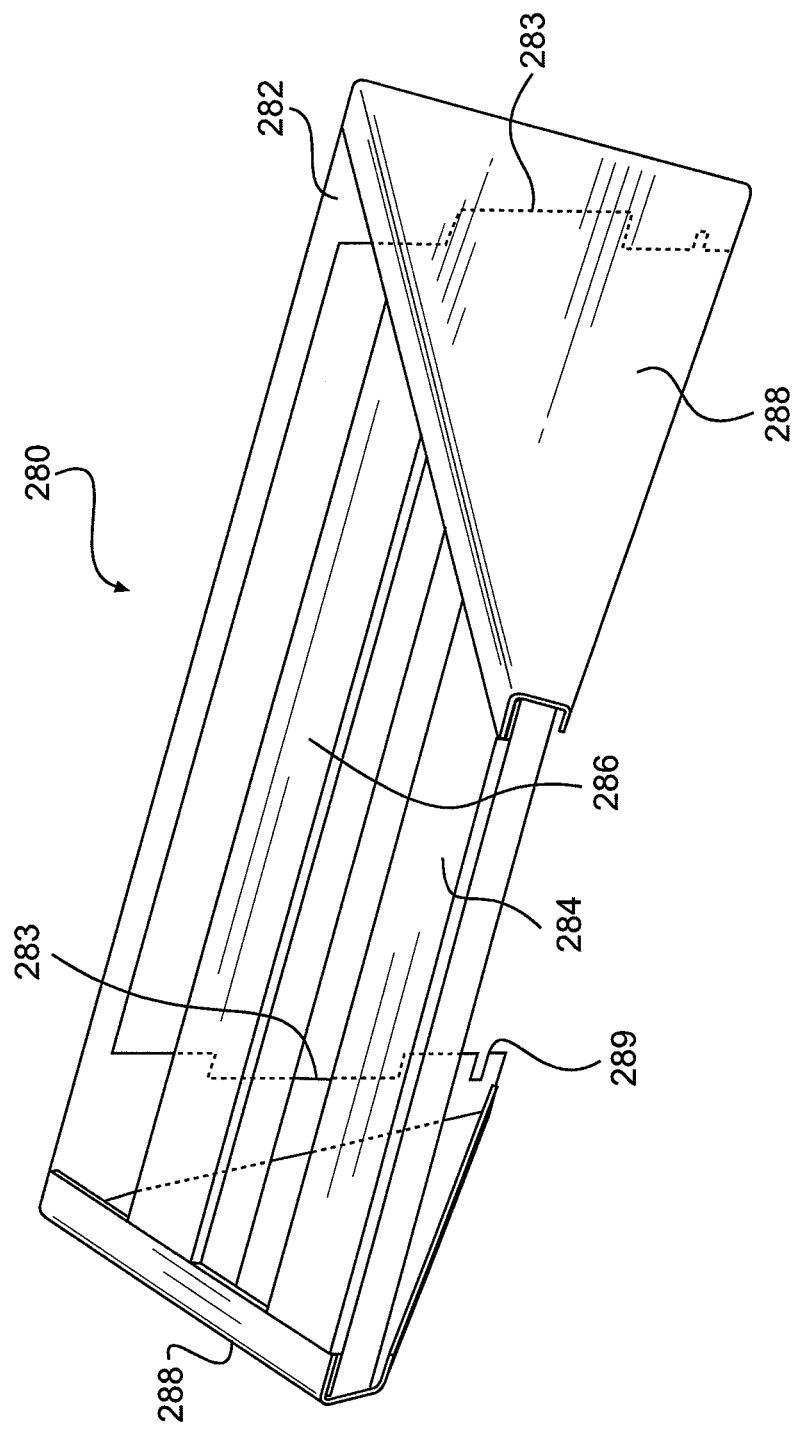
FIG. 25 is a top front perspective view of a mounting frame for a Desk Unit consistent with some embodiments disclosed herein.

The desk 200 may be bonded to the top surface support 252 using, e.g., an elastomeric adhesive. FIG. 23 illustrates an assembled desk 200 and mounting frame 250. FIG. 23 also illustrates ribs 270 which may be disposed along bottom side surfaces 216 to provide additional flexural rigidity and to additionally secure the desk 200 to the mounting frame 250.

The steel/composite frame of the desk may be attached to the wall using, e.g., bolts/anchors, brackets, etc. and employing, for example, anchor holes 260 located at various points along vertical wall plate 254 and/or horizontal wall plate(s) 262, 264. The perimeter of the desk may be sealed using, e.g., epoxy caulk. As such, no access may be made to wall-facing portions of the desk once the desk is installed. The desk may have no components (e.g., bolts) that are accessible from the front or side of the desk providing a tamper-proof desk that is difficult to remove.

In another embodiment of a mounting frame, 280, a back panel 282 is attached to frame side panels 288 which project forward from the back panel 282 toward a front of the desk. Side panels 288 may be provided with a taper in both lateral and vertical directions. At least top front and top rear channels 284, 286 are connected at ends thereof to a top portion of the side panels 288, to provide support for a top surface 202 of a desk. Joints connecting the top front and top rear channels 284, 286 to the side panels 288 may be flush and smooth. The back panel 282 may be provided with an access notch 283 and a lock notch at side portions for engagement with a mounting plate 290 (shown in FIG. 26A).

FIGS. 26A-26C depict mounting plate 290 includes main support body 291, a top forwardly displaced strip 294 configured to engage an edge of the back panel 282, forwardly displaced side strips 296 and guide tabs 298 depending therefrom at sides of the main support body 291, and mounting holes 292. The mounting plate may further include a lock tab 299.

The mounting plate 290 may be fixed to a mounting wall by adhesive, anchor bolts, etc. such that the forwardly displaced strips are displaced outwardly from the mounting surface, providing a path behind which portions of the back panel 282 by slide. Guide tabs 298 may aid in installation of the mounting frame 280 to the mounting plate 290. Access notches 283 fit around upper forwardly displaced side strips 296 during installation. Side and top edges of the center cutout of the back panel engage the forwardly displaced strips 294, 296 sliding behind the strips. The lock notch(es) 289 of the back panel slide past lock tab(s) 299 of the mounting plate during installation and may thus be difficult to move back in the same direction as the lock tab then prevents movement of the back panel in that direction.

Figure 27A:
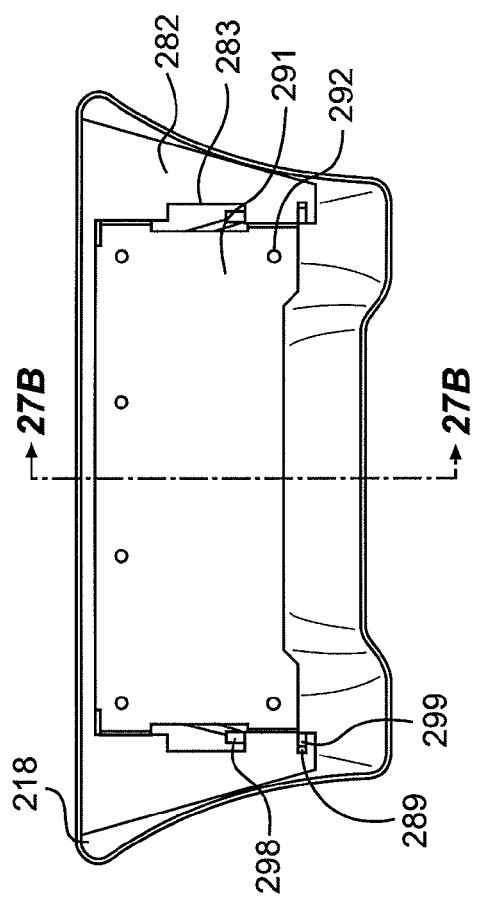
FIGS. 27A, 27B, and 27C are rear, side section, and detail views of a mounting frame and Desk Unit consistent with some embodiments disclosed herein.
Figure 27B:
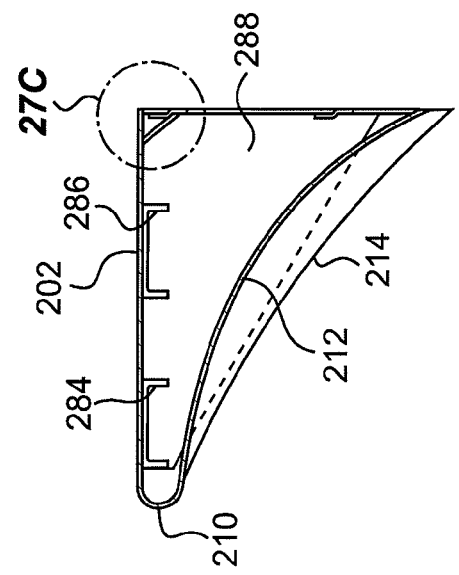
Figure 27C:
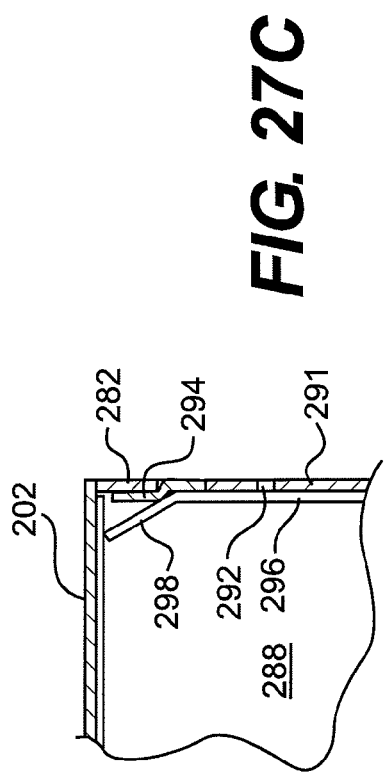
Figure 28:
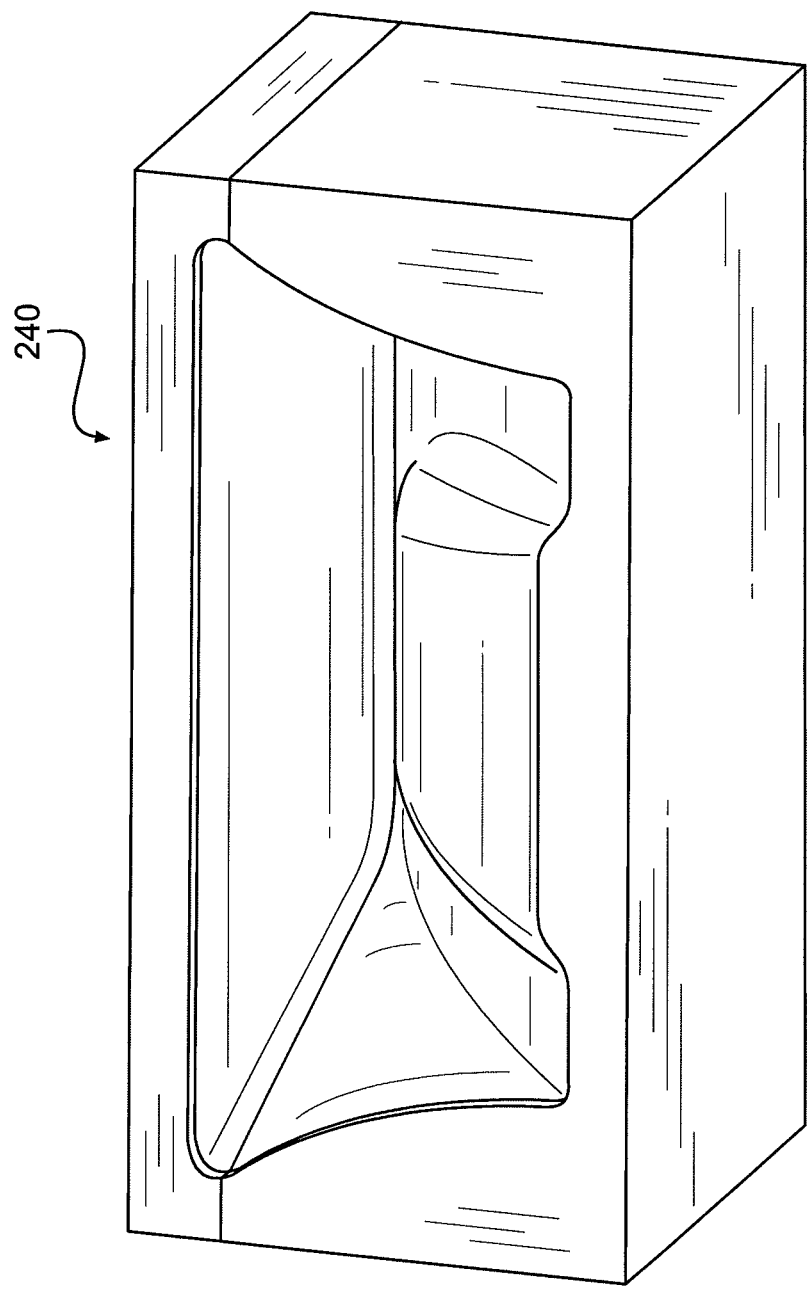
FIG. 28 is a bottom rear perspective view of a mold used in construction of a Desk Unit consistent with some disclosed embodiments.

FIGS. 27A-27C show a completed assembly including mounting plate 290, mounting frame 280, and desk 200.

Seating Unit

FIGS. 29-46 depict a plurality of example embodiments and portions of a seating unit, including a stool and/or a wall-attachment portion.

Figure 29:
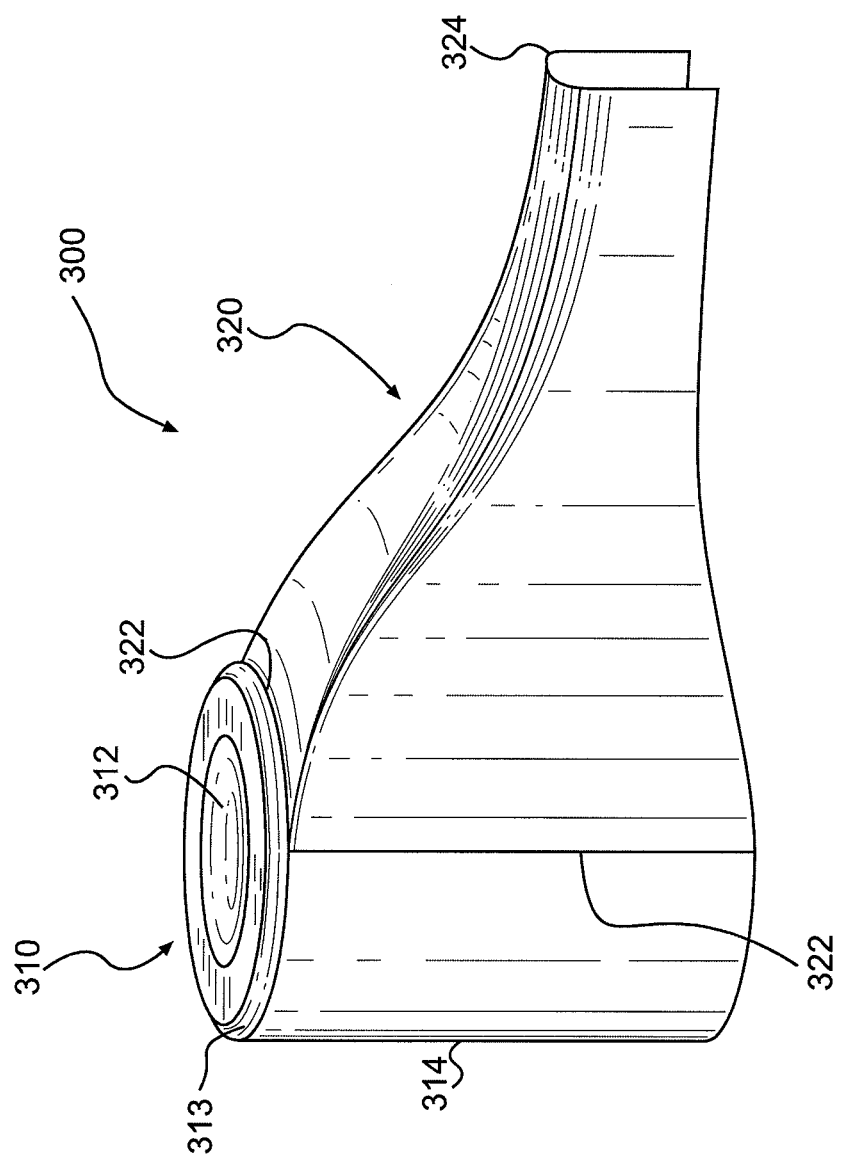
FIG. 29 is a front top perspective view of a Seating Unit consistent with some disclosed embodiments.
Figure 30:
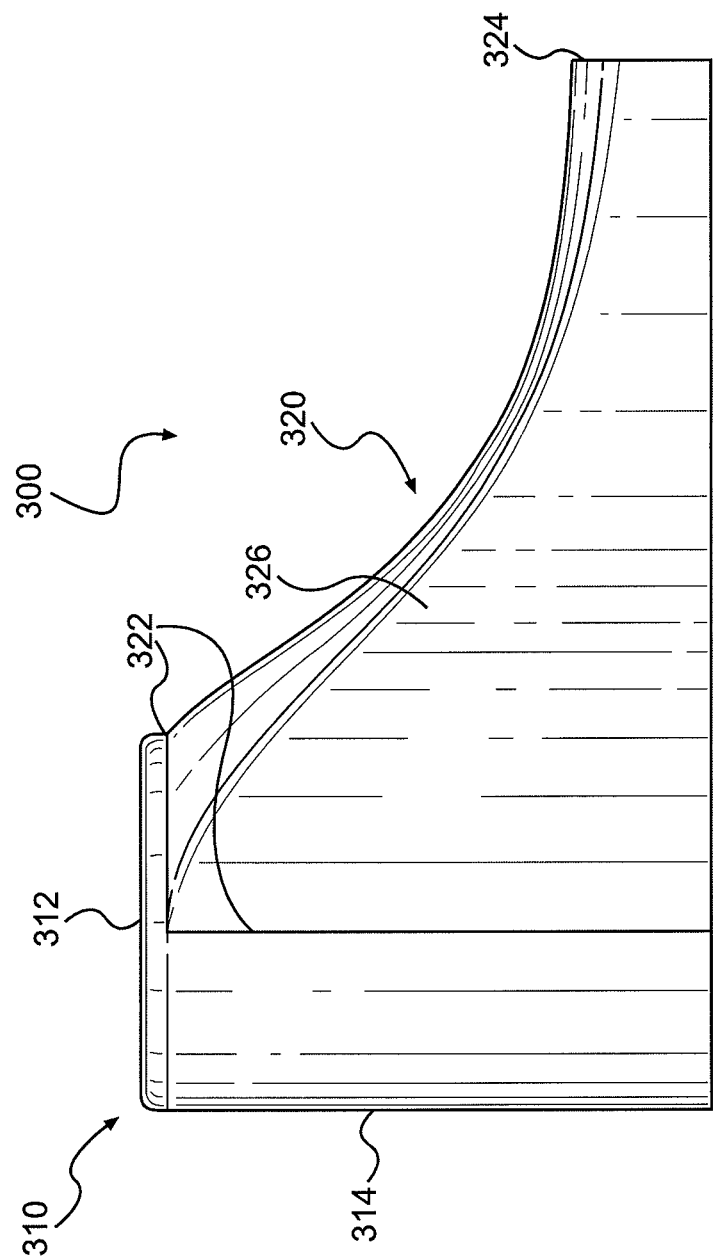
FIG. 30 is a side view of a Seating Unit consistent with some disclosed embodiments.

The stool 300 may comprise a round stool top 312 joining a cylindrical wall 314, at a rounded edge 313. The stool may have an add-on wall-attachment portion 320 that connects with the stool at a stool connection portion 322 and to a wall at a wall-attachment portion 324. This arrangement may prevent one from wrapping a cloth or other materials around the stool thereby preventing someone from hanging him/herself. As shown in FIG. 29, the stool 310 may connect to a wall-attachment portion 320 at a connection portion 322. The wall-attachment portion 320 may be attached to a wall at portion 324. Further, the stool 310 and the wall-attachment portion 320 may be attached to the floor respectively at a stool-floor junction 316 and a floor junction 328, 359, 369. By installing the stool 310 in conjunction with the wall-attachment portion 320, a prisoner may be prevented from removing the stool 310 and/or the wall-attachment portion 320 from the floor/wall, thus preventing use as a weapon.

As can be seen from FIG. 29 and others, the wall-attachment portion 320 tapers toward the wall-attachment portion 324. In another embodiment shown in FIG. 38, the sloped transition area 355 is more curved. The taper/sloped transition area prevents a user from wrapping a cloth or other material around the stool 310 in an attempt to hang him/herself, as the cloth or other material would slip off over the top of the stool.

In alternative embodiments (FIGS. 41A-41B, 42A-42C) having a separate stool 310 and wall-attachment portion 360, the wall-attachment portion 360 is configured to attach to a stool 310 at a stool connection portion 362. The stool connection portion 362 may be somewhat less bulky or obtrusive in certain embodiments than others. A wall-attachment end 368 may be configured to connect to a wall while stool attachment end 366 may be configured for attachment to a stool. The alternative embodiment of the wall-attachment portion 360 may be sealed to a floor at floor junction 369.

Figure 39:
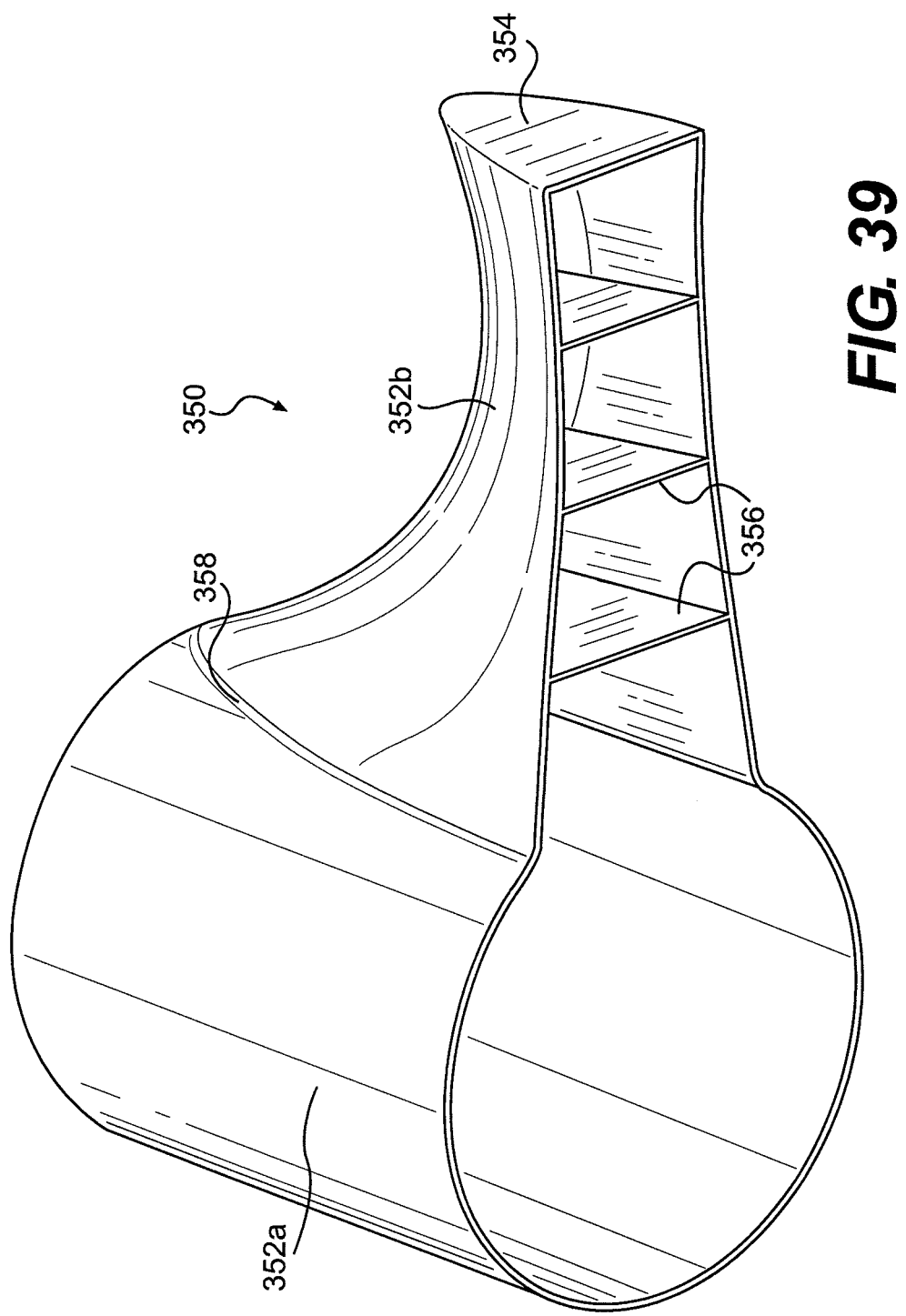
FIG. 39 is a bottom perspective view of the Seating Unit of FIG. 38.

Alternatively, the stool 310 and the wall-attachment portion 320 may be molded together as a unitary seating unit 350 as shown in FIGS. 38-40. In this case, stool wall 352a merges with wall-attachment sidewall 352b at a stool-attachment junction 358. The wall-attachment portion 320 may be unattached to a wall at 324. It may be appreciated that the wall-attachment portion may be shaped in a different manner and tapered in such a way that material may not be wrapped around it to permit a prisoner to hang themselves. In FIGS. 29, 30, 33, 34, 35, the wall-attachment portion has a generally U-shaped transverse cross-section, whereas in FIGS. 38-39 the wall-attachment portion has a generally parabolic transverse cross-section. However, the wall-attachment portion is not limited to these shapes. As shown in FIG. 39, the wall-attachment portion may include support ribs 356 to aid flexural rigidity. Although the ribs 356 are shown disposed as flat, transversely formed portions, support structures/ribs may include various other configurations (e.g., diagonal, triangular, etc.).

Figure 32:
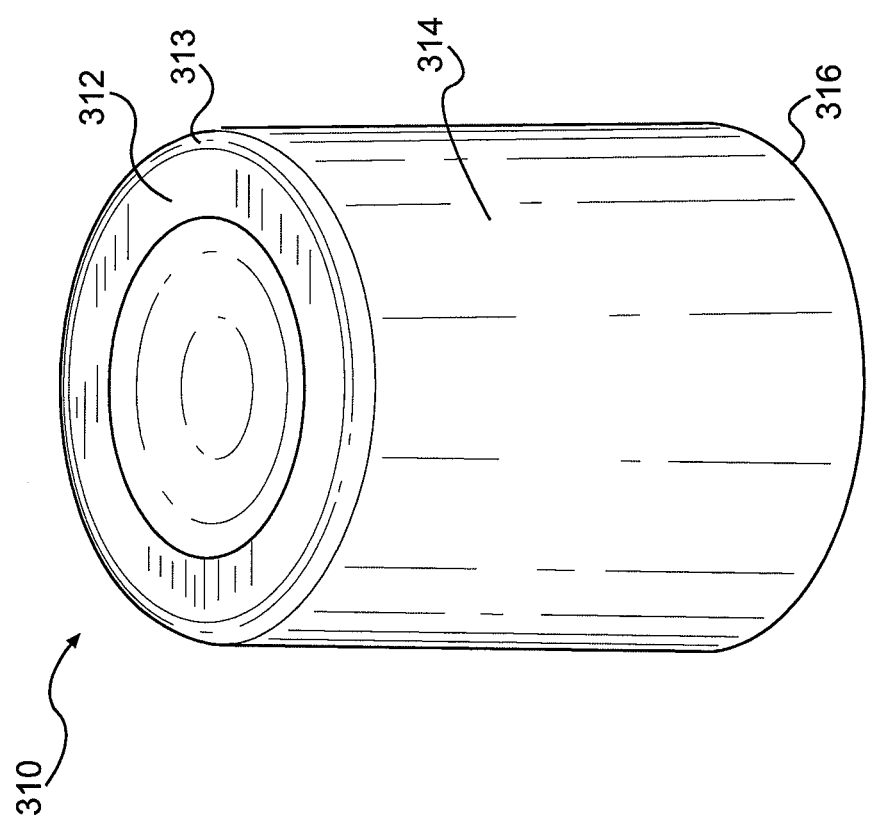
FIG. 32 is a front top perspective view of a Stool consistent with some disclosed embodiments.
Figure 33:
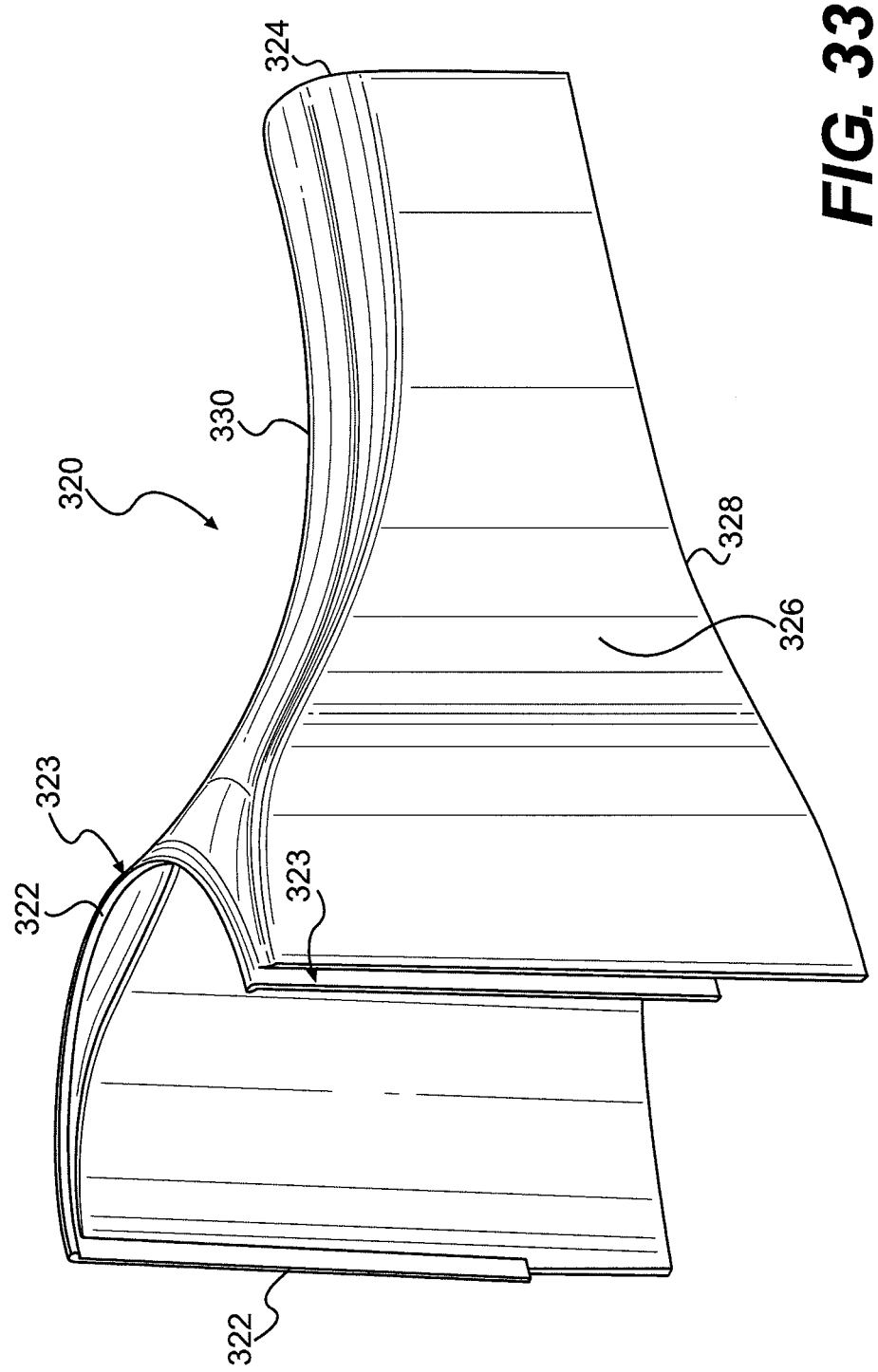
FIG. 33 is a rear top perspective view of a Stool-Wall attachment portion consistent with some disclosed embodiments.
Figure 35:
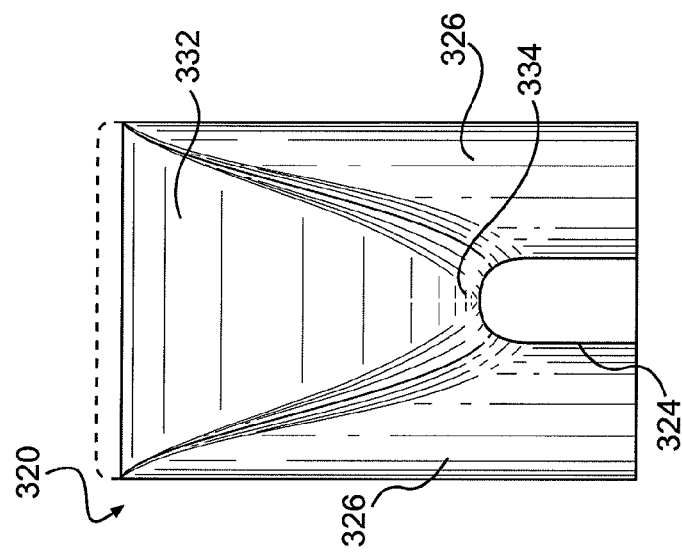
FIG. 35 is a front view facing a sloped portion of the Stool-Wall attachment portion of FIGS. 33-34.
Figure 34:
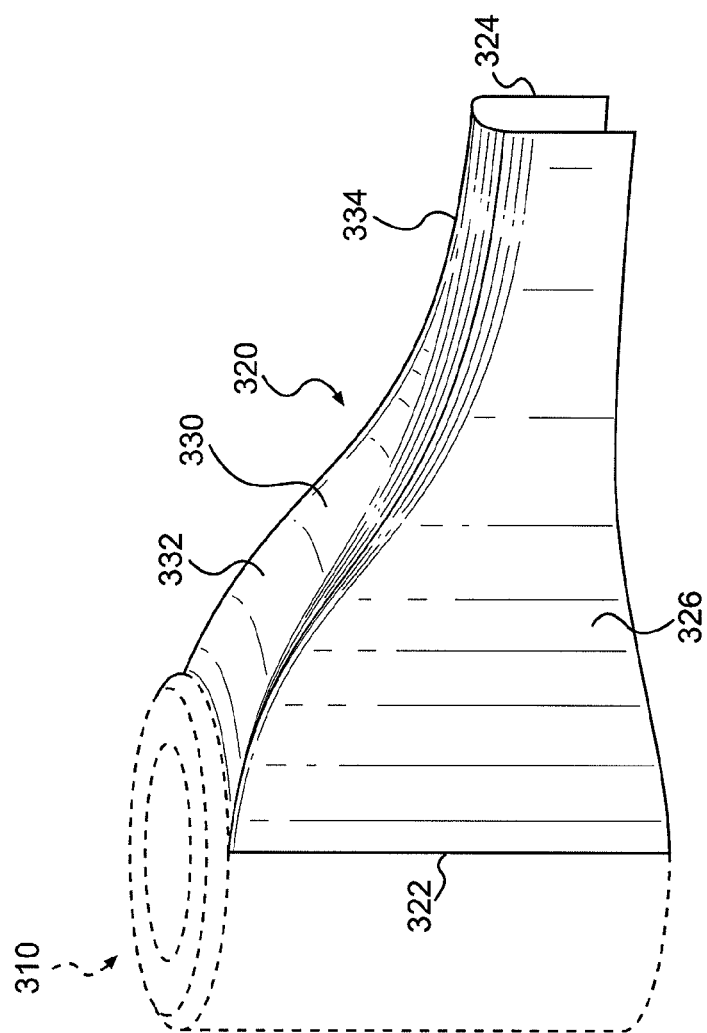
FIG. 34 is a front top perspective view the Stool-Wall attachment portion of FIG. 33.
Figure 45:
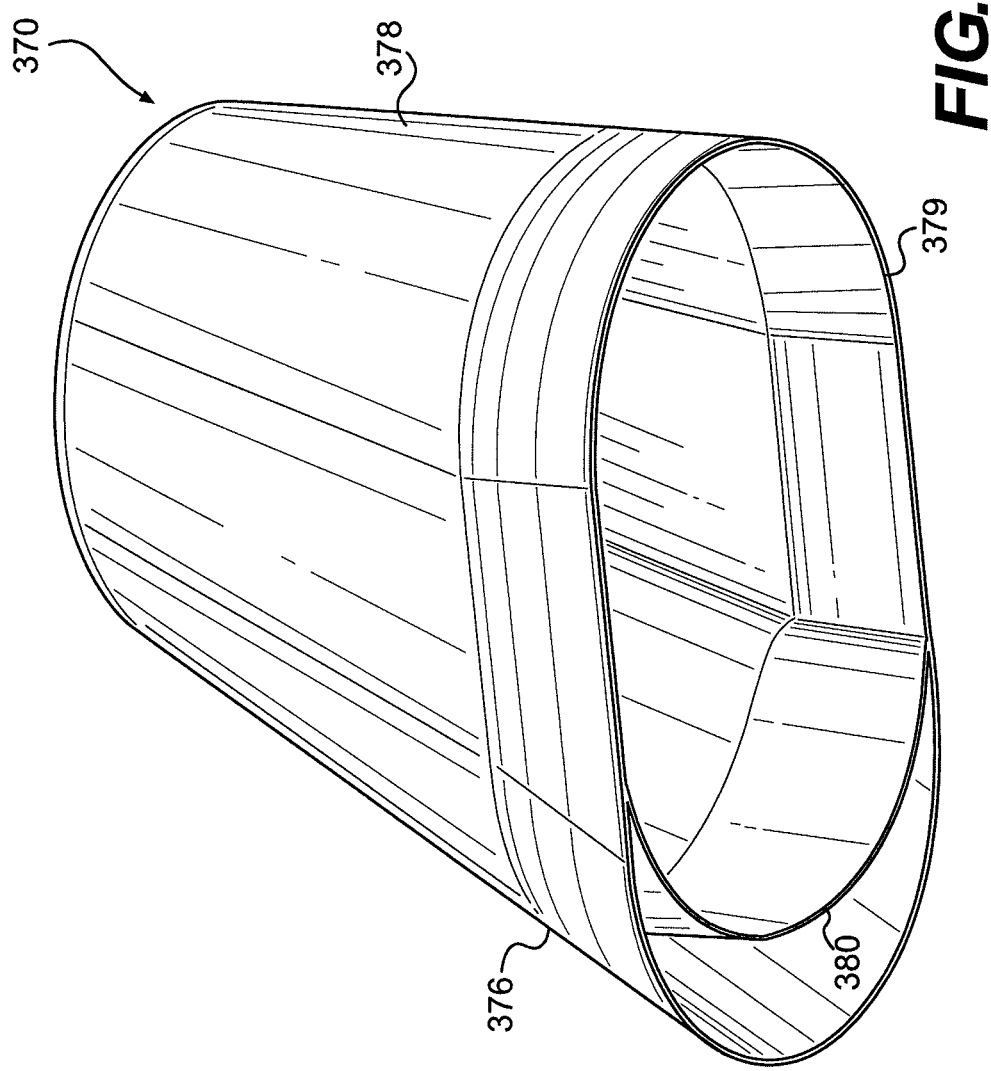
FIG. 45 is a bottom perspective view of the floor-mounted Seating Unit of FIG. 43 consistent with at least one disclosed embodiment.
Figure 46:
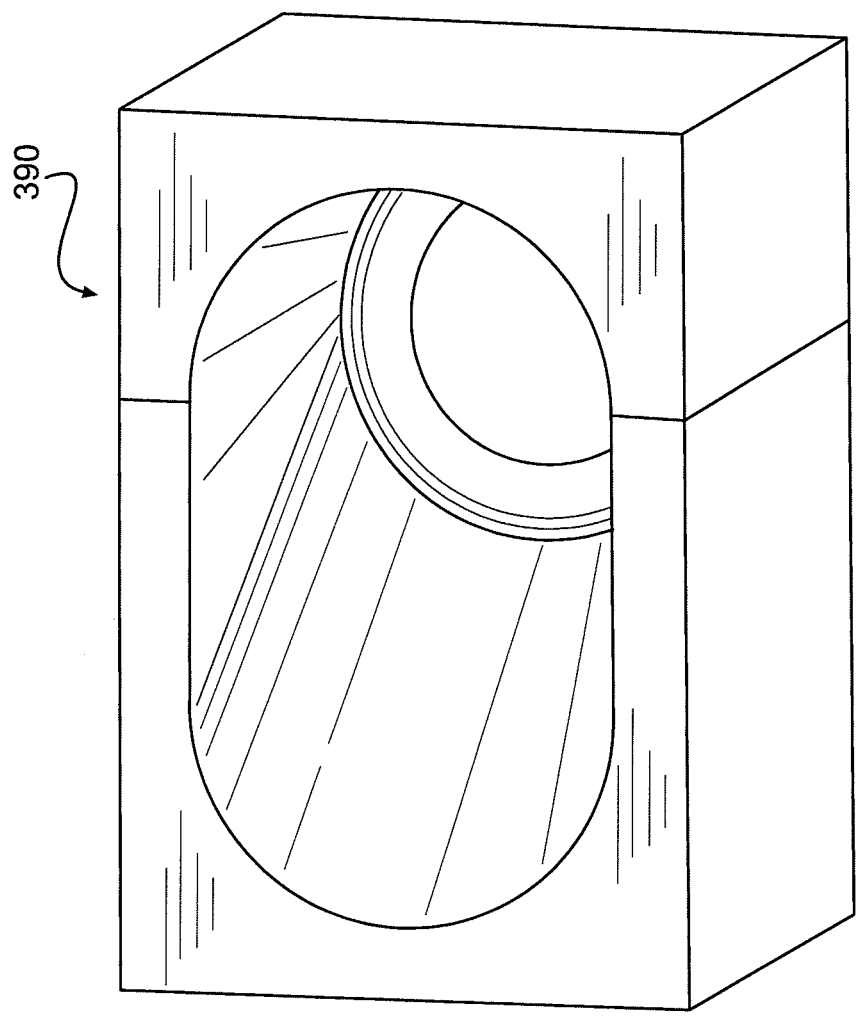
FIG. 46 is a perspective view of a mold for manufacture of the floor-mounted Seating Unit of FIG. 43.

Other embodiments of the stool 310 are depicted in FIGS. 43-45. A floor-mounted seating unit 370 includes a top seat surface 372, a stool wall 374 which descends in an increasingly ovalish truncated-cone shape from the seat surface 372 to the floor. On one side 376 the stool wall slopes in a gradual linear manner while at the other side 378 the stool wall slopes in a sharp linear manner. A mounting perimeter in FIG. 44C has a floor junction 379 for connection with the floor and around which a sealant may be disposed. To aid in attachment to a floor, the seating unit 370 may include a mounting band 380 in FIG. 45 which may aid in attachment to a vertical band fixed to a floor. As can be seen in FIG. 32, the stool 310 may be used alone—having no wall-attachment portion. The stool 310 may be tapered upwardly so that if prisoners wrapped a cloth or other material around the stool in an attempt to hang themselves, the cloth or material would slip off. The stool may be affixed to the floor so that it may not be removed from the floor.

The stool or seating unit 310, 340 (FIG. 37), 350, 360 and/or wall-attachment unit 320 may be installed to a floor using bolts or other known attachment configurations. The lower perimeter of the stool may be sealed against the floor using, e.g., epoxy. As such, no access may be made to the underside portion of the stool and/or attachment unit once they are installed.

Floor-Mountable Bed Unit

Figure 47:
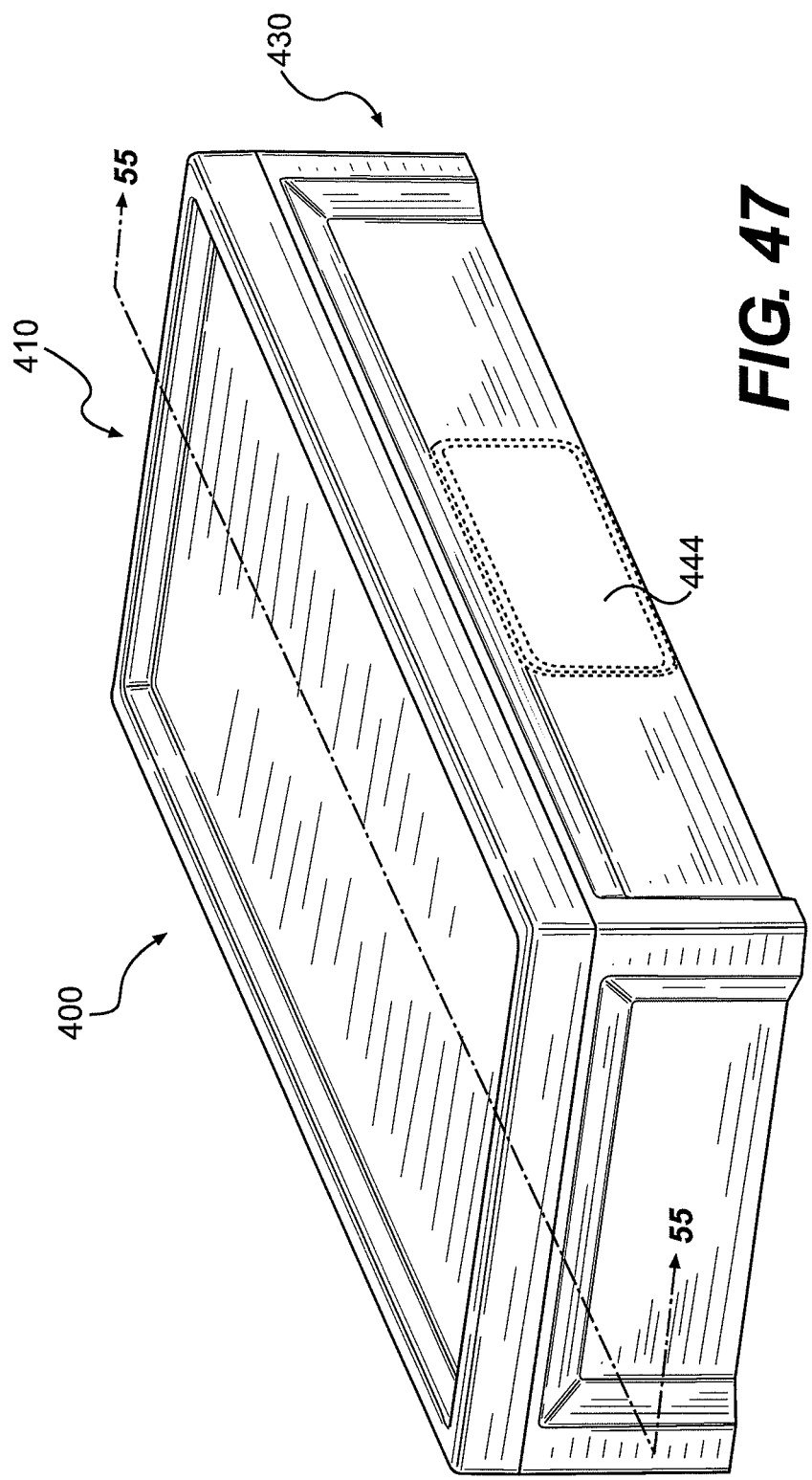
FIG. 47 is a front top perspective view of a floor-mountable Bed Unit.

FIGS. 47-59 depict a plurality of example embodiments of a floor-mountable bed. As depicted in FIG. 47, floor-mountable bed 400 may include a mattress pan 410, and a base pedestal 430 configured to support the mattress pan. The mattress pan 410 may include a mattress pan base 412 disposed horizontally and providing a surface upon which to place a mattress. An upward-sloping perimeter wall 415 is integrally formed around mattress pan base 412 and forms the inside of a perimeter rail 414. A vertical outer perimeter wall 416 forms the outside of perimeter rail 414. Transitions from perimeter walls 415, 416 and a top of the rail have rounded edges 418.

Figure 51:
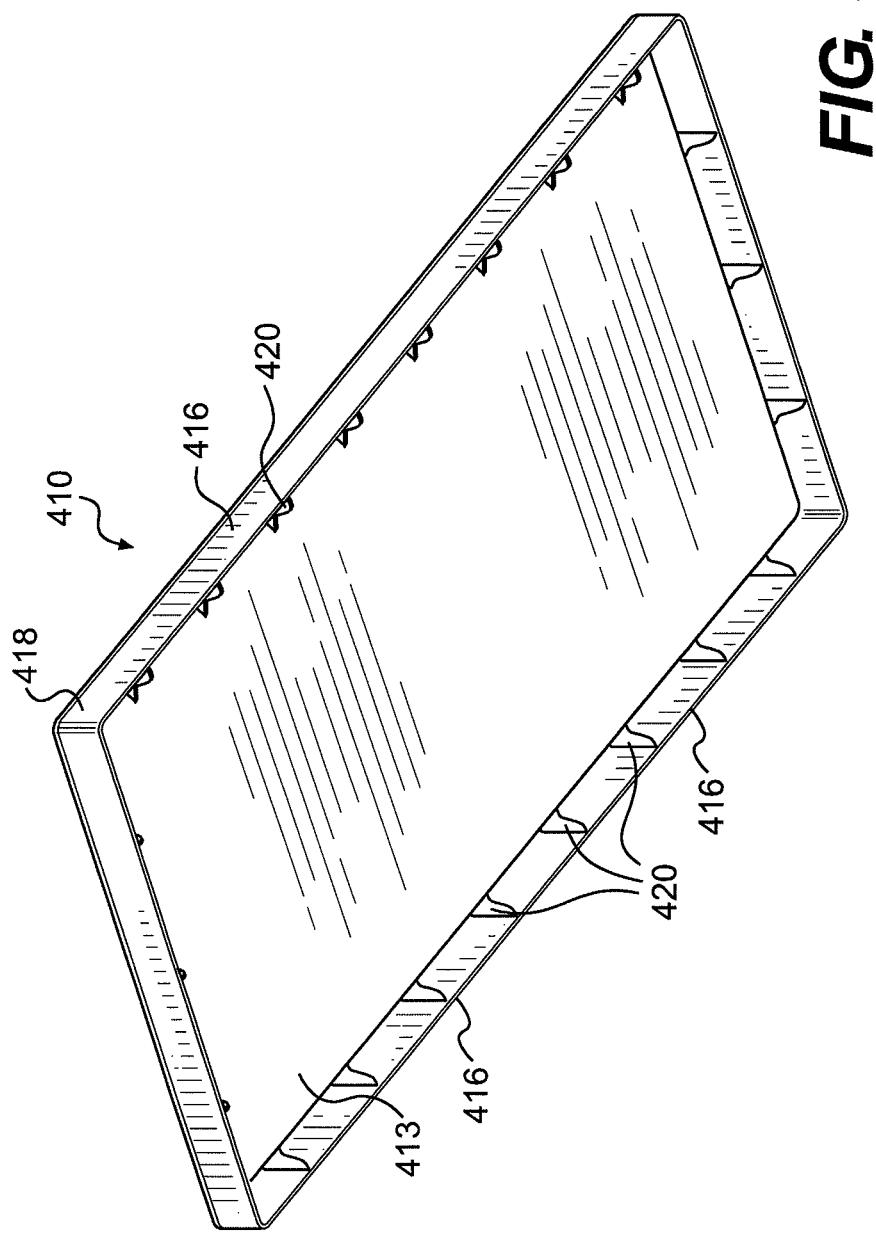
FIG. 51 is a front bottom perspective view of a mattress pan portion of the floor-mountable Bed Unit consistent with at least the embodiment(s) illustrated in FIG. 50.

An underside of the mattress pan 410 shown in FIG. 51 may include a plurality of support ribs 420 projecting inward from the underside of outer perimeter wall 416 to perimeter wall 415 and includes generally vertical members disposed intervals.

Figure 52:
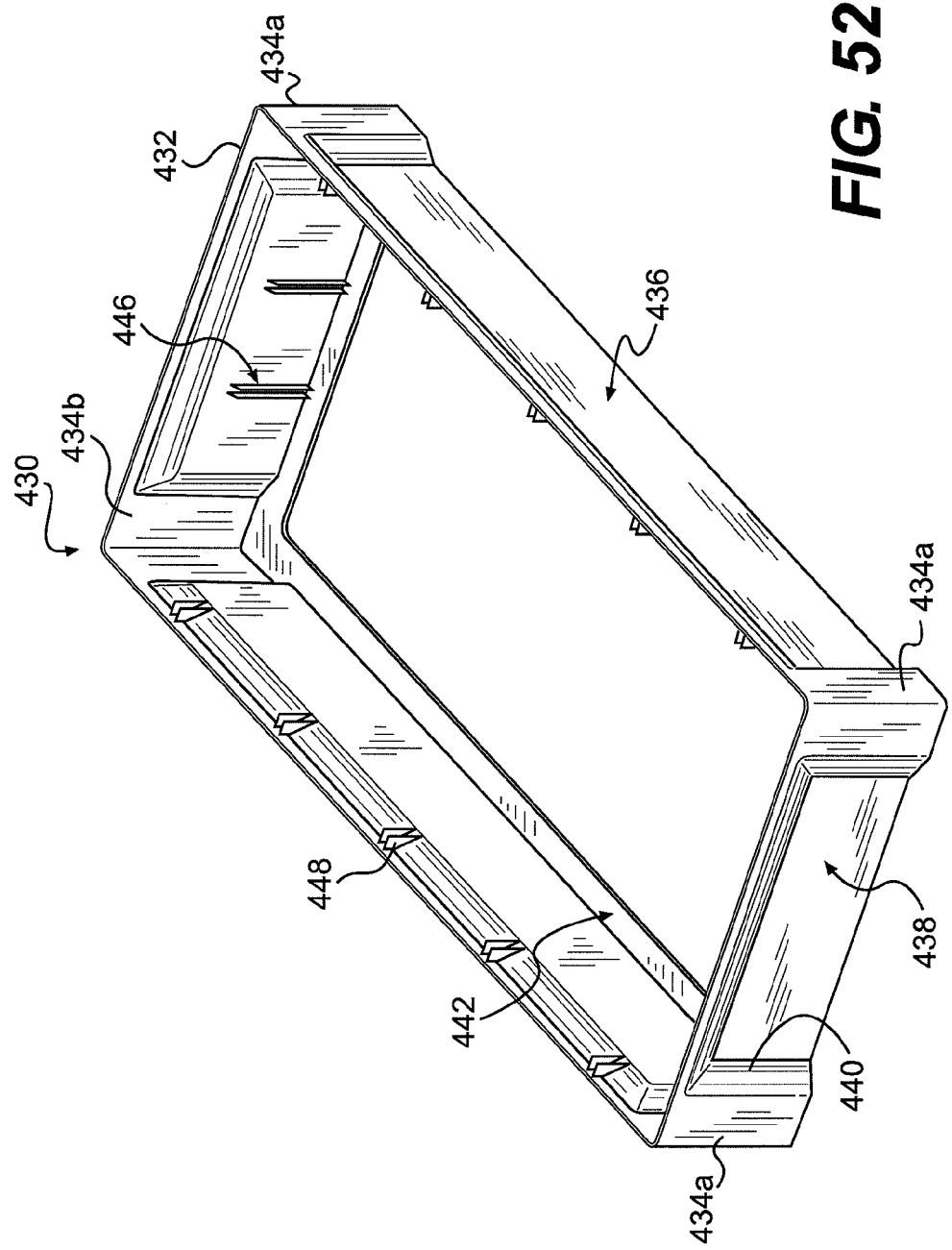
FIG. 52 is a front top perspective view of a base portion of a floor-mountable Bed Unit consistent with disclosed embodiments.
Figure 53:
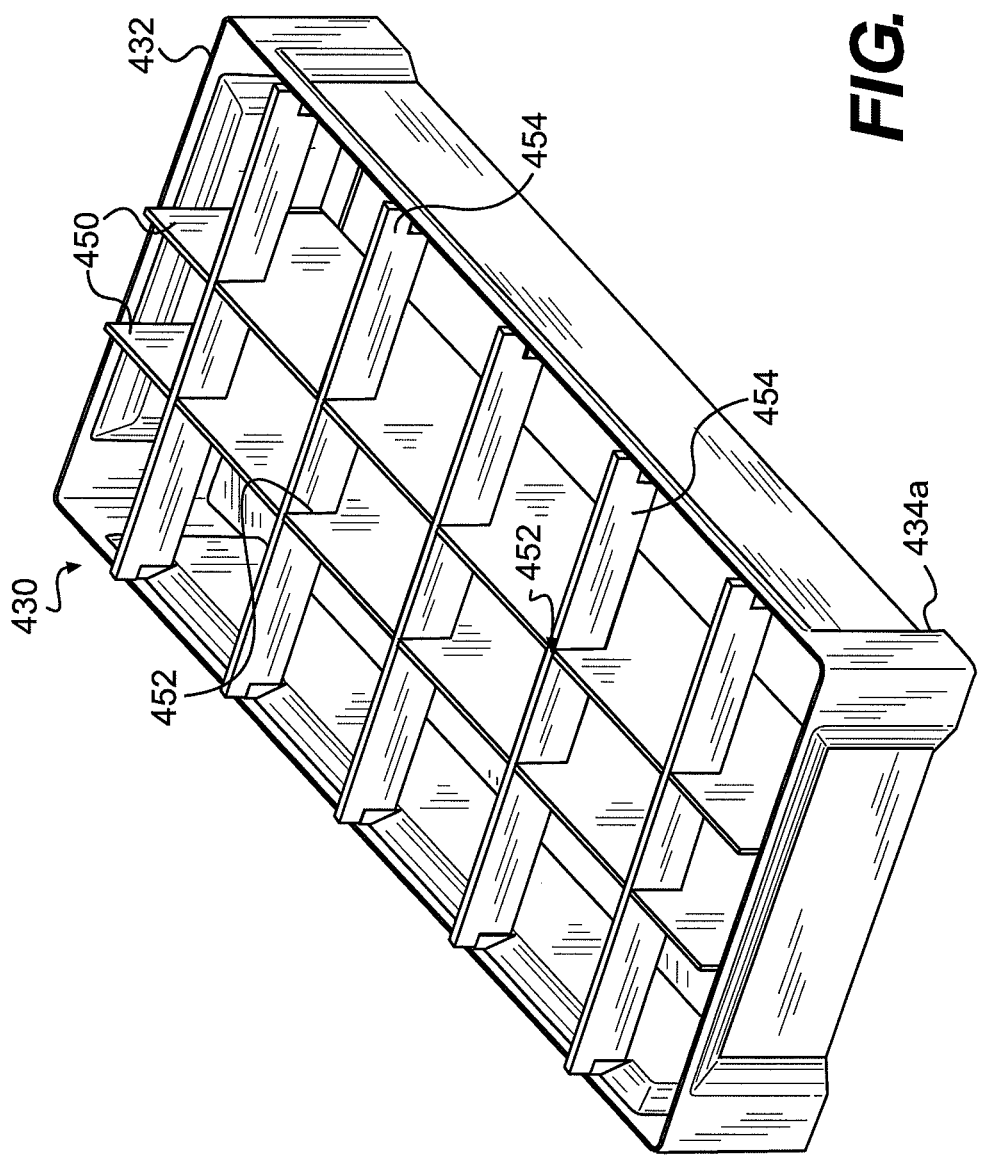
FIG. 53 is a front top perspective view of the base portion of FIG. 52 with reinforcement structure.
Figure 54:
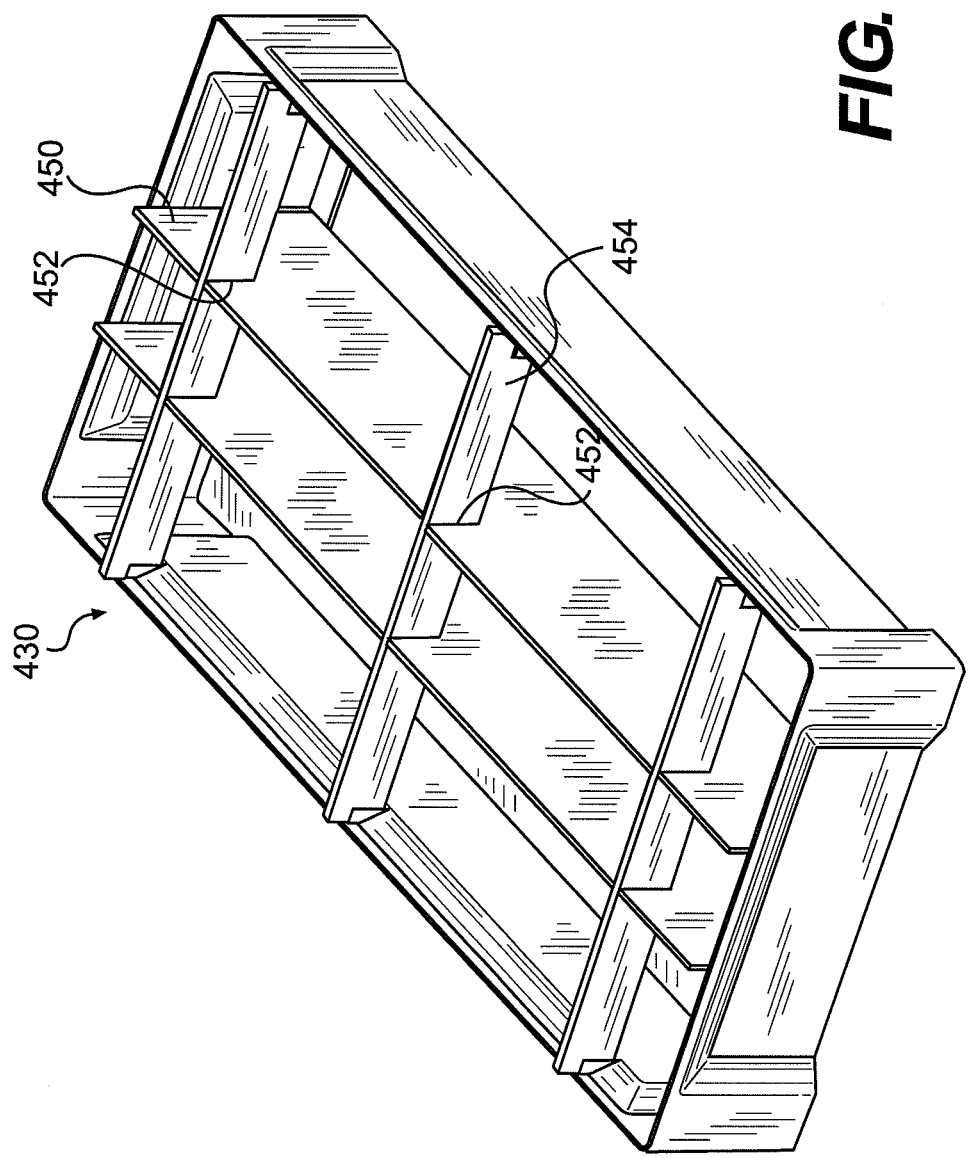
FIG. 54 is a front top perspective view of a base portion for a floor-mountable Bed Unit according to alternative embodiments disclosed herein.
Figure 55:
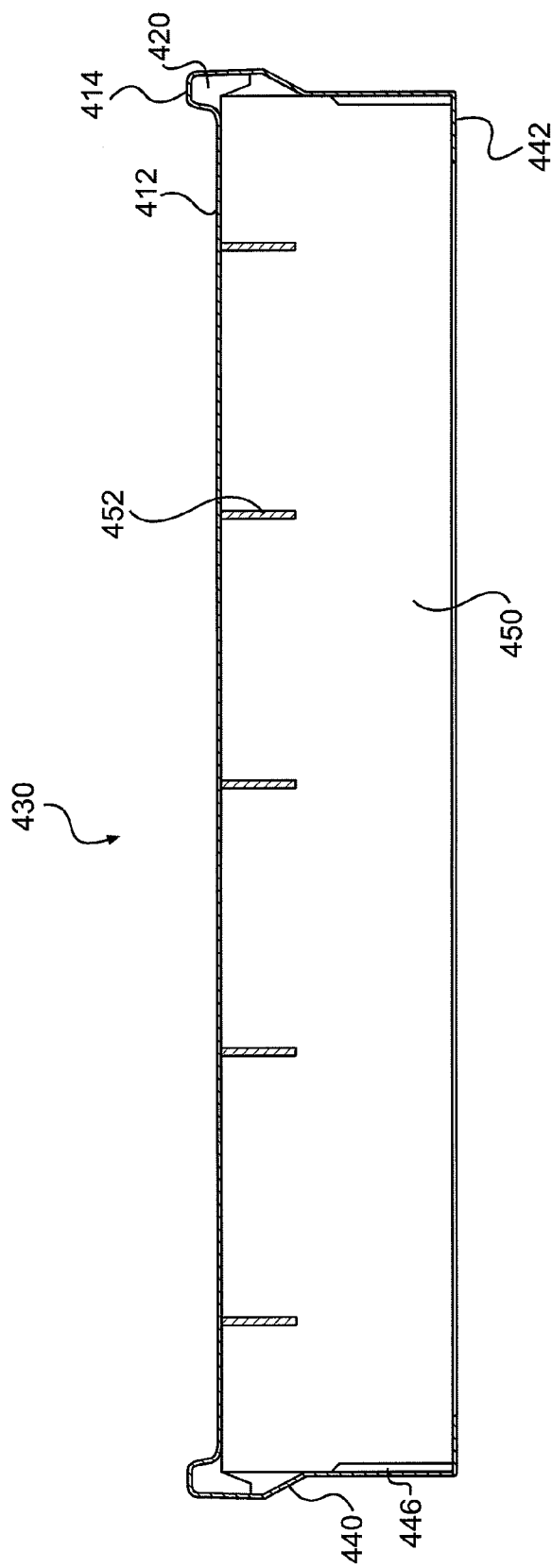
FIG. 55 is a longitudinal section view of the floor-mountable Bed Unit of FIG. 47.

A base pedestal 430, illustrated in FIGS. 52-54, includes a base wall with four vertically oriented sides forming a generally rectangular base wall 432. Each side of the rectangular wall may include a recess 436, 438. In general, base pedestal 430 may be symmetrical about a longitudinal center axis. That is, longitudinal recess 436 may be symmetrically implemented on both long sides of base pedestal 430, and short end recess 438 may be symmetrically implemented on both short sides of base pedestal 430. Each recess 436, 438 extends inwardly along a majority of the length of the corresponding rectangular base wall 432 from a center portion of each side of the base pedestal 430. A floor mounting flange 442 extends inwardly around a bottom portion of the base pedestal 430. The floor mounting flange 442 may be used for affixing the base pedestal to the floor with adhesive or by other means (e.g., mechanical means). Corner posts 434a, 434b are formed by the recesses 436, 438 and rectangular base walls 432. A bevel 440 marks a transition between each rectangular base wall 432 and corresponding recess wall 436 or 438. Each recess 436, 438 may provide an area 444 for a locker 460 (shown in later Figures).

Interior portions of rectangular base walls 432 and/or walls of recesses 436, 438 may include longitudinal support guides 446 or transverse support guides 448 respectively configured to accommodate longitudinal supports 450 or transverse supports 454. Longitudinal support guides 446 disposed at a lower inner face of vertical walls of short end recesses 438, and transverse support guides 448 may be located on the upper bevel of an inner portion of longitudinal recess 436. According to some embodiments, support guides are provided for two longitudinal supports 450 and five transverse supports 454. However, other embodiments may include support guides and/or corresponding supports for zero or more supports in either longitudinal or transverse directions. Each longitudinal support 450 may include slots 452 for interlocking with transverse supports 454 as best viewed in FIG. 55.

A mattress pan and base may be joined at a mattress pan to base joint 456, which may comprise a lap joint (FIG. 56) or other joint type.

Figure 56:
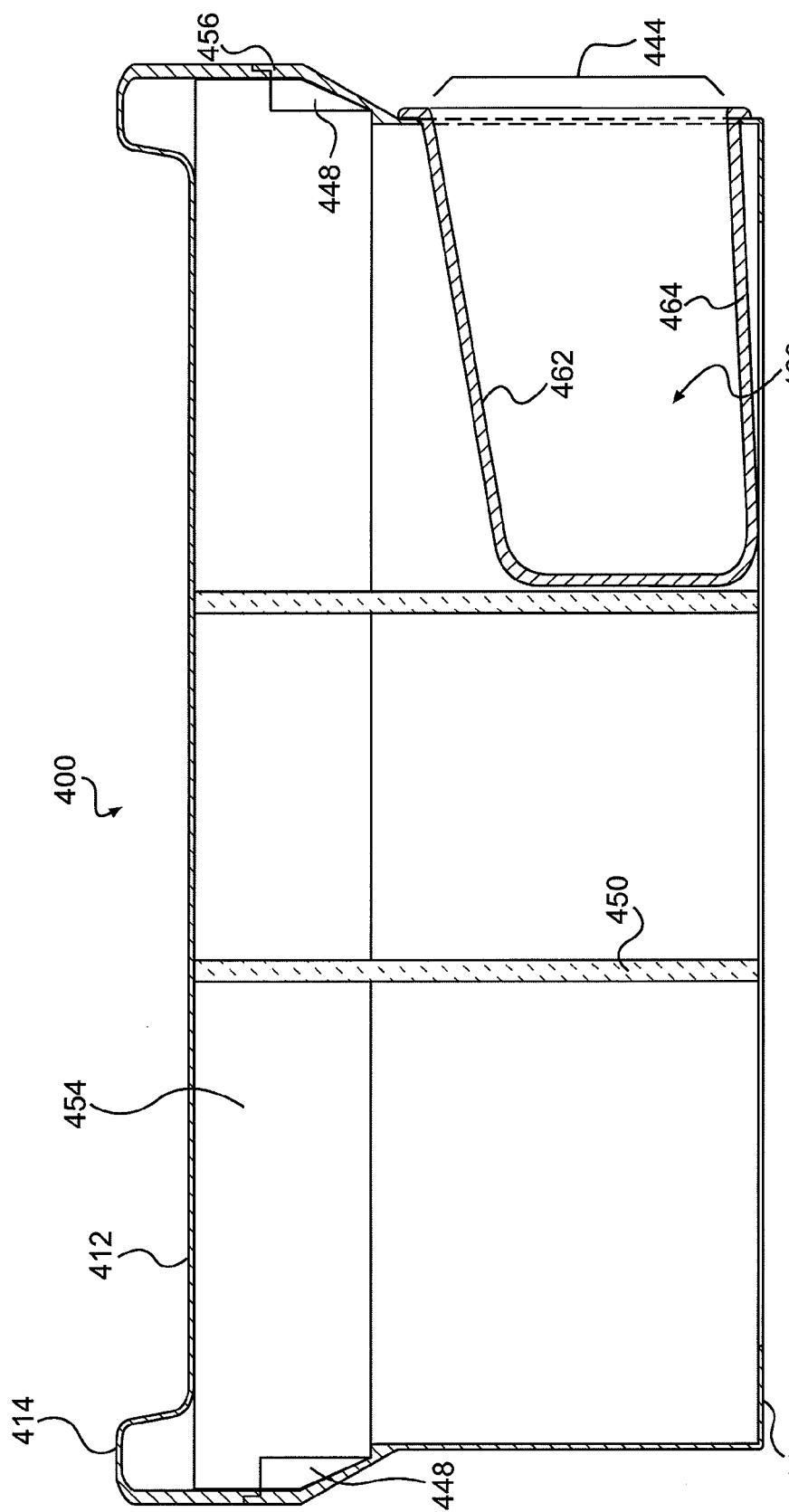
FIG. 56 is a transverse cross-section view of the floor-mountable Bed Unit of FIG. 47
Figure 57:
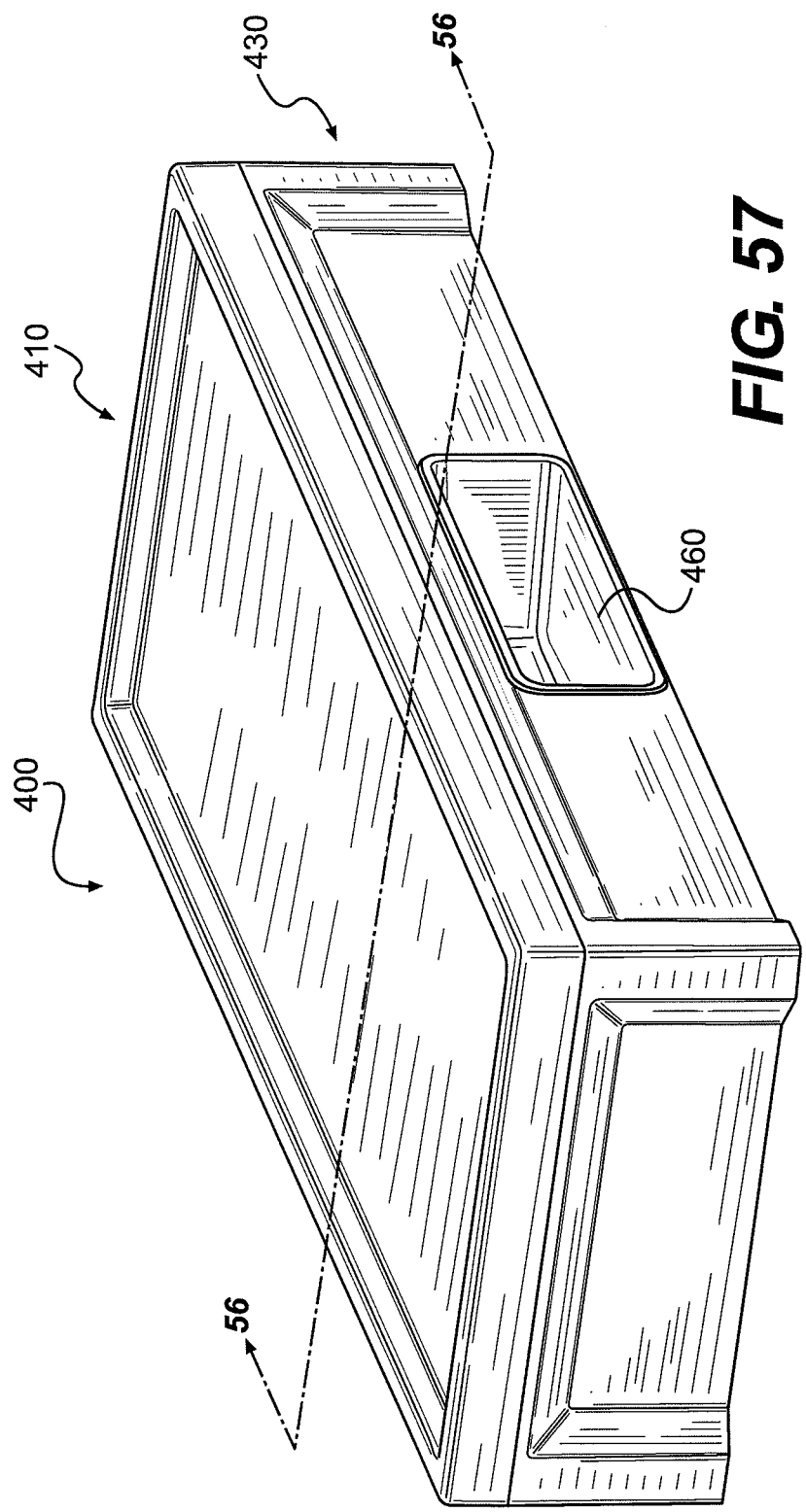
FIG. 57 is a front top perspective view of a floor-mountable Bed Unit consistent with some disclosed embodiments.
Figure 58:
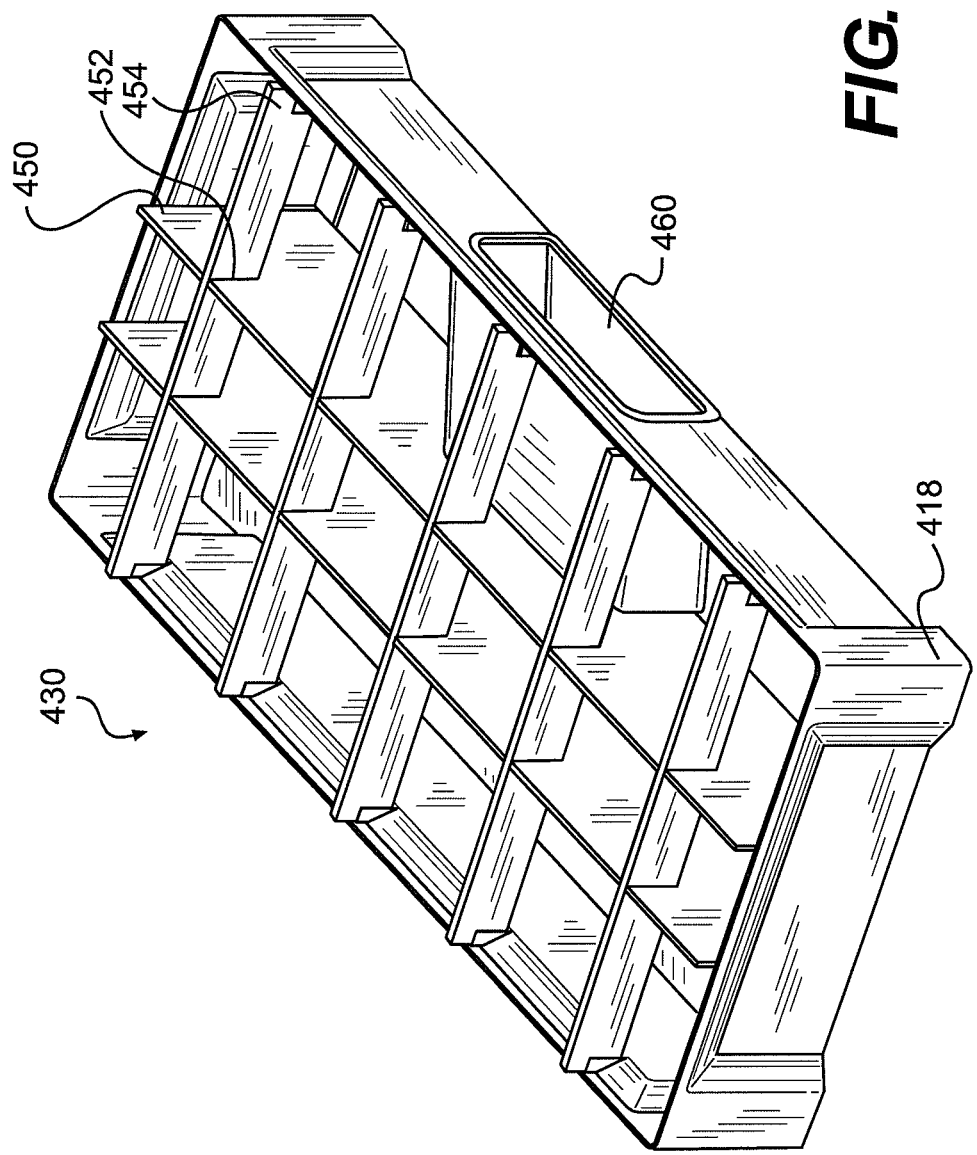
FIG. 58 is a front top perspective view of a base portion of the floor-mountable Bed Unit of FIG. 57.
Figure 59:
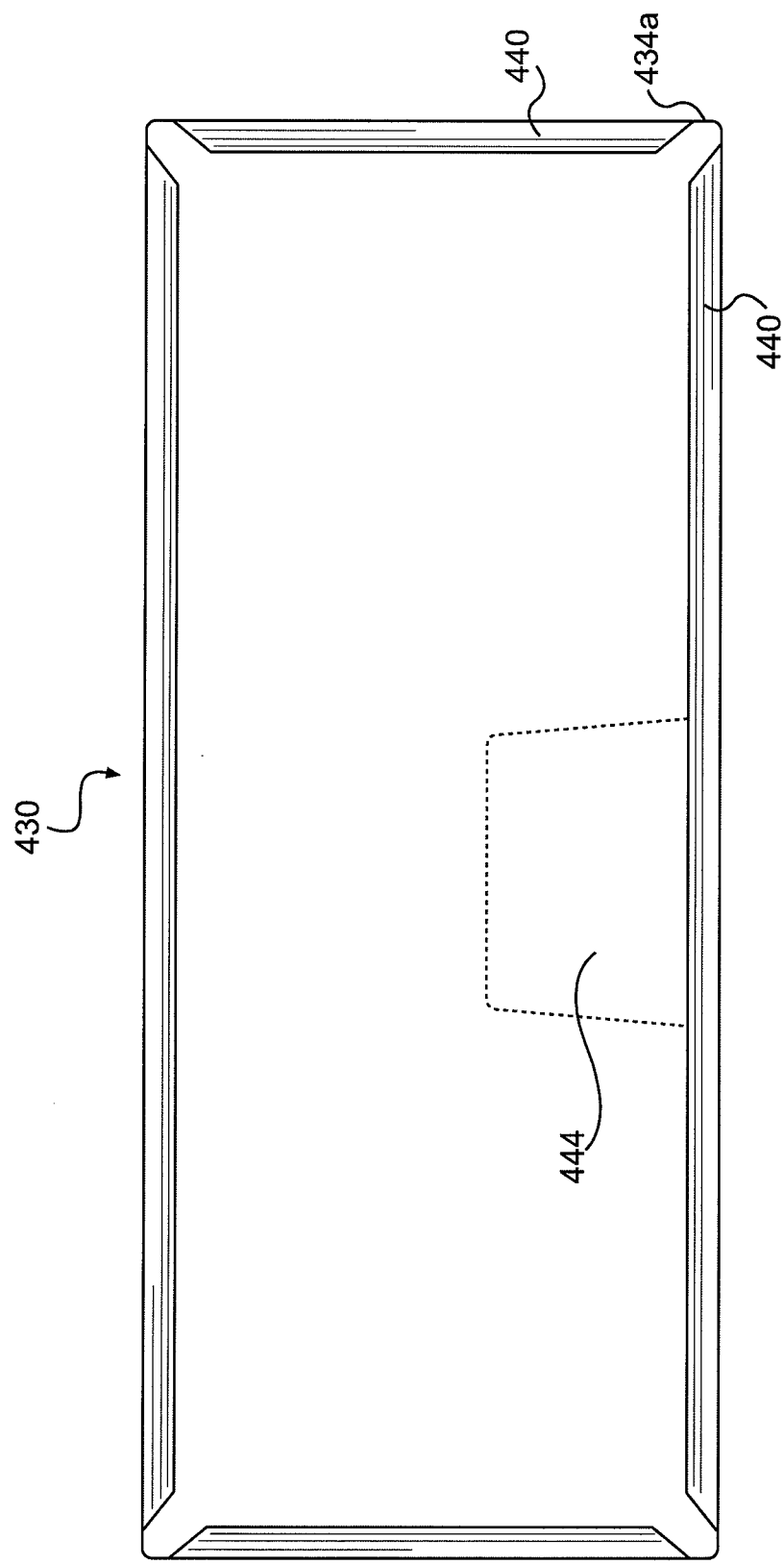
FIG. 59 is a bottom view of the floor-mountable Bed Unit of FIG. 47.

As shown in FIGS. 56-58, when a locker 460 is utilized, a hole is opened in a locker area 444 of the vertical wall of recess 436 or 438 to accommodate the locker. The locker 460 includes a roof 462 sloping downward from the side-facing opening of the locker toward a back wall of the locker. Similarly, a locker floor 464 slopes downward from an opening toward a rear wall of the locker. It may be appreciated that one or more lockers may be included in the lower bed unit.

Wall-Mountable Bed Unit

Figure 60:
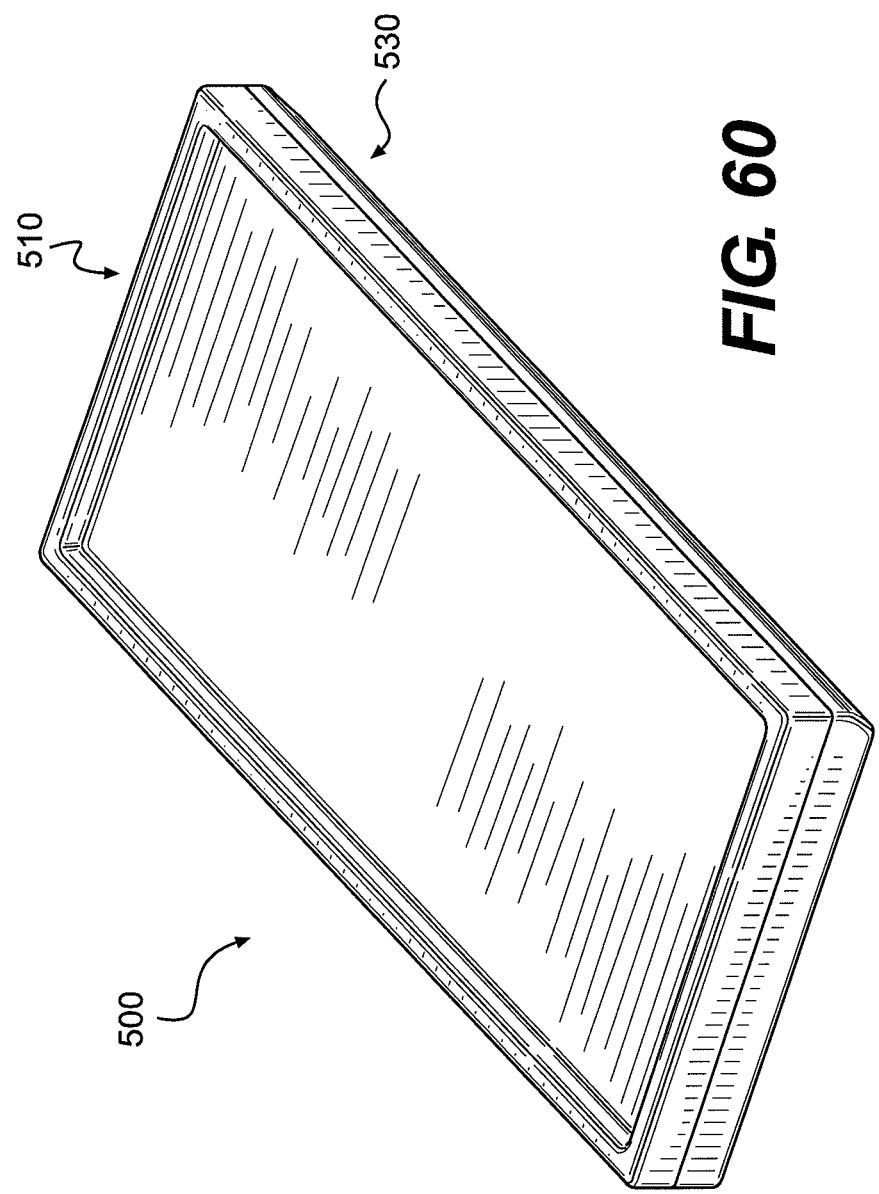
FIG. 60 is a front top perspective of a wall-mountable Bed Unit consistent with embodiments disclosed herein.
Figure 61:
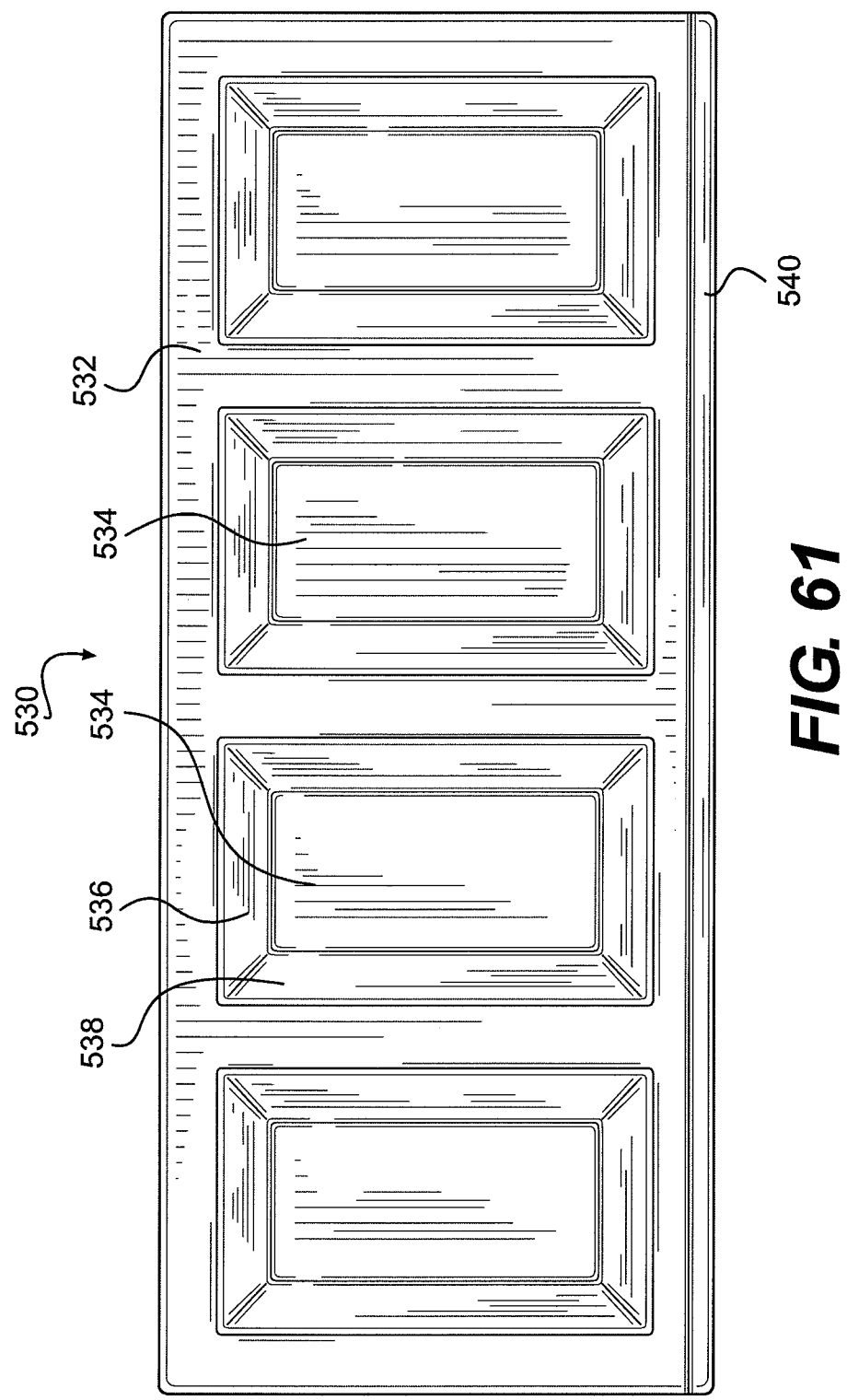
FIG. 61 is a bottom view of the wall-mountable Bed Unit of FIG. 60.

FIGS. 60-74 depict a plurality of example embodiments of a wall-mountable bed 500. Wall-mountable bed 500 as depicted in FIG. 60 may be mounted to a wall at one or more sides. Additionally or alternatively, the bed may be bonded to the wall(s) using an adhesive. Additionally or alternatively, the bed may be affixed and/or bonded to the floor.

The upper bed may include a base 530, a frame 570, and a mattress pan 510 as depicted in the figures. The base 530 of the wall-mountable bed 500 may be formed to allow no access to the frame of the bed when it is properly installed. This prevents use of the bed as a means to harm the user.

In a first embodiment, wall-mountable bed 500 includes a mattress pan 510 in the base 530. The base 530 includes generally planar horizontal member 532 from which support recesses 534 project upward each up for projecting support recess 534 including a horizontal surface integrated with longitudinal support bevels 536 and transverse support bevels 538 which transition to horizontal member 532. In addition, a horizontal access bevel 540 may be formed along an exterior bottom edge.

Figure 62:
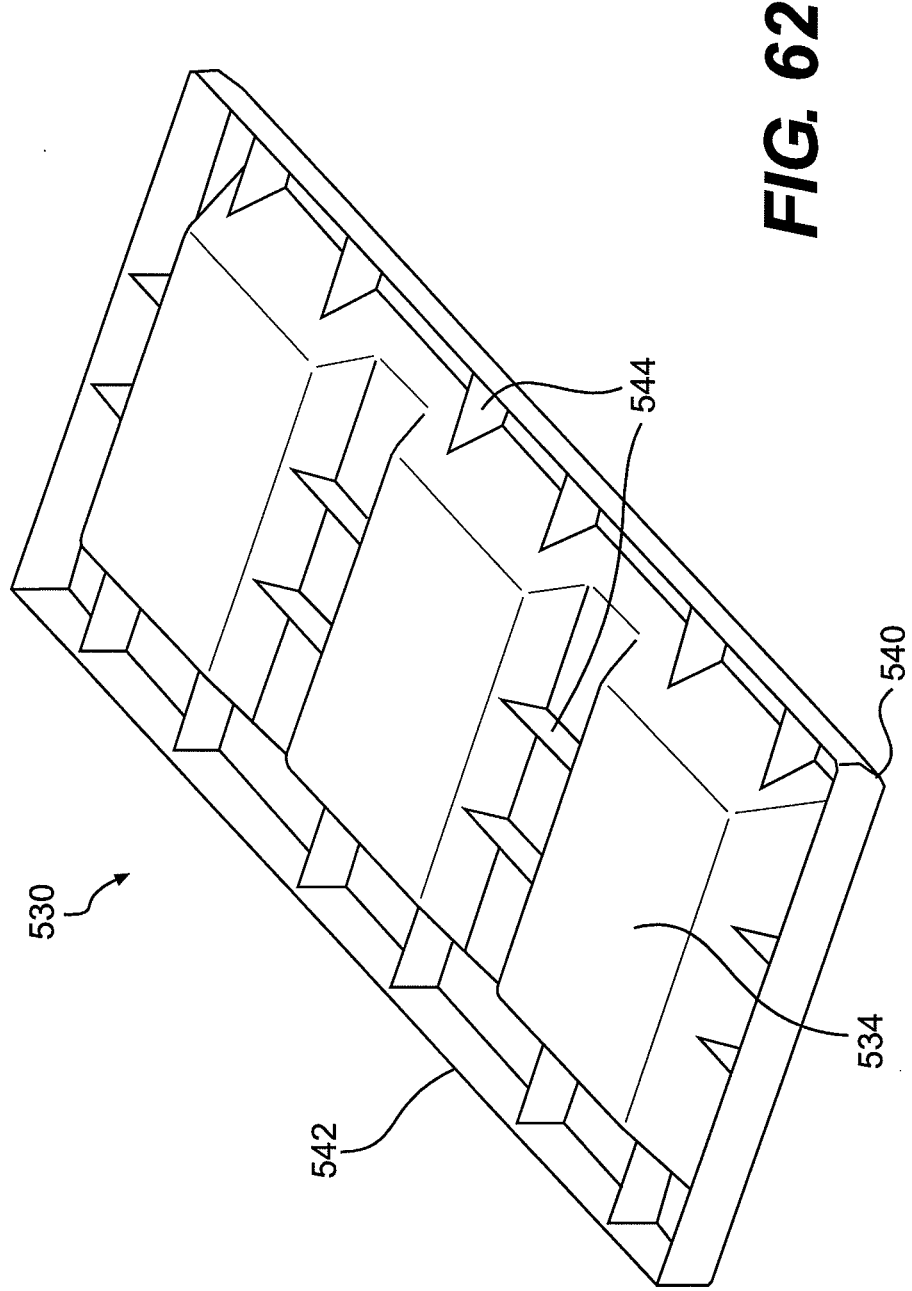
FIG. 62 is a top front perspective view of a base portion of a wall-mountable Bed Unit consistent with the disclosure.

In some embodiments, for example shown in FIG. 62, support ribs 544 extend inward from a base perimeter wall 542 and between support recesses 534.

Figure 63A:
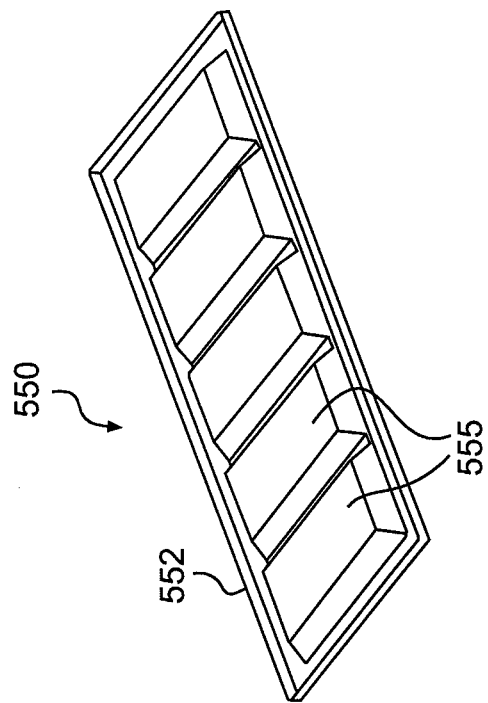
FIGS. 63A and 63B are, respectively bottom front and top front perspective views of a base portion of a wall-mountable Bed Unit consistent with the disclosure.
Figure 63B:
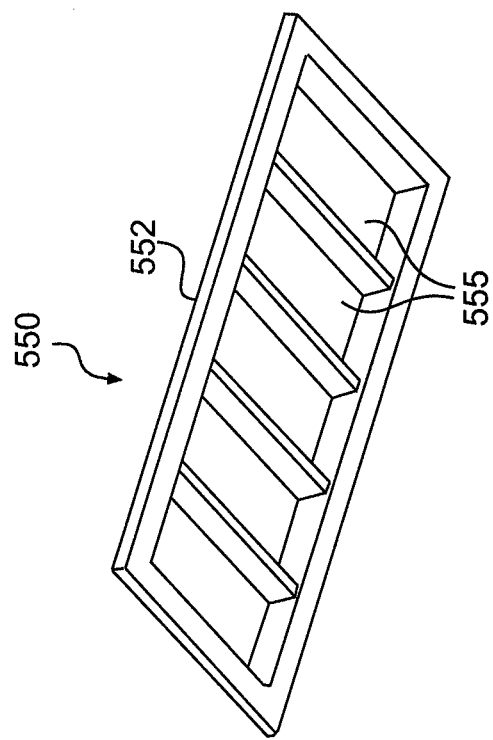

In other embodiments, for example shown in FIGS. 63A-63B, a short base perimeter wall 552 may extend around one or more sides of the base unit 550.

Figure 64:
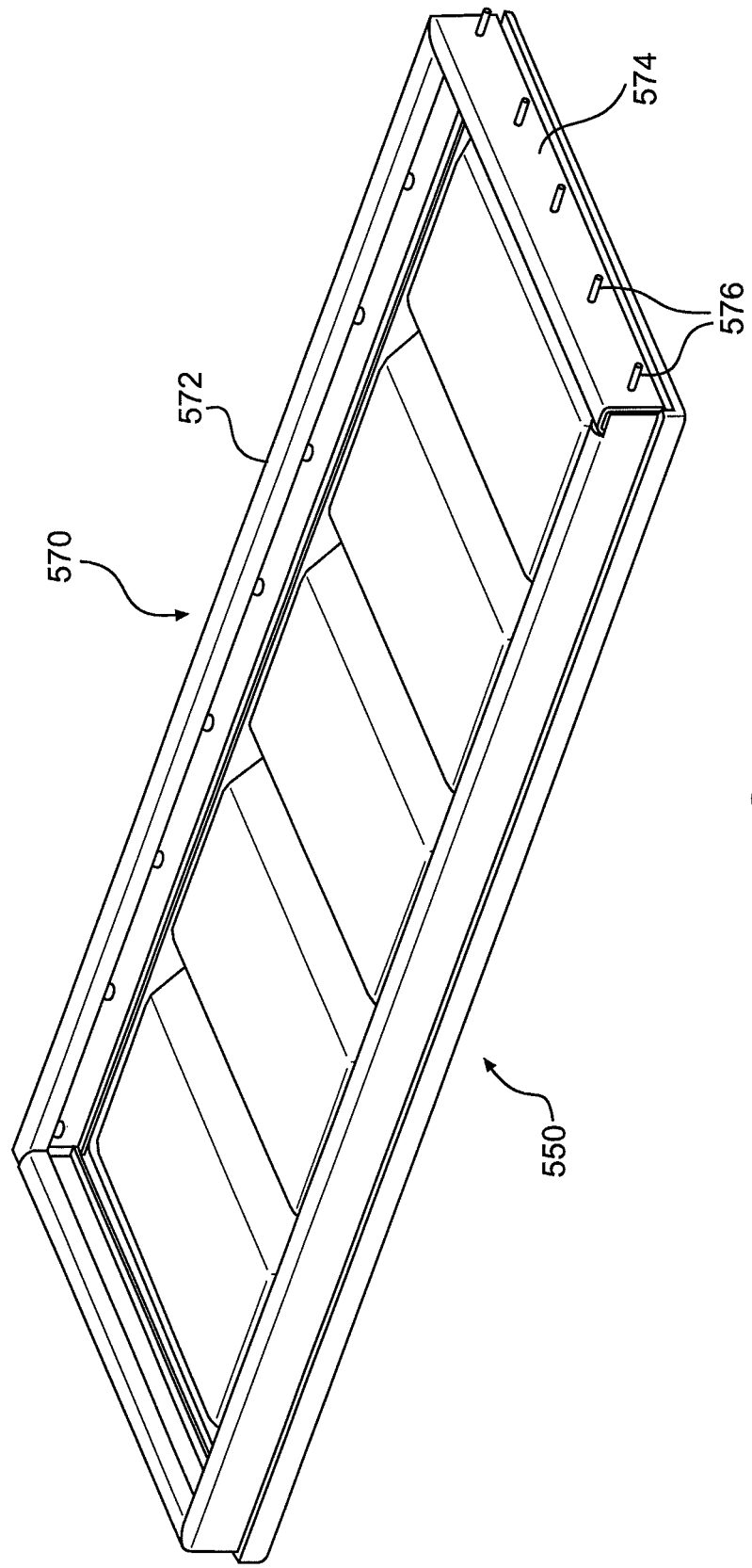
FIG. 64 is a top front perspective view of a base portion and frame of a wall-mountable Bed Unit consistent with the disclosure.

Frame 570 comprises longitudinal channels 572 and transverse channels 574 arranged to form a rectangular of similar size to the perimeter of base unit 550. Longitudinal and transverse channels 572, 574 may be formed of steel channel or composite material. In some embodiments, exterior portions of one or more of the longitudinal and transverse channels 572, 574 may include means for attaching the frame to a wall or walls. For example, anchor bolts 576 may be disposed at intervals along wall-facing channels. FIG. 64 illustrates one embodiment, where two sides include means for wall attachment.

Figure 65:
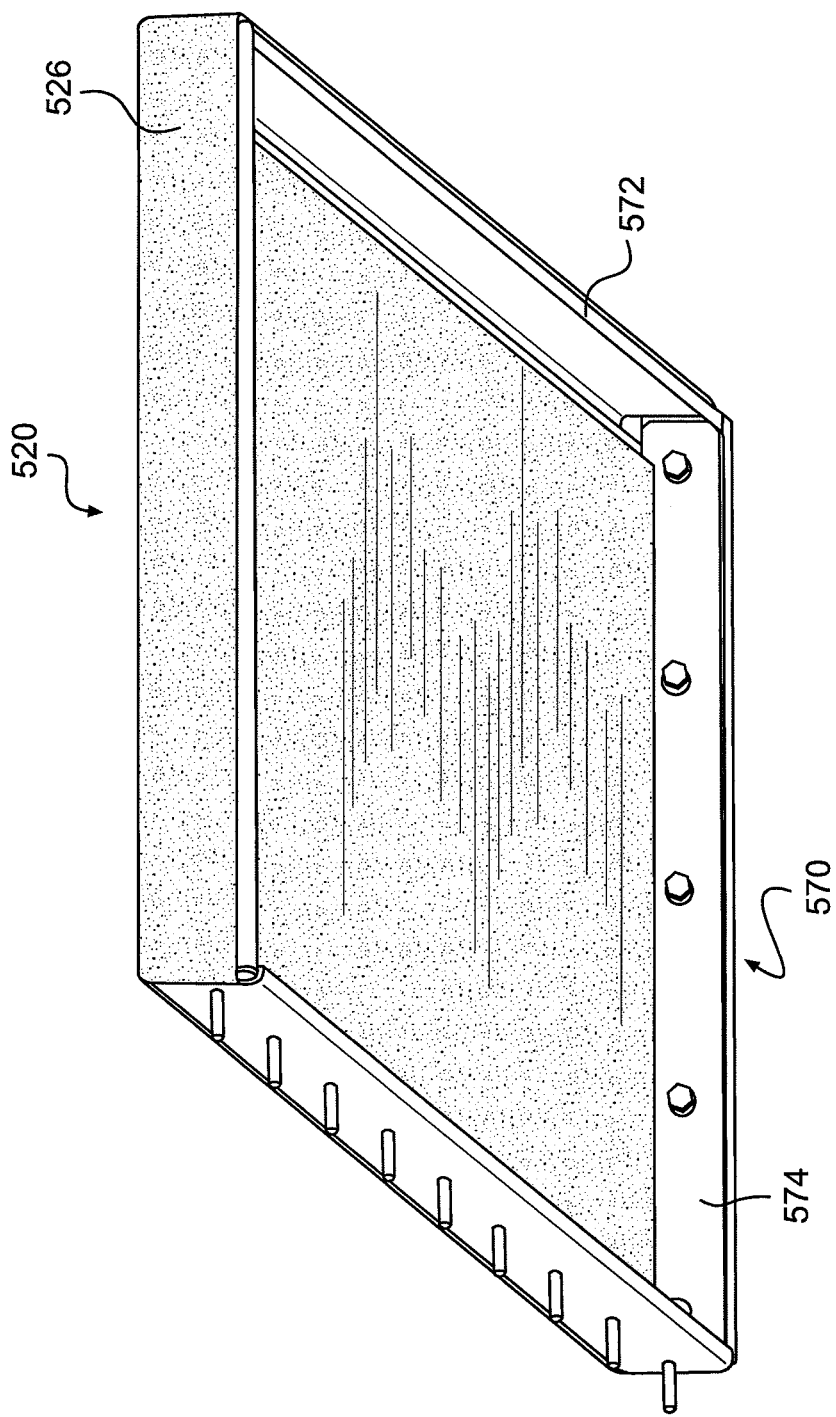
FIG. 65 is a bottom side perspective view of a frame and mattress pan of a wall-mountable Bed Unit consistent with the disclosure.
Figure 66:
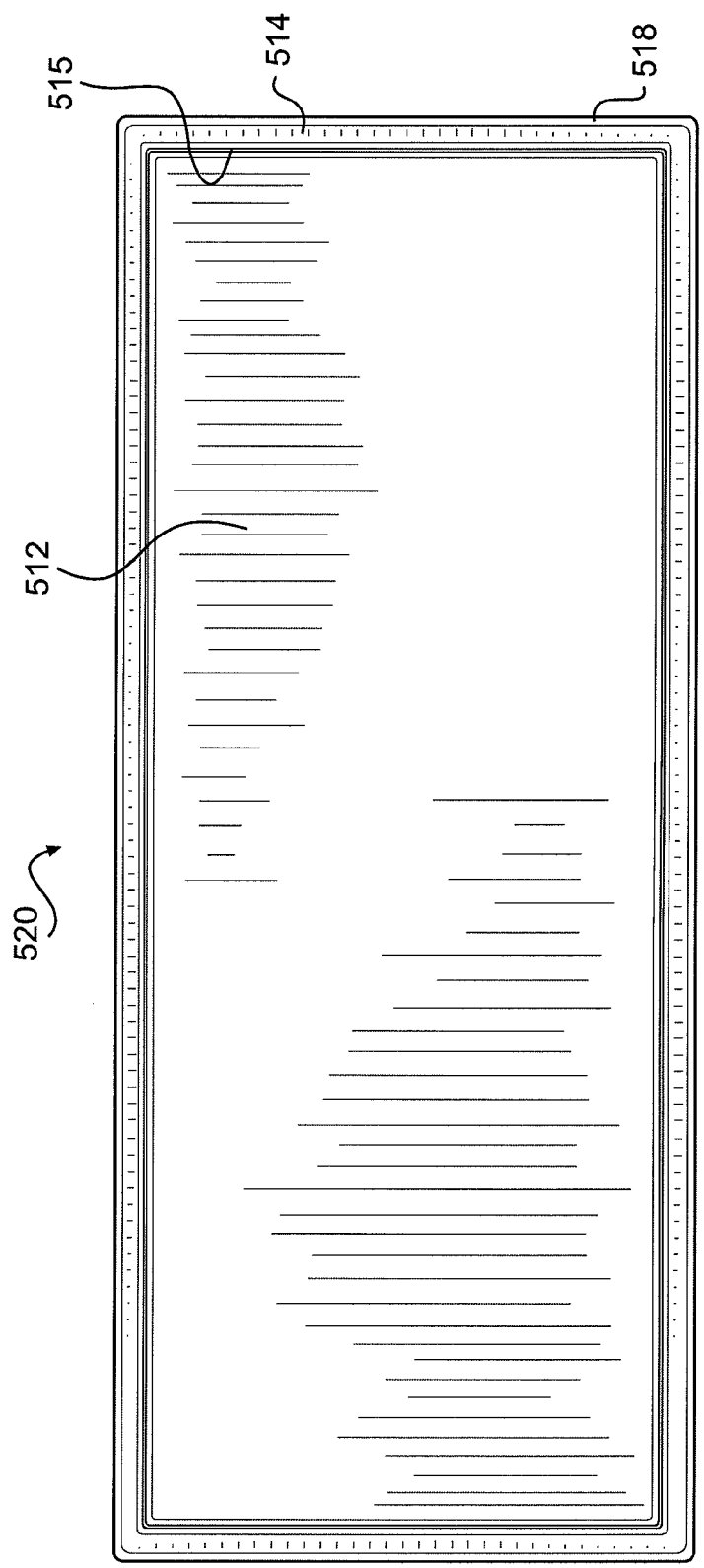
FIG. 66 is a top/plan view of the wall-mountable Bed Unit consistent with some disclosed embodiments.
Figure 67:
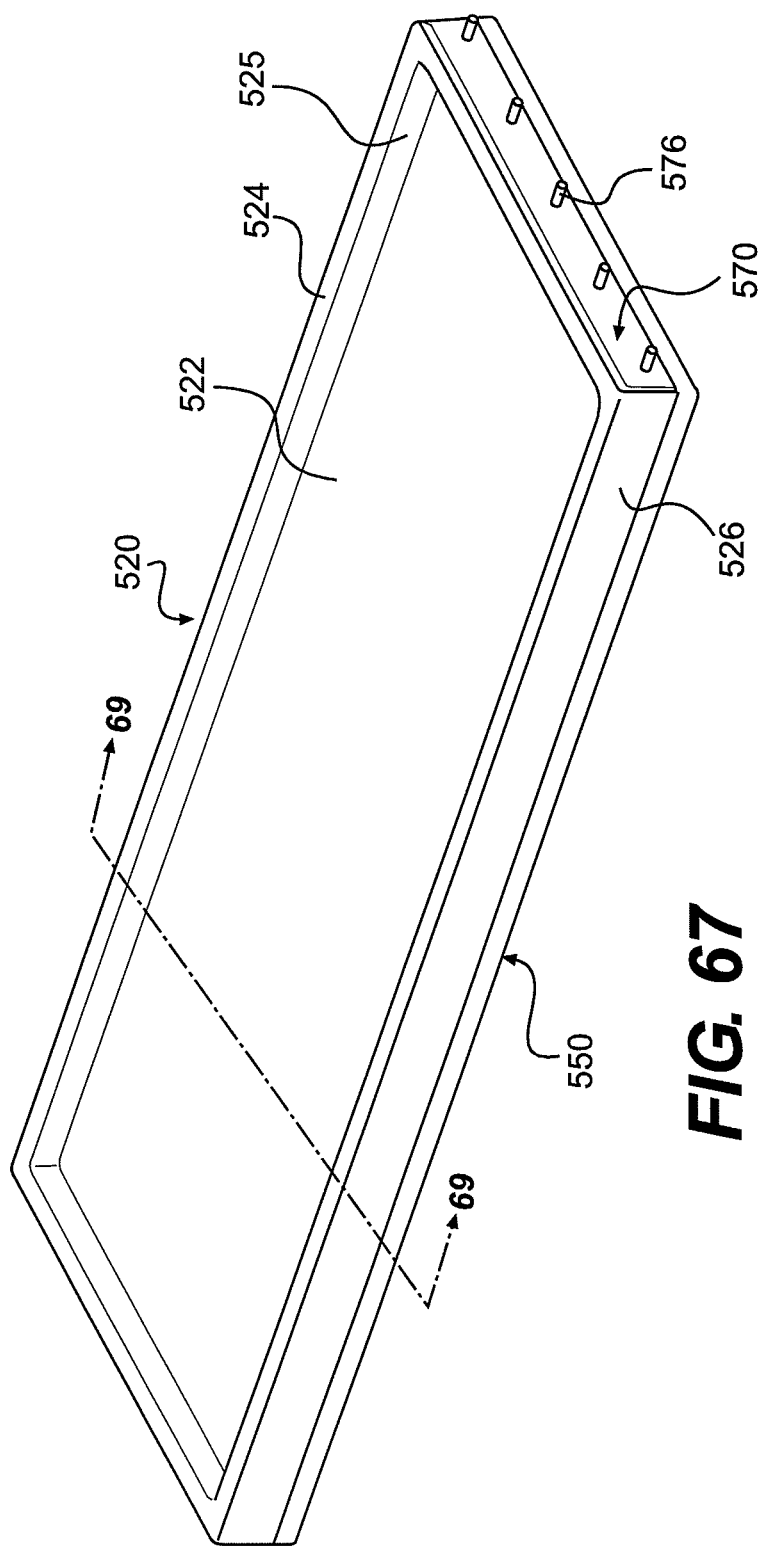
FIG. 67 is a top front perspective view of a wall-mountable Bed Unit consistent with some disclosed embodiments.
Figure 68:
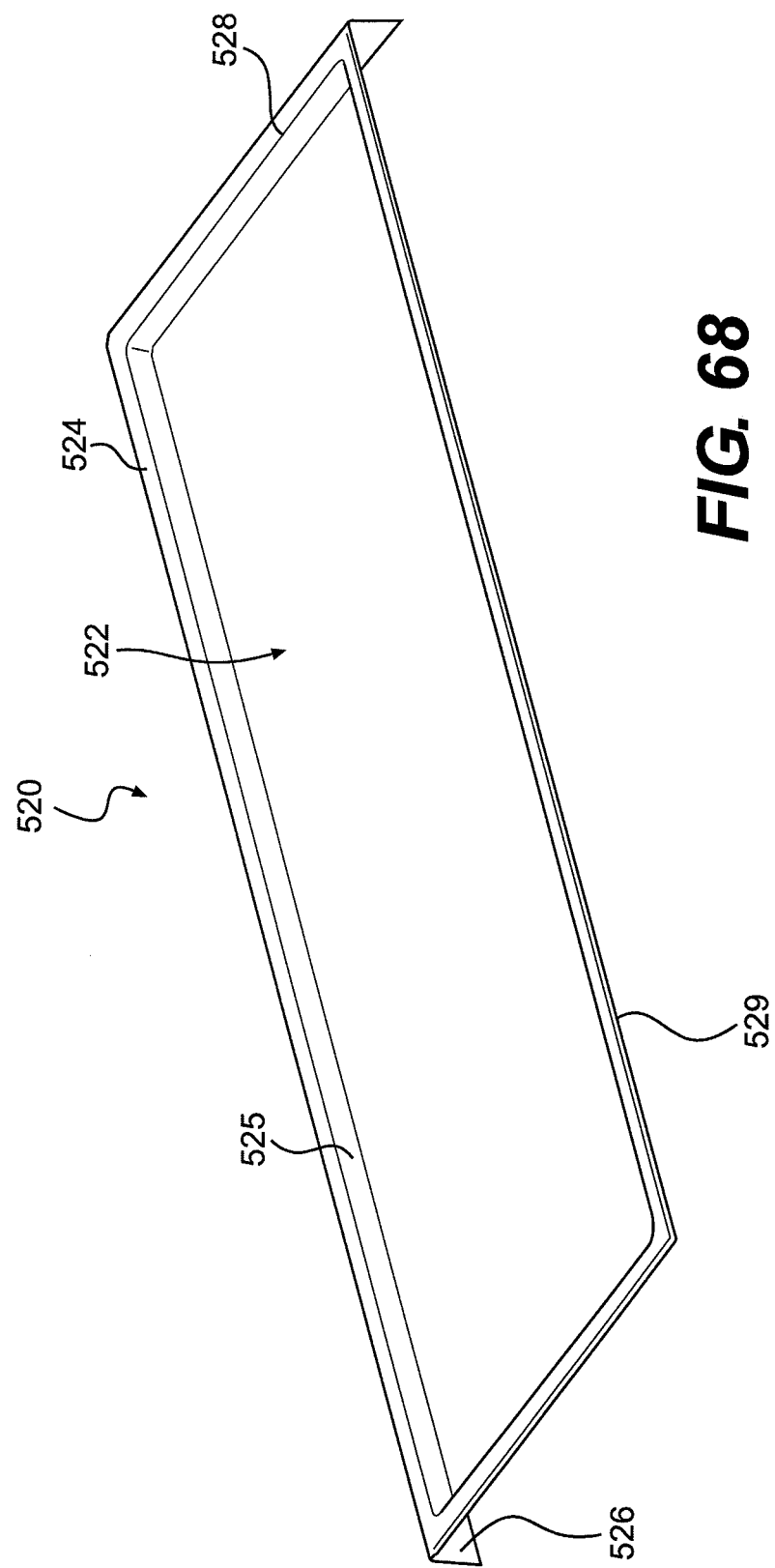
FIG. 68 is a top rear perspective view of a mattress pan consistent with some embodiments of a wall-mountable Bed Unit.
Figure 69:
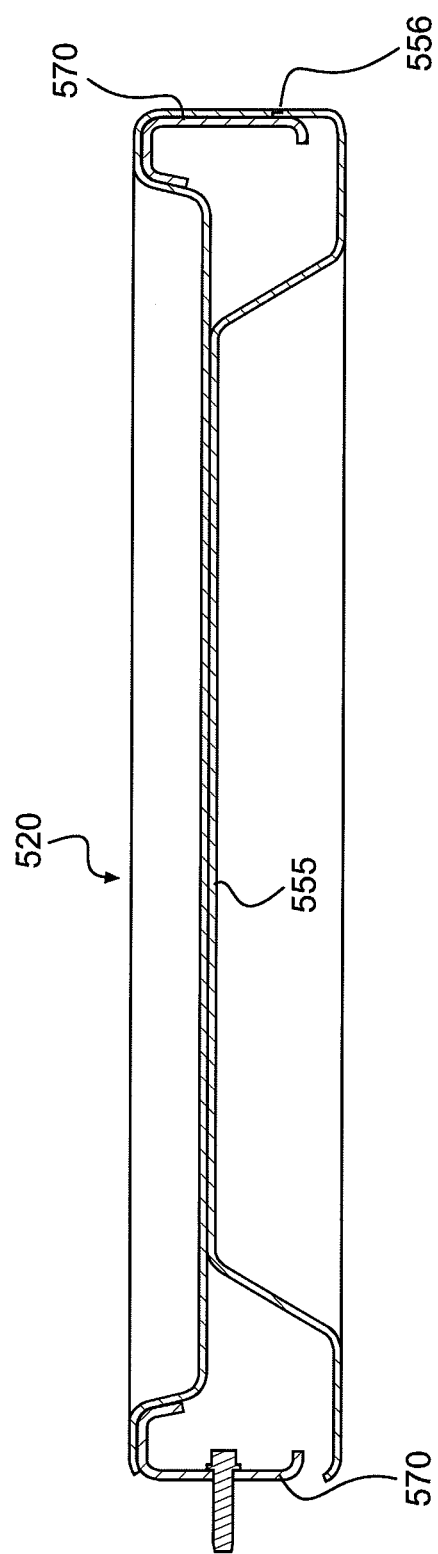
FIG. 69 is a transverse cross-section view of the wall-mountable Bed Unit of FIG. 67.
Figure 70:
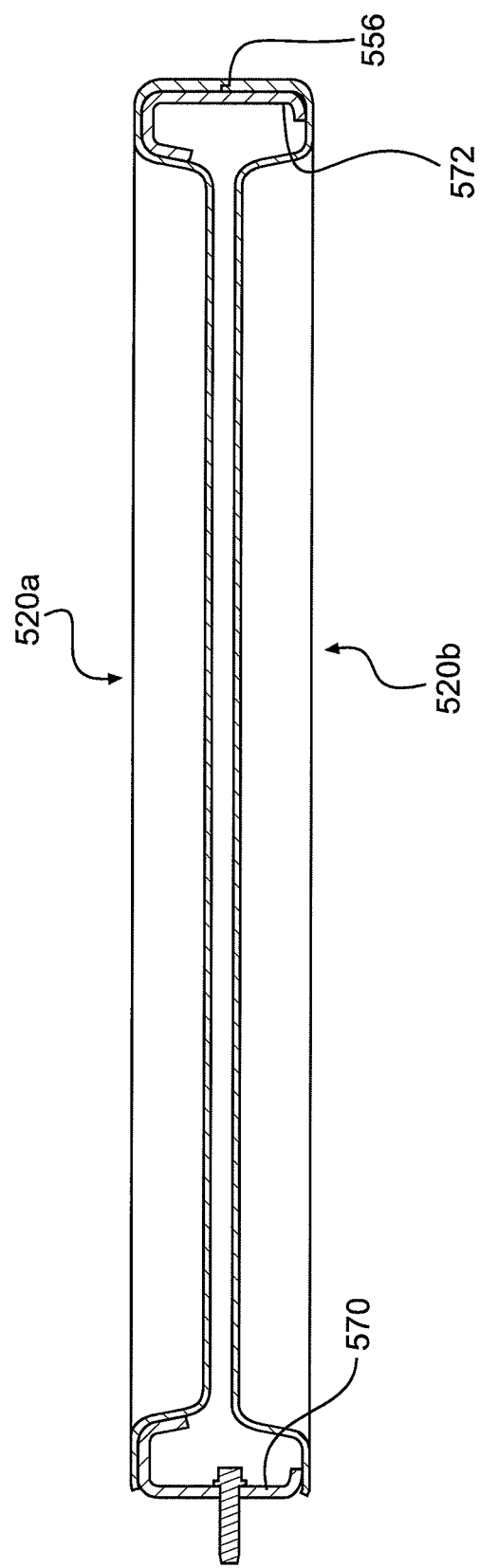
FIG. 70 is a transverse cross-section view of a wall-mountable Bed Unit consistent with some disclosed embodiments.

FIG. 65 illustrates an embodiment of a mattress pan 520 and frame 570 from a bottom perspective. It is noted that mattress pan 520 for attachment with frame 570 includes an outer vertical wall that does not extend around sides which will be mounted to a wall. It is to be appreciated that a mattress pan 520 having a full outer vertical wall may by trimmed during installation to remove mounting-side portions, or the mattress pan may be formed without the sides. FIG. 67 shows the embodiment of FIG. 65 with the addition of a base unit 550. Mattress pan 520 is shown alone in FIG. 68. Rear edge 529 of the mattress pan does not include a vertical wall portion in order to accommodate a direct wall attachment to a frame portion. Cross sectional view FIG. 69 best illustrates the supporting nature of the support recess 555. Support recess 555 provides additional rigidity to a mattress pan base 522 of mattress pan 520.

In an alternative embodiment, the base 520b of the wall mount bed unit is substantially similar to the mattress pan 520a. Although shown spaced apart in FIG. 70, the mattress pan base 522 and its analog for base 520b may be extended so that the touch providing additional support.

Figure 71:
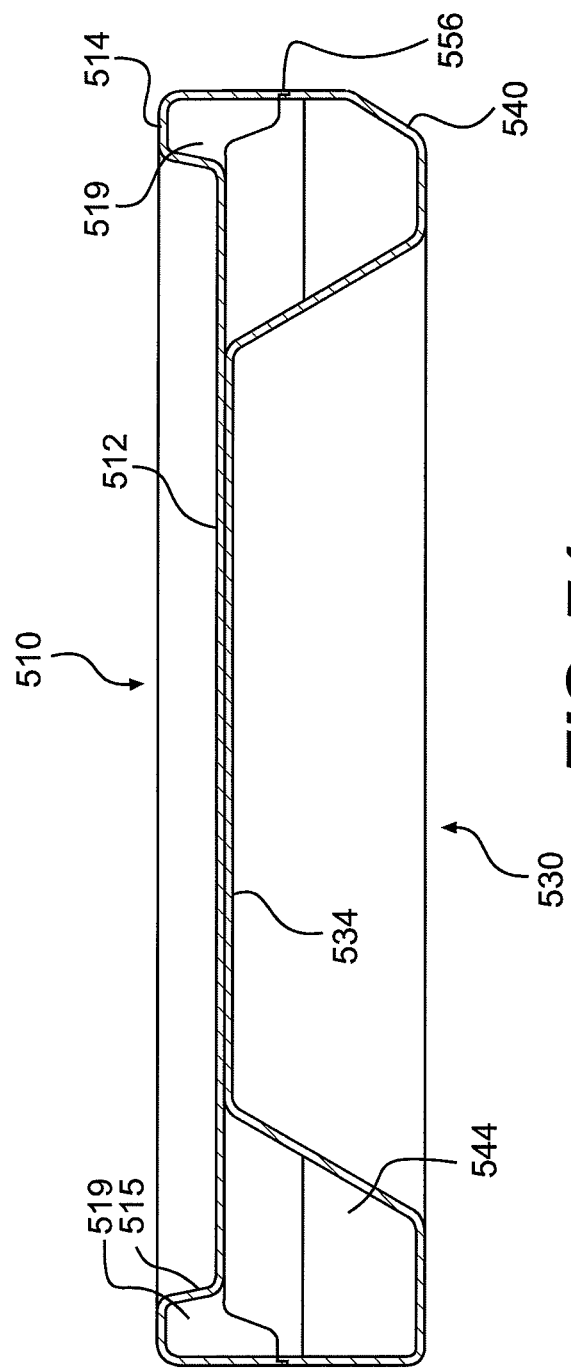
FIG. 71 is a transverse cross-section view of the wall-mountable Bed Unit of FIG. 60.
Figure 72:
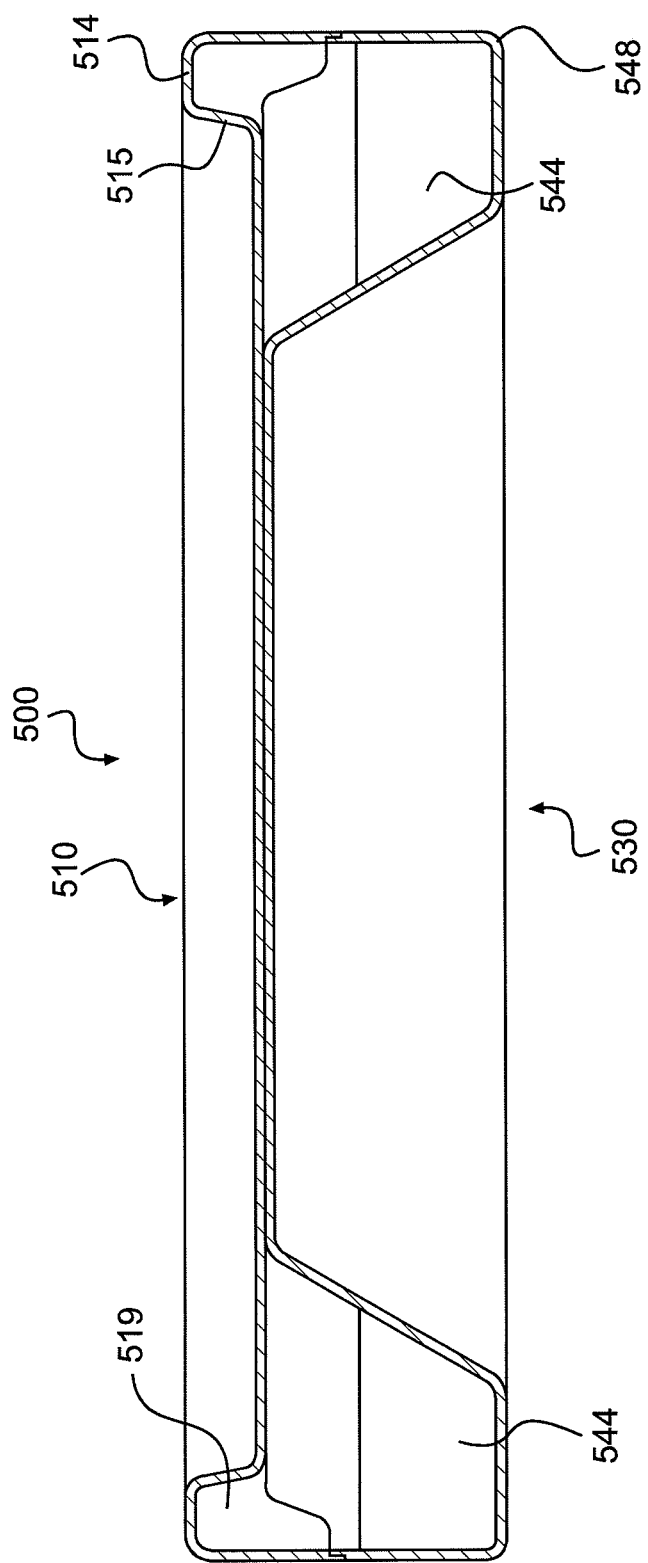
FIG. 72 is a transverse cross-section view of a wall-mountable Bed Unit according to a disclosed alternative embodiment.
Figure 73:
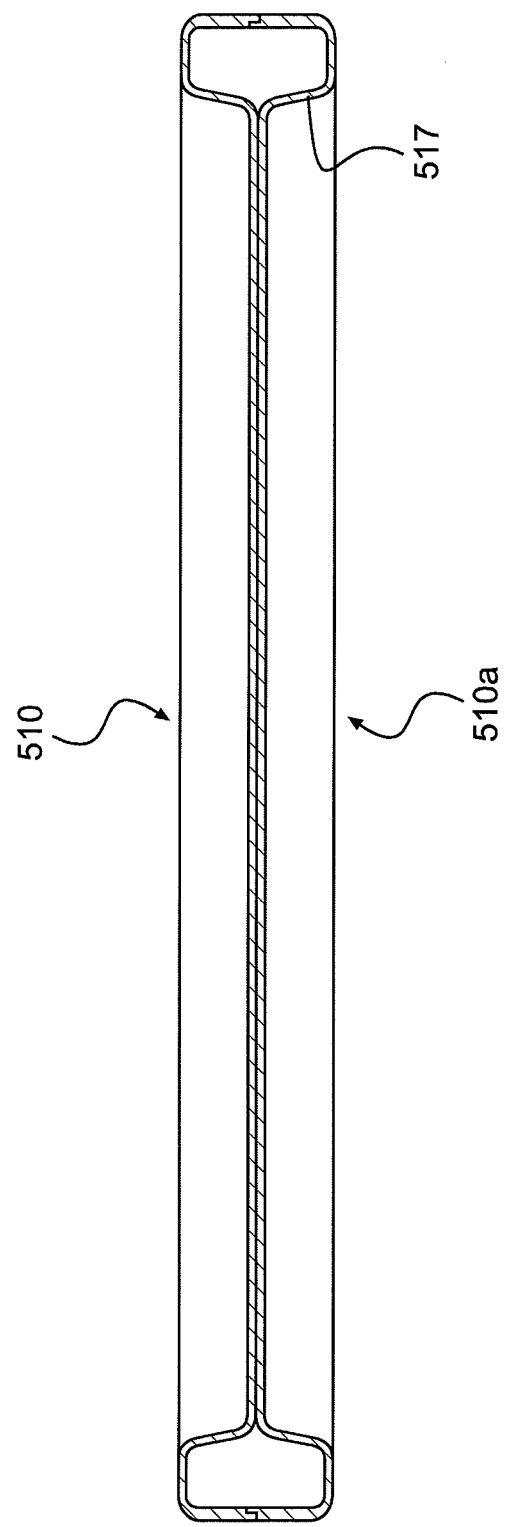
FIG. 73 is a transverse cross-section view of a wall-mountable Bed Unit according to another disclosed alternative embodiment.

FIG. 71 illustrates cross-section of a wall-mountable bed that does not utilize a frame. Mattress pan 510 and base 530 together form a bed having a large perimeter wall that can be adhesively connected directly to the wall. Additional support ribs 519 and 544 strengthen the bed for such purposes. Access bevel 540 may be desirable for safety and the bed is used as, for example, an upper bunk. This embodiment may also be utilized in a floor-standing installation. However, the embodiment disclosed in FIG. 72 may also be appropriate with its non-beveled edge 548. FIG. 73 illustrates an alternative embodiment in which no frame is utilized and in which both upper mattress pan 510 and lower portion 510a sides are substantially identical. Joint portion 517 may be configured to accommodate such embodiment.

The embodiments being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An article of furniture is a shelving unit having a top, bottom, front, back, left and right sides comprising:
    an integrally formed shell having generally rounded corners, the shell diminishing in circumference outwardly from a mounting plane defined by a mounting perimeter of the shell; and
    the shelving unit top formed to slope downward from the mounting perimeter of the shelving unit toward a front portion of the shelving unit;
    longitudinally parallel left and right shelving unit sides formed to slope toward each other from sides of the mounting perimeter and each integrally connected to opposite ends of the shelving unit top;
    a shelving unit bottom formed to slope upward from a bottom portion of the mounting perimeter toward the front portion of the shelving unit and integrally connected at opposite ends of the shelving unit bottom to the left and right exterior shelving unit sides, wherein the top, sides, and bottom of the shelving unit together forming a rectangle that diminishes in circumference from the mounting perimeter to the front of the shelving unit; and
    one or more shelves formed between the top, bottom and sides of the shelving unit, each shelf having a shelf top surface, a shelf back wall, a shelf left-side wall, a shelf right-side wall, and a shelf bottom surface, defining a shelf volume with a generally rectangular transverse vertical cross-sectional area that expands from the shelf back wall toward the front of the shelving unit, the left-side and right-side shelf walls angled divergently away from the shelf back wall, the shelf top surface angled upward away from the shelf back wall, wherein each shelf back wall is formed generally coplanar with the mounting plane a mounting portion configured to secure the shell to a mounting surface at the mounting plane, the mounting surface is a mounting wall; and wherein when the shell is secured to the mounting surface, the mounting portion comprises a rear surface of at least one shelf back wall and is inaccessible.

2. The article of claim 1, wherein the shell is unitarily molded from a non-porous, fire-retardant, composite material.

3. The article of claim 1, wherein the mounting portion comprises one or more attachment projections formed at a backside of the shelving unit bottom and at a backside of the shelving unit top, the attachment projections engaging mounting hardware for attachment to the mounting wall.

4. The article of claim 3, wherein the mounting hardware comprises:
   a bolt or screw for engagement with a mounting hole; and
   a z-shaped hanging clip having at one end a generally v-shaped cutout engaging a head portion of each bolt or screw and having at another end an opening configured to accommodate a wall anchor for securing the hanging clip to the mounting wall.

5. A method of mounting the article of claim 4, comprising:
   engaging the bolt(s) or screw(s) with each mounting hole;
   securing the hanging clips to the mounting wall corresponding to each bolt or screw;
   applying an adhesive on a back portion of at least one shelf rear wall;
   engaging each bolt or screw with the corresponding hanging clip thereby suspending the shelving unit from the hanging clips against the mounting wall;
   pressing an adhesive-coated at least one back portion against the mounting wall; and
   caulking the mounting perimeter.

6. The article of claim 1, wherein the shelf rear wall is formed beyond the mounting plane.

7. The article of claim 6, wherein the shelf rear wall is formed approximately 1/16 inch behind the mounting plane.

8. An article of furniture is a shelving unit having a top, bottom, front, back, left and right sides comprising:
   an integrally formed shell having generally rounded corners, the shell diminishing in circumference outwardly from a mounting plane defined by a mounting perimeter of the shell; and
      the shelving unit top formed to slope downward from the mounting perimeter of the shelving unit toward a front portion of the shelving unit;
      longitudinally parallel left and right shelving unit sides formed to slope toward each other from sides of the mounting perimeter and each integrally connected to opposite ends of the shelving unit top;
   a shelving unit bottom formed to slope upward from a bottom portion of the mounting perimeter toward the front portion of the shelving unit and integrally connected at opposite ends of the shelving unit bottom to the left and right exterior shelving unit sides, wherein the top, sides, and bottom of the shelving unit together forming a rectangle that diminishes in circumference from the mounting perimeter to the front of the shelving unit; and
   one or more shelves formed between the top, bottom and sides of the shelving unit, each shelf having a shelf top surface, a shelf back wall, a shelf left-side wall, a shelf right-side wall, and a shelf bottom surface, defining a shelf volume with a generally rectangular transverse vertical cross-sectional area that expands from the shelf back wall toward the front of the shelving unit, the left-side and right-side shelf walls angled divergently away from the shelf back wall, the shelf top surface angled upward away from the shelf back wall,
      wherein each shelf back wall is formed generally coplanar with the mounting plane;
   a mounting portion configured to secure the shell to a mounting surface at the mounting plane, the mounting surface is a mounting wall; and
   wherein when the shell is secured to the mounting surface, the mounting portion comprises one or more attachment projections formed at a backside of the shelving unit bottom and at a backside of the shelving unit top, the attachment projections engaging mounting hardware for attachment to the mounting wall, and the mounting portion is inaccessible.

9. An article of furniture is a shelving unit having a top, bottom, front, back, left and right sides comprising:
   an integrally formed shell having generally rounded corners, the shell diminishing in circumference outwardly from a mounting plane defined by a mounting perimeter of the shell; and
      the shelving unit top formed to slope downward from the mounting perimeter of the shelving unit toward a front portion of the shelving unit;
      longitudinally parallel left and right shelving unit sides formed to slope toward each other from sides of the mounting perimeter and each integrally connected to opposite ends of the shelving unit top;
   a shelving unit bottom formed to slope upward from a bottom portion of the mounting perimeter toward the front portion of the shelving unit and integrally connected at opposite ends of the shelving unit bottom to the left and right exterior shelving unit sides, wherein the top, sides, and bottom of the shelving unit together forming a rectangle that diminishes in circumference from the mounting perimeter to the front of the shelving unit; and
   one or more shelves formed between the top, bottom and sides of the shelving unit, each shelf having a shelf top surface, a shelf back wall, a shelf left-side wall, a shelf right-side wall, and a shelf bottom surface, defining a shelf volume with a generally rectangular transverse vertical cross-sectional area that expands from the shelf back wall toward the front of the shelving unit, the left-side and right-side shelf walls angled divergently away from the shelf back wall, the shelf top surface angled upward away from the shelf back wall,
      wherein each shelf back wall is formed generally coplanar with the mounting plane;
   a mounting portion configured to secure the shell to a mounting surface at the mounting plane, the mounting surface is a mounting wall; and
   wherein when the shell is secured to the mounting surface, the is inaccessible and the shelf rear wall is formed beyond the mounting plane.

* * * * *